US012398896B2

(12) United States Patent
Green et al.

(10) Patent No.: US 12,398,896 B2
(45) Date of Patent: Aug. 26, 2025

(54) AIR DISINFECTANT SYSTEM AND METHOD

(71) Applicants: Kenneth Ray Green, Crossroads, TX (US); Gina Deborah Morse, Decatur, TX (US); Kevin Mark Klughart, Denton, TX (US)

(72) Inventors: Kenneth Ray Green, Crossroads, TX (US); Douglas Hiram Morse, Decatur, TX (US); Kevin Mark Klughart, Denton, TX (US)

( * ) Notice: Subject to any disclaimer, the term of this patent is extended or adjusted under 35 U.S.C. 154(b) by 1023 days.

(21) Appl. No.: 17/391,375

(22) Filed: Aug. 2, 2021

(65) Prior Publication Data

US 2021/0356150 A1 Nov. 18, 2021

Related U.S. Application Data

(63) Continuation-in-part of application No. 16/855,238, filed on Apr. 22, 2020, now Pat. No. 11,326,798.

(Continued)

(51) Int. Cl.
*F24F 8/22* (2021.01)
*F24F 8/24* (2021.01)
(Continued)

(52) U.S. Cl.
CPC .................. *F24F 8/22* (2021.01); *F24F 8/24* (2021.01); *F24F 11/32* (2018.01); *F24F 11/36* (2018.01); *F24F 11/52* (2018.01); *F24F 11/61* (2018.01); *F24F 11/63* (2018.01); *F24F 11/72* (2018.01); *F24F 11/88* (2018.01); *F24F 2110/30* (2018.01)

(58) Field of Classification Search
None
See application file for complete search history.

(56) References Cited

U.S. PATENT DOCUMENTS

| 4,990,313 | A  | * | 2/1991 | Pacosz | F24F 8/192 |
| | | | | | 55/467 |
| 7,185,825 | B1 | * | 3/2007 | Rosen | F24F 11/61 |
| | | | | | 236/94 |

(Continued)

FOREIGN PATENT DOCUMENTS

WO WO-2020067040 A1 * 4/2020 .............. F24F 11/36

*Primary Examiner* — Jerry-Daryl Fletcher
*Assistant Examiner* — Daniel C Comings
(74) *Attorney, Agent, or Firm* — Kevin Mark Klughart

(57) ABSTRACT

A HVAC air treatment (HAT) system/method for use in heating, ventilation, and air conditioning (HVAC) systems that incorporates an air flow sensor (AFS), timer control unit (TCU), ultraviolet lamp(s) (UVL), lamp feedback indicator (LFI), liquid distribution atomizer (LDA), leak exhaust fan (LEF), and digital control processor (DCP) is disclosed. The AFS indicates detection of air flow within the HVAC ducts (HVD) to the DCP and may wirelessly communicate with the DCP. The DCP interrogates the TCU to determine when HAT is to occur if HVD air flow is detected and activates the UVL to disinfect air within the HVD. The LFI provides feedback to the DCP to verify that the UVL is operational. The UVL may be positioned at the fresh air intake (FAI), air intake plenum (AIP), evaporator/heat exchanger (HEX), and/or air exhaust plenum (AEP) and may incorporate an adjustable magnetic frame (AMF) allowing UVL retrofit installation.

48 Claims, 68 Drawing Sheets

Related U.S. Application Data

(60) Provisional application No. 63/112,235, filed on Nov. 11, 2020, provisional application No. 63/061,358, filed on Aug. 5, 2020.

(51) Int. Cl.

| | | |
|---|---|---|
| *F24F 11/32* | (2018.01) | |
| *F24F 11/36* | (2018.01) | |
| *F24F 11/38* | (2018.01) | |
| *F24F 11/52* | (2018.01) | |
| *F24F 11/61* | (2018.01) | |
| *F24F 11/63* | (2018.01) | |
| *F24F 11/72* | (2018.01) | |
| *F24F 11/88* | (2018.01) | |
| *F24F 110/30* | (2018.01) | |

(56) References Cited

U.S. PATENT DOCUMENTS

| | | | |
|---|---|---|---|
| 2003/0099569 A1* | 5/2003 | Lentz | A61L 9/20 |
| | | | 422/4 |
| 2005/0069463 A1* | 3/2005 | Kurtz | F24F 8/22 |
| | | | 422/121 |
| 2006/0267756 A1* | 11/2006 | Kates | G08B 21/182 |
| | | | 340/521 |
| 2007/0202021 A1* | 8/2007 | Willette | B01D 53/007 |
| | | | 422/186.3 |
| 2008/0030144 A1* | 2/2008 | Steckling | H05B 41/34 |
| | | | 315/224 |
| 2008/0031770 A1* | 2/2008 | Heselton | C01B 13/11 |
| | | | 422/4 |
| 2017/0072087 A1* | 3/2017 | Tai | A61L 9/14 |
| 2021/0356154 A1* | 11/2021 | Kobayashi | F25B 49/02 |
| 2021/0381709 A1* | 12/2021 | Liu | F24F 11/64 |

* cited by examiner

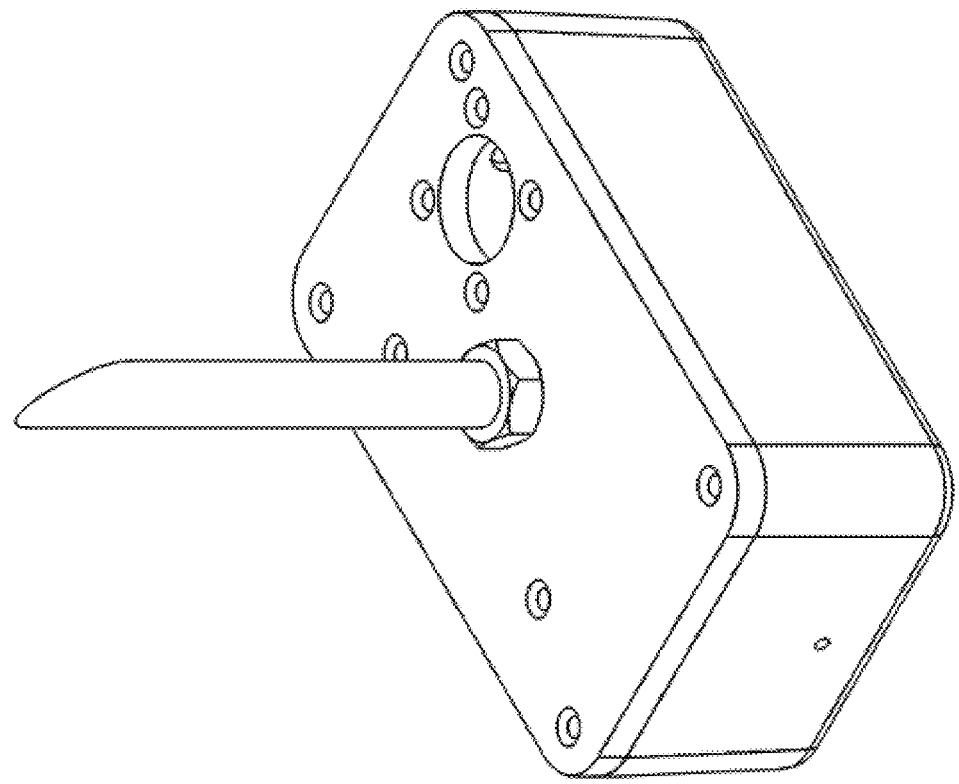
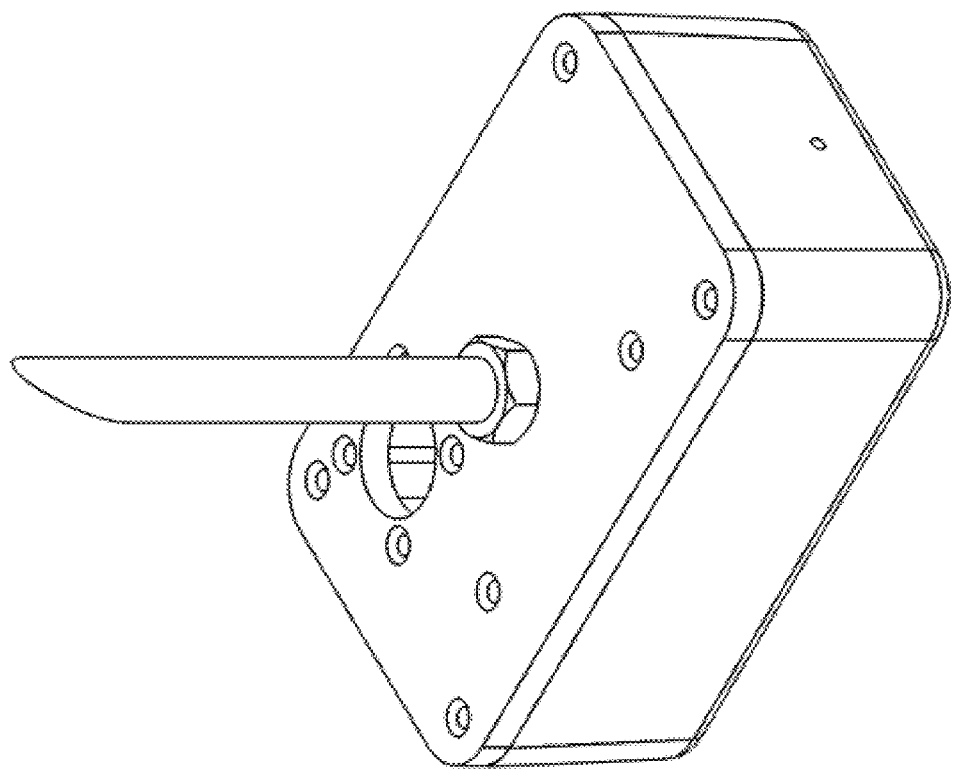
FIG. 5

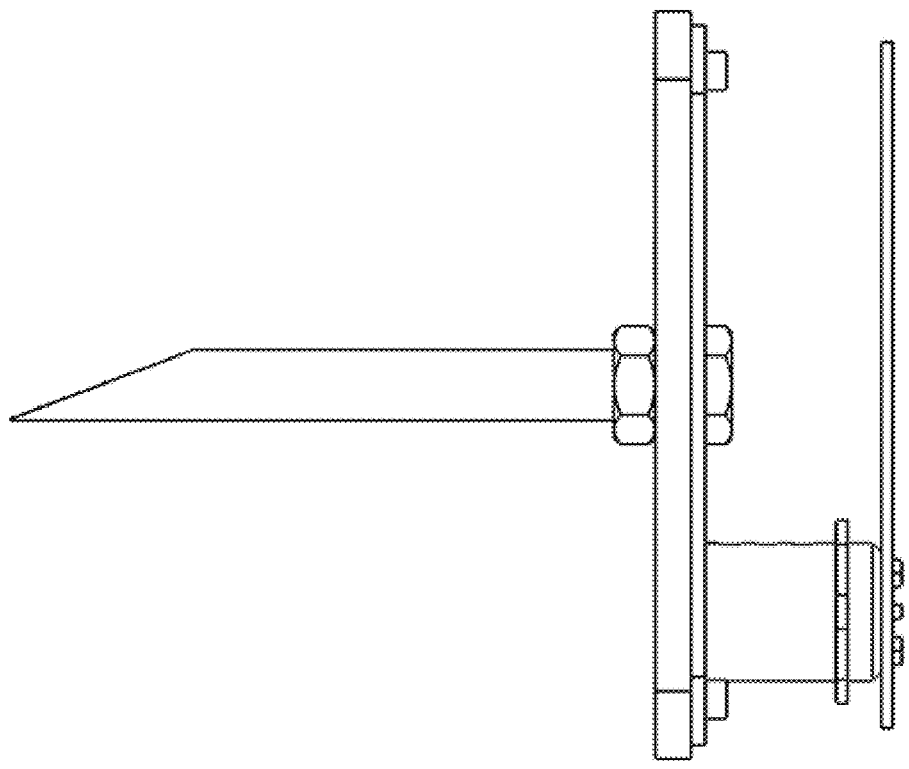
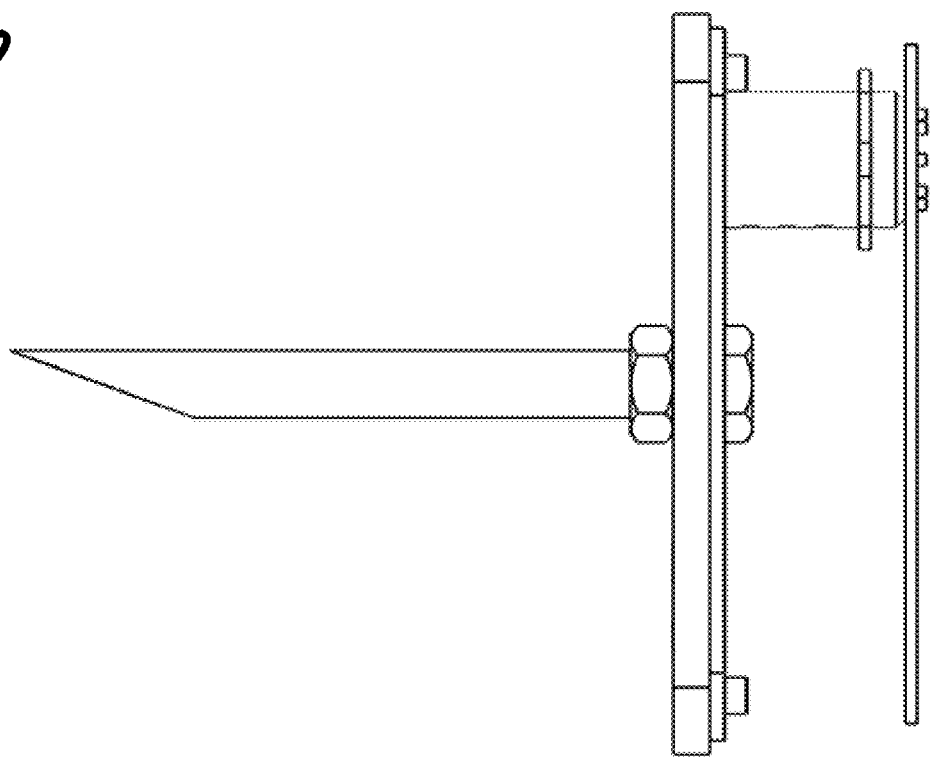
FIG. 7
0700

3500

3800

4700

AIR DISINFECTANT SYSTEM AND METHOD

CROSS REFERENCE TO RELATED APPLICATIONS

Continuation-In-Part Patent Application (CIP)

This is a continuation-in-part (CIP) patent application of and incorporates by reference United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025.

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, is a continuation-in-part (CIP) patent application of and incorporates by reference United States Utility patent application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253.

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, is a continuation-in-part (CIP) patent application of and incorporates by reference United States Utility patent application for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370.

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, is a continuation-in-part (CIP) patent application of and incorporates by reference United States Utility patent application for REFRIGERANT METERING SYSTEM AND METHOD by inventor Kenneth R. Green, filed electronically with the USPTO on 20 Jan. 2020, with Ser. No. 16/747,422, EFSID 38342840, confirmation number 1232.

PCT Patent Applications

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, claims benefit under 35 U.S.C. § 120 and incorporates by reference PCT Patent Application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with serial number PCT/US2018/019161.

Utility Patent Applications

This patent application claims benefit under 35 U.S.C. § 120 and incorporates by reference United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025.

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, claims benefit under 35 U.S.C. § 120 and incorporates by reference United States Utility patent application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253.

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, claims benefit under 35 U.S.C. § 120 and incorporates by reference United States Utility patent application for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370.

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, claims benefit under 35 U.S.C. § 120 and incorporates by reference United States Utility patent application for REFRIGERANT METERING SYSTEM AND METHOD by inventor Kenneth R. Green, filed electronically with the USPTO on 20 Jan. 2020, with Ser. No. 16/747,422, EFSID 38342840, confirmation number 1232.

Provisional Patent Applications

This patent application claims benefit under 35 U.S.C. § 119 and incorporates by reference United States Provisional patent application for HVAC AIR TREATMENT SYSTEM AND METHOD by inventors Kenneth Ray Green, et al., filed electronically with the USPTO on 2020 Nov. 11, with Ser. No. 63/112,235, EFS ID 41093649, confirmation number 3047.

This patent application claims benefit under 35 U.S.C. § 119 and incorporates by reference United States Provisional patent application for HVAC AIR TREATMENT SYSTEM AND METHOD by inventors Kenneth Ray Green, et al., filed electronically with the USPTO on 2020 Aug. 5, with Ser. No. 63/061,358, EFS ID 40201089, confirmation number 7290.

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, claims benefit under 35 U.S.C. § 119 and incorporates by reference United States Provisional patent application for LEAK CONTAINMENT SYSTEMS by inventors Kenneth R. Green, et al., filed electronically with the USPTO on 20 Nov. 2019, with Ser. No. 62/938,132, EFS ID 37810820, confirmation number 6339.

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, claims benefit under 35 U.S.C. § 119 and incorporates by reference United States Provisional patent application for LEAK DETECTION TROUBLESHOOTER by inventors Kenneth R. Green, et al., filed electronically with the USPTO on 13 Aug. 2019, with Ser. No. 62/886,020, EFS ID 36861132, confirmation number 1376.

United States Utility patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, claims benefit under 35 U.S.C. § 119 and incorporates by reference United States Provisional patent application for AC BOX ENGINEERING, DESIGNS, AND DEVICES by inventors Kenneth R. Green, et al., filed electronically with the USPTO on 30 May 2019, with Ser. No. 62/854,676, EFS ID 36158820, confirmation number 6929.

United States Utility patent application for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370, claims benefit under 35 U.S.C. § 119 and incorporates by reference United States Provisional patent application for DISTRIBUTED RESIDENTIAL CLIMATE-CONTROL SYSTEMS AND METHODS WITH REFRIGERANT MANAGEMENT by inventors Kenneth R. Green, et al., filed electronically with the USPTO on 25 Oct. 2018, with Ser. No. 62/750,383, EFS ID 34113773, confirmation number 1062.

United States Utility patent application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253, claims benefit under 35 U.S.C. § 119 and incorporates by reference United States Provisional patent application for REFRIGERANT LEAK CONTAINMENT SYSTEM by inventor Kenneth R. Green, filed electronically with the USPTO on 23 Feb. 2017, with Ser. No. 62/462,570, confirmation number 1047.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to heating, ventilation, and air conditioning (HVAC) systems, and specifically the treatment of air within these HVAC systems. Without limitation, the present invention may have application in situations where the air flow within a HVAC system is to be treated to control bacteria, mold, and/or viruses. In these situations the HVAC system may service multiple air handler units and as such individual control of air treatment within a number of related HVAC ducts (HVD) serviced by related heat exchangers (HEX), evaporator coil(s) (HEC), and/or condenser coil(s) (HCC) is required. The present invention in these circumstances is designed to detect the flow of air in the HVD and initiate controlled air treatment of HVD airflow within the HVAC system and optionally determine if the air treatment is correctly operational. The disclosed system/method may in some circumstances be configured for retrofit to existing HVAC system components.

BACKGROUND AND PRIOR ART

Germicidal lamps are well known in the prior art and are used to sterilize workspaces and tools used in biology laboratories and medical facilities. If the quartz envelope transmits shorter wavelengths, such as the 185 nm mercury emission line, they can also be used wherever ozone is desired, for example, in the sanitizing systems of hot tubs and aquariums.

A germicidal lamp is an electric light that produces ultraviolet C (UVC) light. UVC light is typically in the wavelength range of 280 nm-100 nm. This short-wave ultraviolet light disrupts DNA base pairing, causing formation of pyrimidine dimers, and leads to the inactivation of bacteria, viruses, and protozoa. It can also be used to produce ozone for water disinfection.

There are three common types of UVC lamp available:
Low-pressure lamps;
High-pressure lamps; and
Light Emitting Diodes (LEDs).

Low Pressure Lamps

Low-pressure lamps are very similar to a fluorescent lamp, with a wavelength of 253.7 nm (1182.5 THz).

The most common form of germicidal lamp looks similar to an ordinary fluorescent lamp but the tube contains no fluorescent phosphor. In addition, rather than being made of ordinary borosilicate glass, the tube is made of fused quartz or VYCOR® brand 7913 glass. These two changes combine to allow the 253.7 nm ultraviolet light produced by the mercury arc to pass out of the lamp unmodified (whereas, in common fluorescent lamps, it causes the phosphor to fluoresce, producing visible light). Germicidal lamps still produce a small amount of visible light due to other mercury radiation bands.

An older design looks like an incandescent lamp but with the envelope containing a few droplets of mercury. In this design, the incandescent filament heats the mercury, producing a vapor which eventually allows an arc to be struck, short-circuiting the incandescent filament.

Rapid development through the last two decades led to the so-called excimer lamp which has a number of advantages over other sources of ultraviolet and even vacuum ultraviolet radiation.

High Pressure Lamps

High-pressure lamps are much more similar to HID lamps than fluorescent lamps. These lamps radiate a broad-band UVC radiation, rather than a single line. They are widely used in industrial water treatment, because they are very intense radiation sources. They are as efficient as low-pressure lamps. High-pressure lamps produce very bright bluish white light.

Light Emitting Diodes (LEDS)

Recent developments in light-emitting diode (LED) technology have led to the commercial availability of UVC LED sources.

UVC LEDs use semiconductor materials to produce light in a solid-state device. The wavelength of emission is tunable by adjusting the chemistry of the semiconductor material, giving a selectivity to the emission profile of the LED across, and beyond, the germicidal wavelength band. Advances in understanding and synthesis of the AlGaN materials system led to significant increases in the output power, device lifetime, and efficiency of UVC LEDs in the early 2010s.

The reduced size of LEDs opens up options for small reactor systems allowing for point-of-use applications and integration into medical devices. Low power consumption of semiconductors may allow UV disinfection systems that utilized small solar cells in remote or Third World applications.

Sterilization and Disinfection

Ultraviolet lamps are used to sterilize workspaces and tools used in biology laboratories and medical facilities. Commercially available low-pressure mercury-vapor lamps emit about 86% of their radiation at 254 nanometers (nm), with 265 nm being the peak germicidal effectiveness curve. UV at these germicidal wavelengths damage a microorganism's DNA/RNA so that it cannot reproduce, making it harmless, (even though the organism may not be killed). Since microorganisms can be shielded from ultraviolet rays in small cracks and other shaded areas, these lamps are used only as a supplement to other sterilization techniques.

UV-C LEDs are relatively new to the commercial market and are gaining in popularity. Due to their monochromatic nature (±5 nm) these LEDs can target a specific wavelength needed for disinfection. This is especially important knowing that pathogens vary in their sensitivity to specific UV wavelengths. LEDs are mercury free, instant on/off, and have unlimited cycling throughout the day.

Disinfection using UV radiation is commonly used in wastewater treatment applications and is finding an increased usage in municipal drinking water treatment. Many bottlers of spring water use UV disinfection equipment to sterilize their water. Solar water disinfection has been researched for cheaply treating contaminated water using natural sunlight. The UV-A irradiation and increased water temperature kill organisms in the water.

Ultraviolet radiation is used in several food processes to kill unwanted microorganisms. UV can be used to pasteurize fruit juices by flowing the juice over a high-intensity ultraviolet source. The effectiveness of such a process depends on the UV absorbance of the juice.

Pulsed light (PL) is a technique of killing microorganisms on surfaces using pulses of an intense broad spectrum, rich in UV-C between 200 and 280 nm. Pulsed light works with xenon flash lamps that can produce flashes several times per second.

Safety Concerns

Short-wave UV light is harmful to humans. In addition to causing sunburn and (over time) skin cancer, this light can produce extremely painful inflammation of the cornea of the eye, which may lead to temporary or permanent vision impairment. For this reason, the light produced by a germicidal lamp must be carefully shielded against direct viewing, with consideration of reflections and dispersed light. A February 2017 risk analysis of UVC lights concluded that ultraviolet light from these lamps can cause skin and eye problems.

BRIEF SUMMARY OF THE INVENTION

The present invention pertains to a system and method wherein a HVAC system may be retrofitted for air treatment with the use of an ultraviolet lamp (UVL) to control bacteria, mold, and/or viruses. The system utilizes an air flow sensor (AFS) in conjunction with a timer control unit (TCU) to determine under what circumstances ultraviolet disinfection of the air flow within the HVAC duct (HVD) is to occur. The system is configured to allow distributed placement of a plurality of AFS and/or UVL such that one or more portions of the HVD may be individually treated as to their individual air flow characteristics. The UVL may incorporate magnetically attached UVC LEDs that are electrically coupled using an extensible daisy-chain configuration that allows retrofitting to existing HVD without the need for mechanical modification of HVD within the HVAC system.

BRIEF DESCRIPTION OF THE DRAWINGS

For a fuller understanding of the advantages provided by the invention, reference should be made to the following detailed description together with the accompanying drawings wherein:

FIG. 5 illustrates top right front and top right rear perspective views of a preferred exemplary embodiment of a present invention air flow sensor;

FIG. 7 illustrates front and rear views of a preferred exemplary embodiment of a present invention air flow sensor with enclosure suppressed;

DESCRIPTION OF THE PRESENTLY PREFERRED EXEMPLARY

Embodiments

Figure 1:
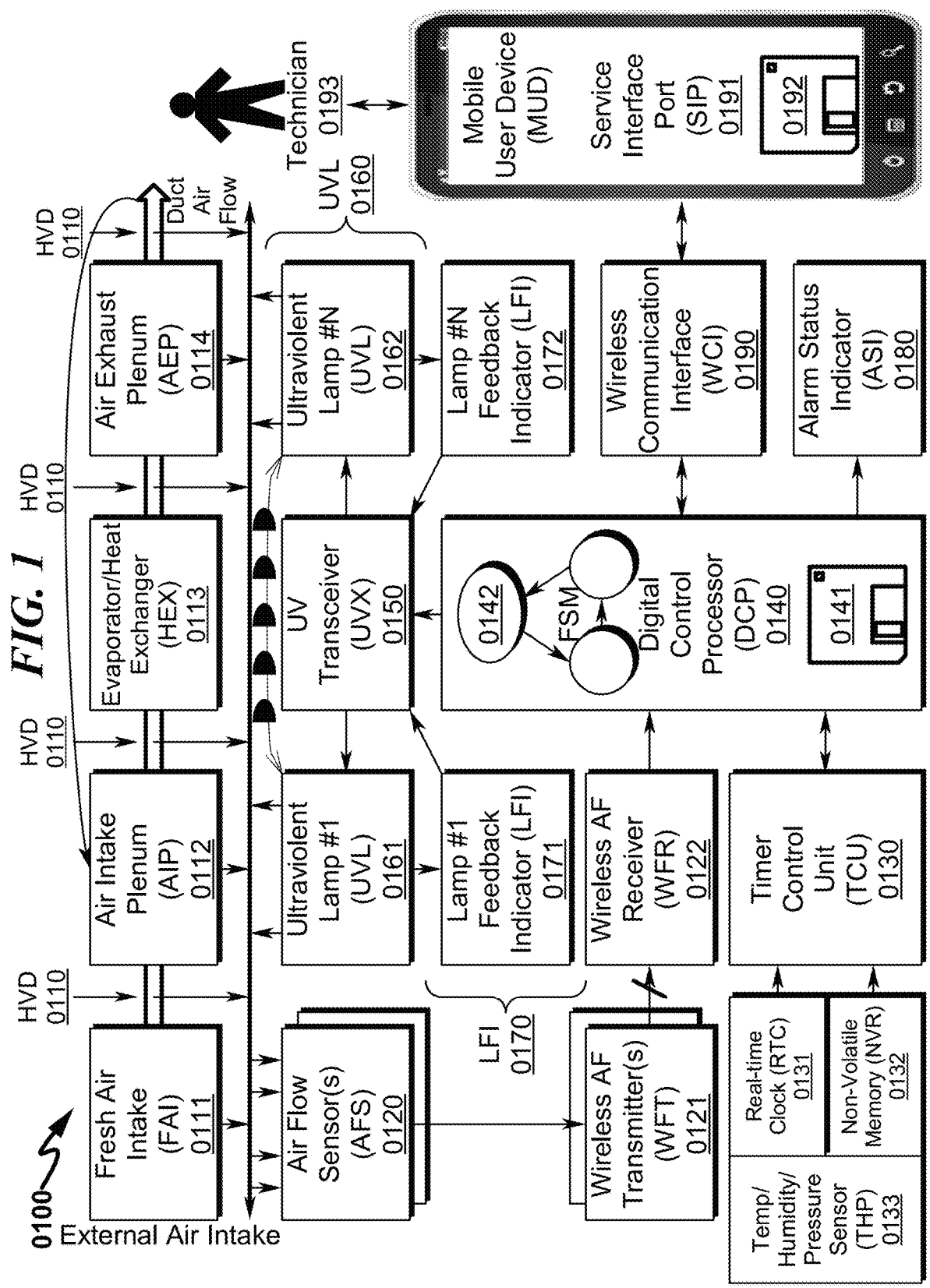
FIG. 1 illustrates a system block diagram depicting a preferred exemplary embodiment of a present invention HVAC air treatment system (ATS)

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a HVAC AIR TREATMENT SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

HVAC Heating/Cooling Operation Not Limitive

The present invention will be described in terms of a conventional HVAC heating/cooling system. In some application contexts, the system is operated solely as a cooling system. Thus, the present invention is not limited to heating, cooling, or heating/cooling systems, but combinations of these configurations are also anticipated. The present invention may be utilize with heat pumps, heat recovery, refrigeration, and other systems that employ LEV/EEV/TEV/AEV controls and/or REC components. The discussion herein does not limit the type of environment in which the present invention may be applied.

Furthermore, the terms "input port" and "output port" will be referenced to conventional refrigeration systems herein, but it should be understood that these designations will be reversed for heat recovery systems that are also anticipated by the present invention. One skilled in the art will have no trouble in reversing these designations where appropriate in this disclosure to allow the claimed invention to encompass both refrigeration and heat recovery systems.

Refrigerant Coil Not Limitive

While the present invention has particular application to the detection and mitigation of refrigerant leaks in HVAC evaporator coils, the present invention may equally be applied to HVAC condenser coils. Thus, the term "refrigerant coil" and it synonyms should be given a broad meaning within the scope of this disclosure and the claimed invention.

Drawings Not to Scale

The drawings presented herein have been scaled in some respects to depict entire system components and their connections in a single page. As a result, the components shown may have relative sizes that differ from that depicted in the exemplary drawings. One skilled in the art will recognize that piping sizes, thread selections, and other component values will be application specific and have no bearing on the scope of the claimed invention.

Schematics Exemplary

The present invention may be taught to one of ordinary skill in the art via the use of exemplary schematics as depicted herein. One skilled in the art will recognize that these schematics represent only one possible variation of the invention as taught and that their specific connectivity, components, and values are only one possible configuration of the invention. As such, the presented schematics and their associated component values and illustrated voltage levels do not limit the scope of the claimed invention. Additionally, it should be noted that conventional power supply decoupling capacitors are omitted in the presented schematics as they are generally application specific in value and placement.

Digital Control Processor (DCP) Not Limitive

The implementation of the digital control processor (DCP) described herein may take many forms, including but not limited to discrete digital logic, microcontrollers, finite state machines, and/or mixed analog-digital circuitry. While in many preferred exemplary embodiments the DCP is implemented using an 8051-class (8021, 8041, 89C microcontroller, the present invention is not limited to this particular hardware implementation.

States/Modes Not Limitive

The present invention will be herein described in terms of TCU STATES (TCU state machine (TSM)) in many embodiments. These states may equivalently be described in terms of MODES of operation.

Air Flow Sensor (AFS) Not Limitive

The present invention may use a wide variety of air flow sensors within the context of system application. While the use of WARREN G-V LS Series Electro-Mechanical Flow Sensors manufactured by Radiodetection LTD, 28 Tower Road, Raymond, Maine 04071, USA, is preferred in many contexts, the present invention is not limited to this type of air flow detection.

Time Delays Not Limitive

The present invention may make use of a variety of DCP selected time delays during the operation of the system. The time delays presented herein are only exemplary of those found in some preferred embodiments and are not limitive of the claimed invention. A "selected time delay" will refer to any time delay found appropriate in a particular application context of the present invention.

Wireless Communication Interface (WCI) Not Limitive

Some preferred invention embodiments may incorporate a wireless communication interface (WCI) allowing control and/or interrogation of the DCP from a mobile user device (MUD) or some other type of networked computer control. The WCI may take many forms, but many preferred invention embodiments utilize a BLUETOOTH® compatible interface to the DCP to accomplish this function.

Wireless Communication Protocol Not Limitive

Some preferred invention embodiments utilize a wireless communication interface (WCI) to allow external communication and/or control of the DCP. In this manner the operational STATE of the CCL can be interrogated, ASI alarms enabled/inhibited, HVAC controls manually operated, and stored information regarding the details of the particular HVAC system stored/retrieved. In many preferred exemplary embodiments the WCI is implemented using a BLUETOOTH® radio frequency transceiver, and in some circumstances a Shenzhen Xintai Micro Technology Co., Ltd. Model JDY-30/JDY-31 BLUETOOTH® SPP Serial Port Transparent Transmission Module or DSD TECH model HM-10/HM-11 (www.dsdtech-global.com) that implement a BLUETOOTH® wireless transceiver using a digital serial port of the DCP. One skilled in the art will recognize that this is just one of many possible WCI implementations.

Mobile User Device (MUD) Not Limitive

Some preferred invention embodiments may incorporate a mobile user device (MUD) allowing control and/or interrogation of the DCP via a WCI or other computer network. The MUD may take many forms, but many preferred invention embodiments utilize a tablet, smartphone, or other handheld device to wirelessly communicate with the DCP using a WCI. In some circumstances this MUD may utilize telephone or Internet communications to affect this DCP command/interrogation capability.

Alarm Status Indicator (ASI) Not Limitive

Many preferred invention embodiments may incorporate an alarm status indicator (ASI) comprising one or more light emitting diode (LED) displays (including LED displays utilizing a digital or segmented format) and/or audible alarm indicators. These devices may take many forms, including but not limited to single LED indicators, LED multi-segment displays, and piezo-electric audible indicators. In each of these cases the activation duty cycle and frequency of operation of these displays may be altered to provide indications of alarm status values or to provide information as to the STATE in which the system is operating. The present invention makes no limitation on how these displays operate or in what combination they are combined to provide the ASI functionality.

Power Supply Not Limitive

The present invention as described in the exemplary embodiments herein makes use of AC power derived from the HVAC system (AC power, typically for use with RLM implementations) or in other circumstances may use battery power (battery power, typically for use with RLD implementations). However, some implementations may utilize ETHERNET or some other wired network that supports power-over-Ethernet) (POE). In these circumstances the wireless communication interface (WCI) will encompass a wired communication network (WCN) that provides power to the system. The WCI as described herein encompasses the possibility of the use of a WCN incorporating power-over-Ethernet (POE) as a power source for the system.

In these circumstances the RLD/RLM may be connected directly to maintenance technician or facility manager computers to allow these remote computers to perform HVAC system analysis, generate reports on HVAC systems, refrigerant leak detection, and perform other functions on the RLD/RLM units.

HVAC Air Treatment System (ATS) Overview (0100)

The present invention HVAC air treatment system (ATS) in its simplest form is generally depicted in FIG. 1 (0100) wherein a HVAC duct (HVD) (0110) comprising fresh air intake (FAI) (0111), air intake plenum (AIP) (0112), evaporator/heat exchanger (HEX) (0113), and air exhaust plenum (AEP) (0114) is illustrated showing typical air flow from FAI (0111) and subsequently flowing through the AIP (0112), HEX (0113), and AEP (0114). Within this context air that exits the AEP (0114) to service a room or other HVAC controlled zone may be recirculated back through the AIP (0112) for reconditioning.

To properly treat the air flow within this system requires that all of the potential points of contamination be considered for sanitization or some other form of germicidal treatment/abatement. Furthermore, the treatment of the air flow necessitates the detection of air flow within the HVD (0110). The present invention addresses this by the use of an air flow sensor (AFS) (0120) that is configured to detect air flow in the HVD (0110). The AFS (0120) may comprise a mechanical air flow sensor, an air pressure sensor, differential ambient air pressure sensors placed inside and outside the HVD (0110), or a detector configured to determine when the HVD fan (not shown) is activated that forces air to travel within the HVD (0110).

The AFS (0120) may operate in conjunction with a timer control unit (TCU) (0130) that incorporates a real-time clock (RTC) (0131), non-volatile RAM memory (NVR) (0132), and/or temperature/humidity/pressure sensor (THP) (0133) in order to determine under what circumstances air flow within the HVD (0110) is to be treated once air flow in the HVD (0110) is detected by the AFS (0120). The RTC (0131) may be used to initiate HVAC air flow treatment only during certain time periods of the day/week/month by providing an accurate time-of-day/calendar and also keep track of the duration of air treatment provided by the air treatment system. The NVR (0132) may be used to store system configuration parameters such as how often and under what circumstances should air treatment be performed, the total duration of air treatment in the HVD (0110), status information regarding the operational state of the air treatment system, and other operational parameters. The THP (0133) may be used to adjust how much air treatment is provided within the HVD (0110) based on ambient atmospheric conditions including but not limited to temperature, humidity, and/or ambient atmospheric pressure.

The AFS (0120) and TCU (0130) communicate with a digital control processor (DCP) (0140) executing instructions retrieved from a tangible, non-transitory, non-volatile computer readable memory (0141) that combine to form a state machine (0142) that controls the overall ATS operation. Within this context the AFS (0120) may be configured to remotely communicate with the DCP (0140) via the use of one or more wireless air flow (AF) transmitters (WFT) (0121) and wireless air flow (AF) receivers (WFR). The WFT (0121) and WFR (0122) permit a plurality of AFS (0120) to be placed within the HVD (0110) and for each to signal air flow within a particular portion of the HVD (0110). This configuration may be useful in situations where individual fans control air flow from a central duct system to individual rooms or other zones within a HVAC system.

The DCP (0140) uses status information from the AFS (0120) and control information stored in the TCU (0130) to determine when and if air treatment in the HVD (0110) is to commence and for how long. Within this context the DCP (0140) may communicate with a wired or wireless UV transceiver (UVX) (0150) to trigger activation of one or more ultraviolet lamps (0160) (0161, 0162) that are located within the HVD (0110). In some circumstances the UVX (0150) may be implemented using direct wiring from the DCP (0140). Once activated, the UVL (0160) treat the HVD (0110) and associated air flow within for a period determined by the AFS (0120) and TCU (0130). During this air treatment period, one or more optional lamp feedback indicators (LFI) (0170) (0171, 0172) monitor the operation of the UVL (0160) to determine if they are operating properly and provide feedback to the DCP (0140) as to their operational state.

The DCP is configured with one or more visual and/or audible alarm status indicators (ASI) (0180) that may be configured to report status and/or error conditions such as indicating when air flow treatment is active and if the LFI (0170) indicates a failing UVL (0160).

The DCP may also be configured with an optional wireless communication interface (WCI) (0190) that may communicate with a mobile user device (MUD) (0191) such as a smartphone or tablet executing machine instructions from a tangible non-transitory computer readable medium (0192) in order to allow a technician (0193) or other operator access to status and error information in the DCP (0140) or to allow configuration of the TCU (0130) and DCP (0140) operation remotely by the operator (0193). The WCI (0190) may in some circumstances be configured to communicate with a WiFI network and permit communication between the DCP (0140) and the MUD (0191) to occur over the INTERNET.

HVAC Air Treatment Method (ATM) Overview (0200)-(0300)

Figure 2:
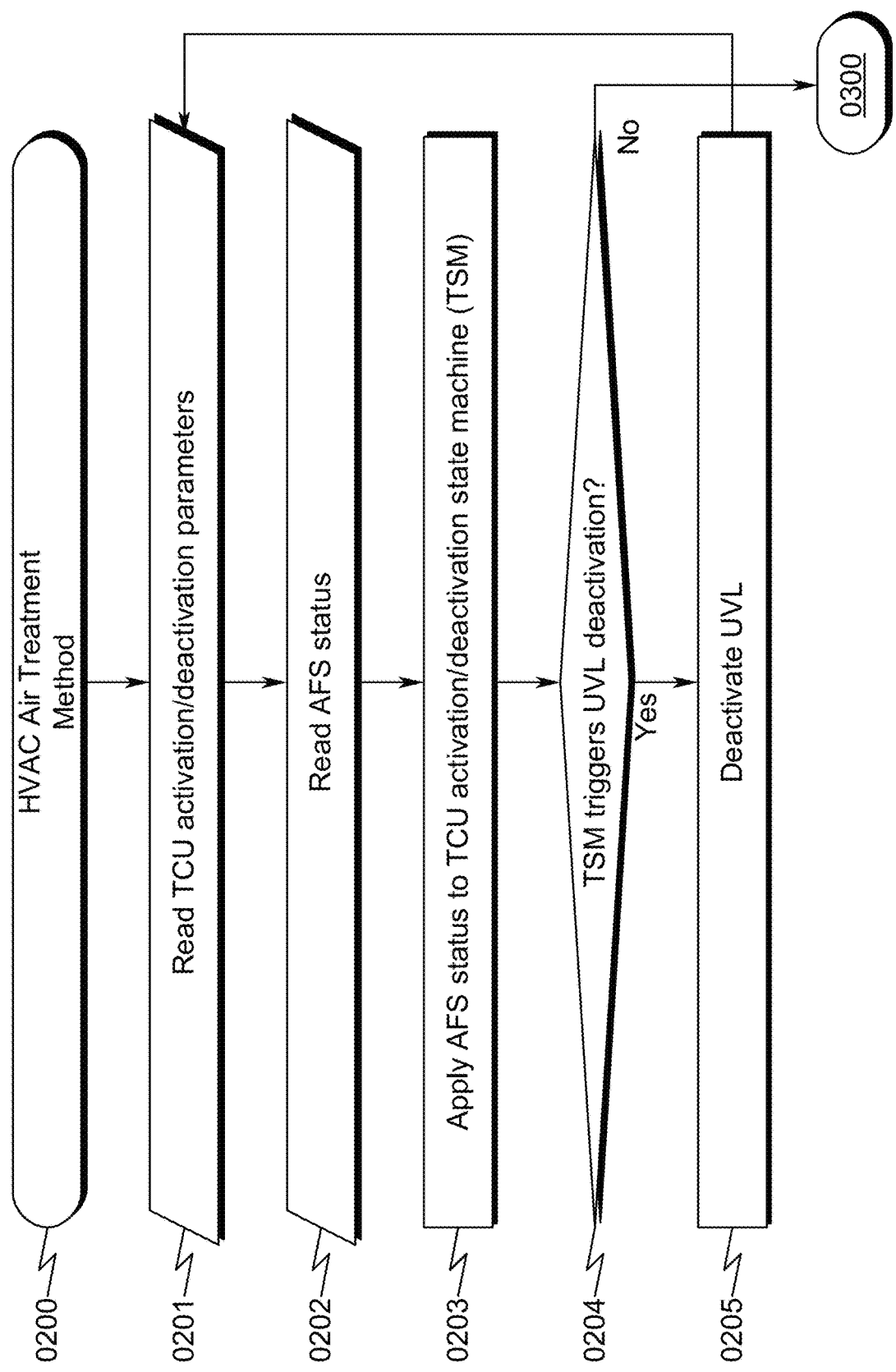
FIG. 2 illustrates a flowchart depicting a HVAC air treatment (ATM) overview method (page 1/2)
Figure 3:
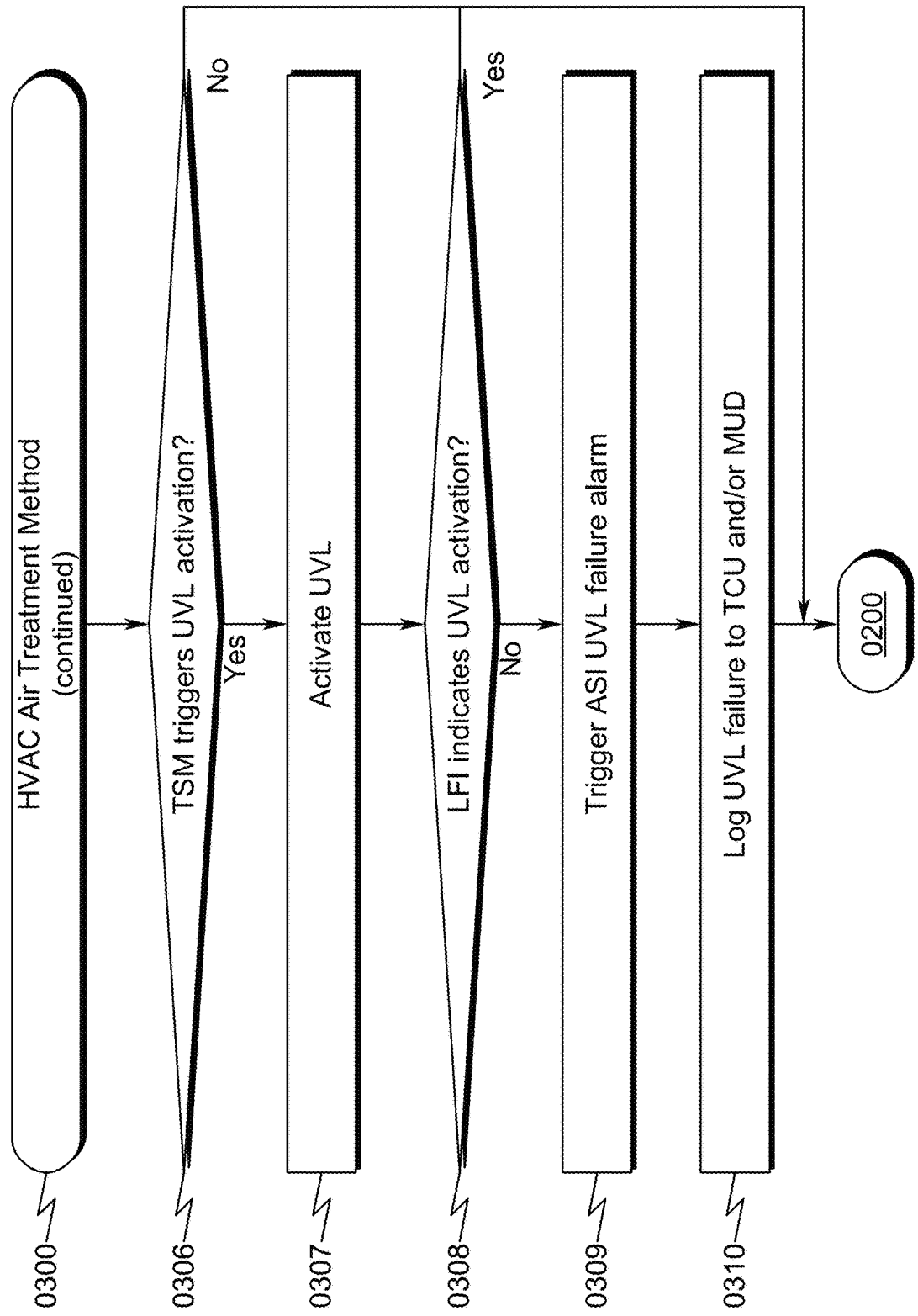
FIG. 3 illustrates a flowchart depicting a HVAC air treatment (ATM) overview method (page 2/2)

The system depicted in FIG. 1 (0100) may be associated with a retrofit HVAC air treatment method (ATM) as generally depicted in the flowchart of FIG. 2 (0200) comprising the following steps:

(1) reading activation and/or deactivation parameters from the TCU (0201);
(2) reading the current AFS status (0202);
(3) applying AFS status values to the activation/deactivation state machine (TSM) controlled by the data contained in the TCU (0203);
(4) determining if the TSM indicates UVL deactivation is required, and if not, proceeding to step (6) (0204);
(5) deactivating the UVL and proceeding to step (1) (0205);
(6) determining if the TSM indicates UVL activation is required, and if not, proceeding to step (1) (0306);
(7) activating the UVL (0307);
(8) determining if the LFI indicates that the UVL has been activated, and if so, proceeding to step (1) (0308);
(9) triggering an ASI UVL failure alarm (0309);
(10) logging the UVL failure to the TCU and/or MUD and proceeding to step (1) (0310).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Integration with Refrigerant Leak Detection/Mitigation (0400)

Figure 4:
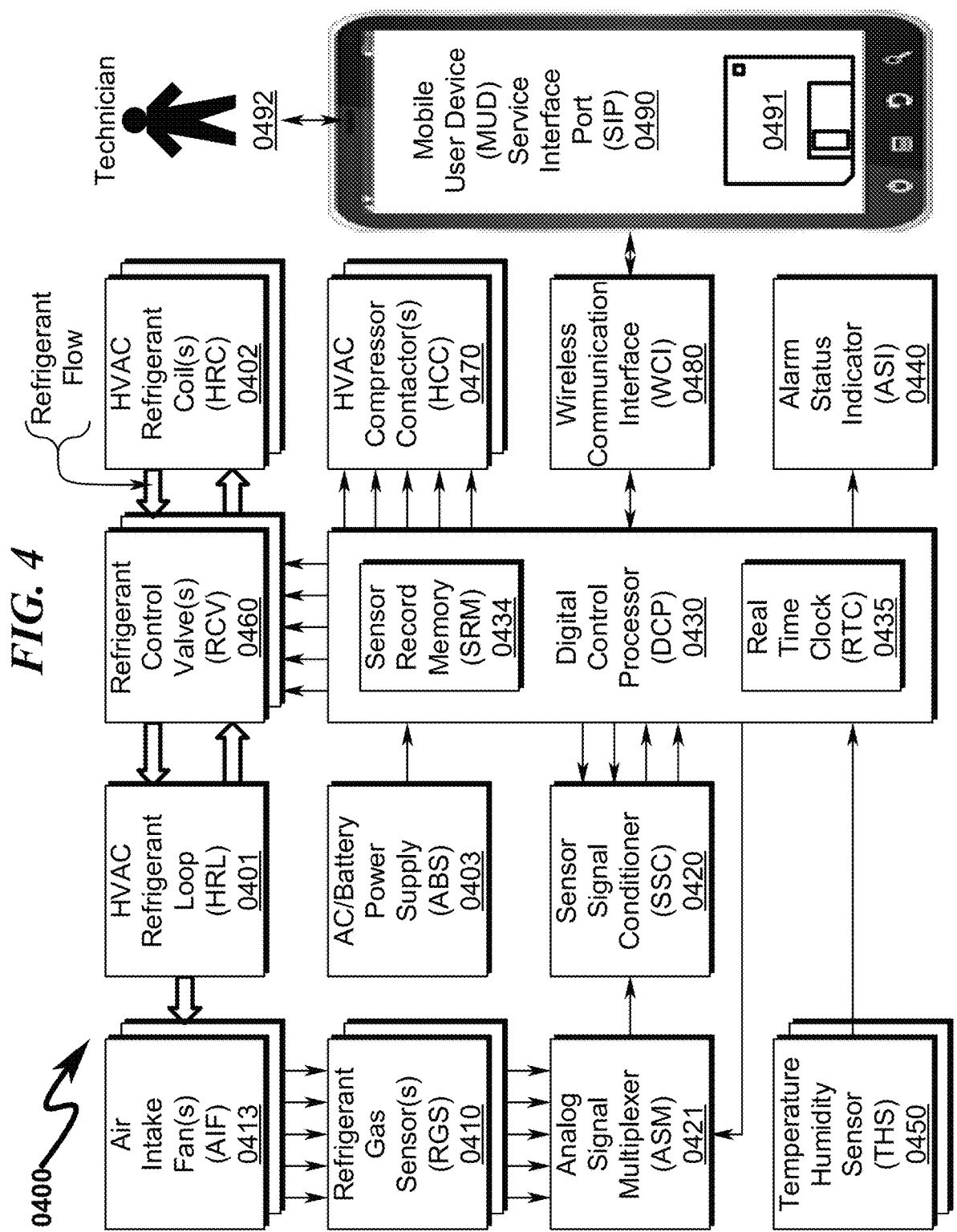
FIG. 4 illustrates a block diagram depicting a refrigerant leak detection/mitigation that may be integrated with the present invention teachings in some application contexts of the present invention.
Figure 6:
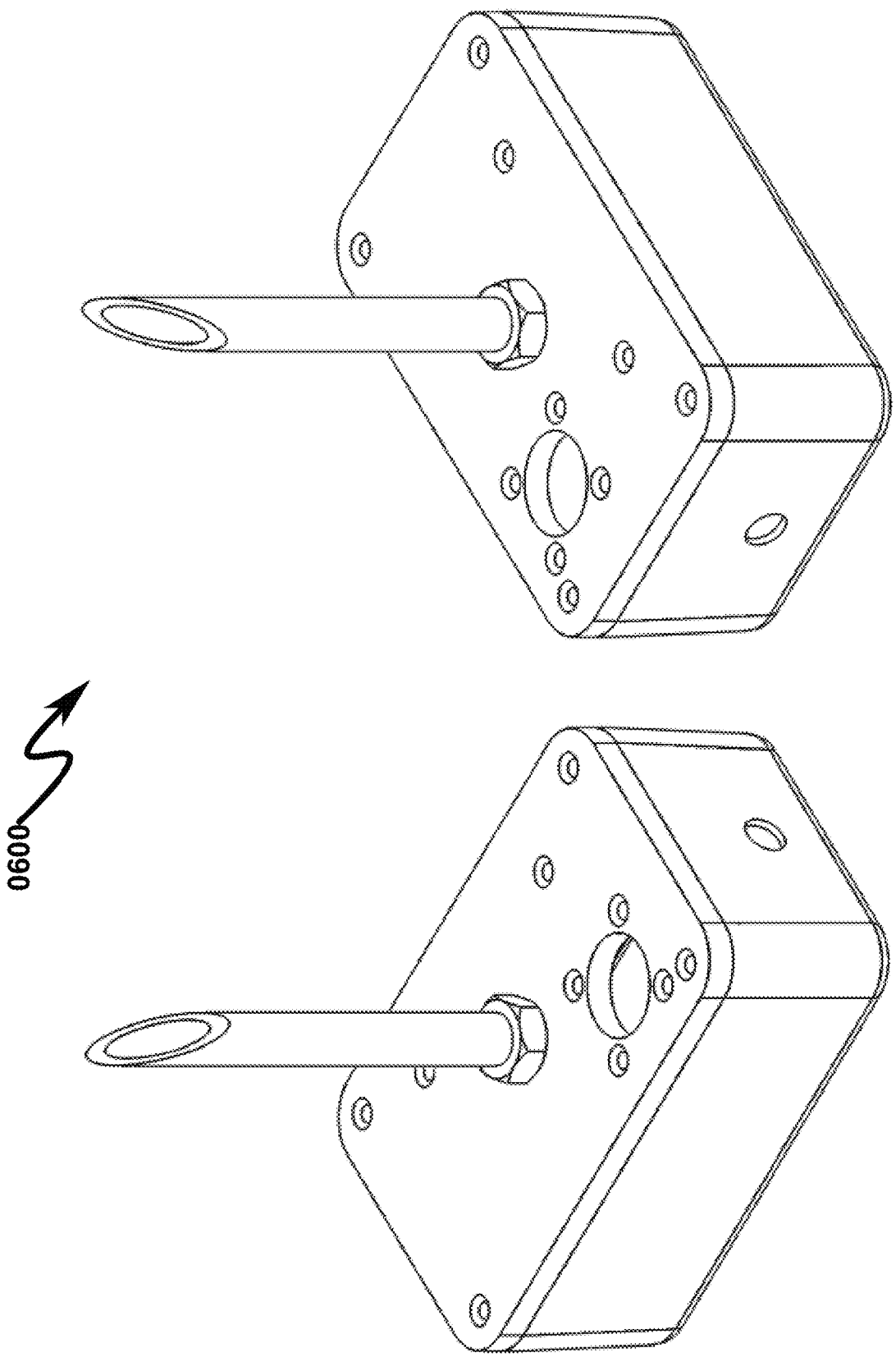
FIG. 6 illustrates top left rear and top left front perspective views of a preferred exemplary embodiment of a present invention air flow sensor.

As generally depicted in FIG. 4 (0400), the present invention may be integrated with refrigerant leak detection (RLD) and/or refrigerant leak mitigation (RLM) configurations as depicted and further discussed in United States patent application for REFRIGERANT LEAK DETECTION AND MITIGATION SYSTEM AND METHOD by inventors Kenneth Ray Green, et al., filed electronically with the USPTO on 22 Apr. 2020, with Ser. No. 16/855,238, EFS ID 39231336, confirmation number 3025, which is hereby included by reference.

Sensor Record Memory (SRM)/Real-Time Clock (RTC)

As generally depicted in FIG. 4 (0400), the DCP (0430) may in some preferred embodiments be augmented with a sensor record memory (SRM) (0434) and/or a real-time clock (RTC) (0435) that allows the DCP (0430) to log refrigeration leak detections by the DCP (0430). This logging information may then be later communicated to an operator via the ASI (0440) or an alternative communication mechanism such as a wireless network. The SRM (0434) and/or a RTC (0435) may be implemented within the DCP (0430) or optionally incorporated as separate components in the overall system implementation.

Temperature/Humidity/Pressure Sensor (THP)

As generally depicted in FIG. 4 (0100), the ATS may in some preferred embodiments be augmented with a temperature/humidity/pressure sensor (THP) (0433) that allows the DCP (0440) to adjust the operation of the UVL based on ambient temperature and/or humidity readings and/or ambient pressure. This THP (0433) may also be used by the DCP (0440) to trigger performance alarms for the HVAC system even if no air flow is detected by the AFS (0420). In some circumstances TCU (0430) may be used to trigger HVAC maintenance including inspection/cleaning of the UVL (0460). Thus, one or more THP (0433) sensors may be employed to constantly check the performance of the HVAC system and log these conditions as alarms to a technician or other individual.

Wireless Communication Interface (WCI)/Mobile User Device (MUD)

As generally depicted in FIG. 4 (0400), the RLD system may in some preferred embodiments be augmented with a wireless communication interface (WCI) (0480) and/or a mobile user device (MUD) service interface port (SIP) (0490) that allows information to be transmitted to/from the DCP (0430) relating to the state of the HVAC system, detected refrigerant leaks, and other information that may be logged in the sensor record memory (SRM) (0434). This WCI (0480)/MUD (0490) may also be used in some circumstances to control operation of the HVAC system such as control refrigerant flow valves or compressor contactors using the DCP (0530) as generally depicted in FIG. 4 (0400).

In many preferred embodiments an AC/Battery power supply (ABS) (0403) may be incorporated into the RLD system so as to allow it to be placed local to a potentially leaking HRC (0402) or HVAC compressor to allow logging of refrigerant leaks and reporting of same to the WCI (0480)/MUD (0490). In this manner a number of RLD systems can be deployed at a plurality of HRC (0402) or HVAC compressors and then a MUD (0490) may be used at a later time to scan the individual RLD systems to determine which particular HRC (0402) or HVAC compressor is actually leaking. Since these leak conditions may be environmentally triggered and not constant, the ability to set the RLD systems in place, leave the facility, and return to obtain the SRM (0434) refrigerant leak logging information from each individual RLD system greatly simplifies the detection of refrigerant leaks in a spatially diverse and complex HRL (0401).

Multiplexed RGS Sensors

As generally depicted in FIG. 4 (0400), the RLD system may in some preferred embodiments be augmented with an analog signal multiplexer (ASM) (0421) to allow inputs from multiple RGS (0410) to be inspected by the DCP (0430). In this manner a single RLD system may be used to gather refrigerant leak information from a multiple number of RGS (0410) sensors. Also shown in this diagram is the fact that many of the components such as the AIF (0413), RGS (0410), and THS (0450) may be replicated in the RLD system to provide for additional sensor monitoring functions based on particular application context.

Mechanical Air Flow Sensor (AFS) Detail (0500)-(0800)

Figure 8:
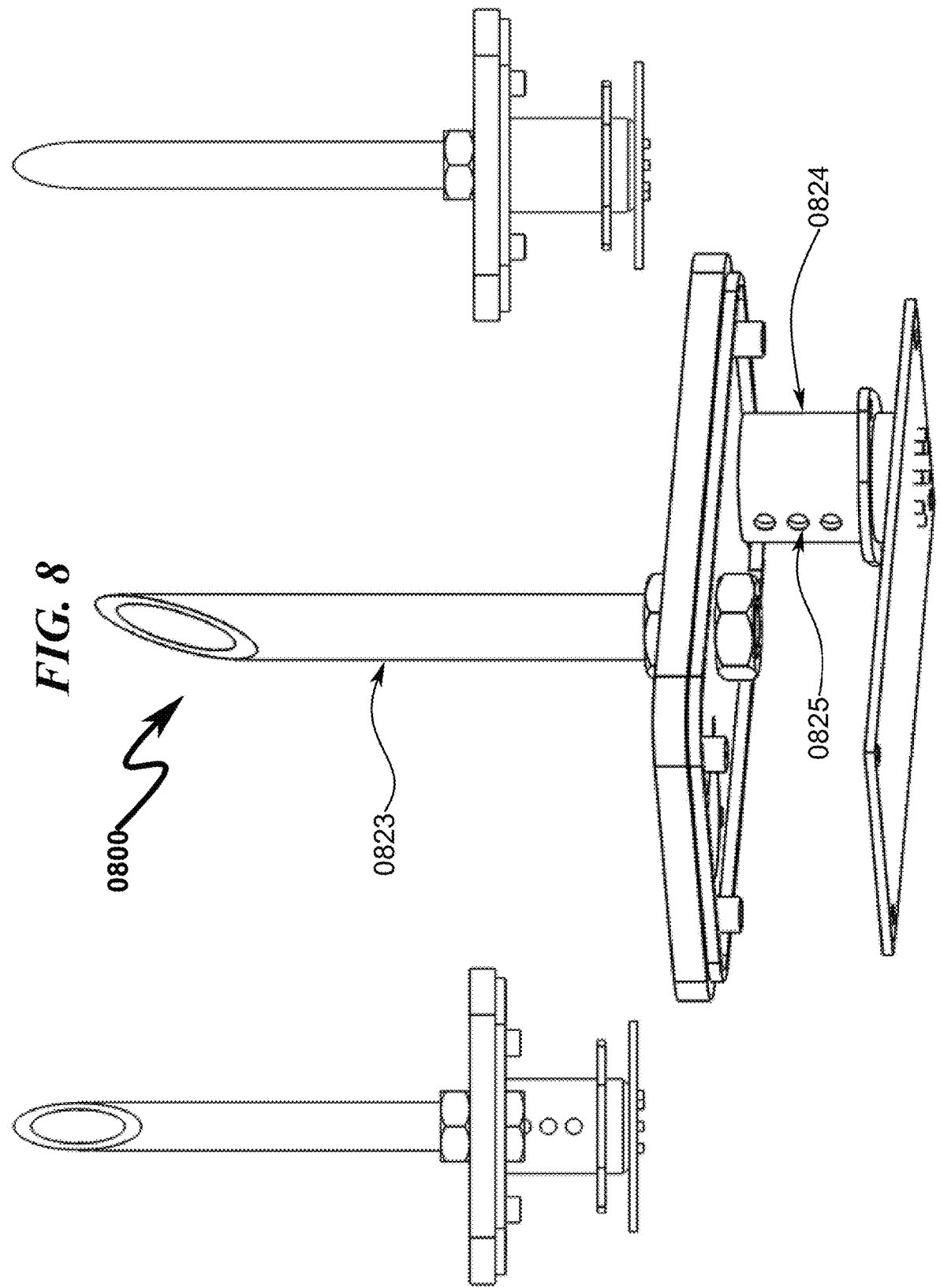
FIG. 8 illustrates left and right side views and a bottom front perspective view of a preferred exemplary embodiment of a present invention air flow sensor with enclosure suppressed.

As generally depicted in FIG. 5 (0500)-FIG. 8 (0800), the system may incorporate an air flow sensor (AFS) of the mechanical variety. The AFS in this configuration is equipped with an AFS input port (0823) that directs air into the cavity of the electronic enclosure and to the air flow sensor (AFS) (0824) configured with sensing holes (0825). The AFS (0824) triggers a mechanical switch when air flow is detected.

Mechanical Air Flow Sensor (AFS) Placement (0900)-(1600)

Figure 9:
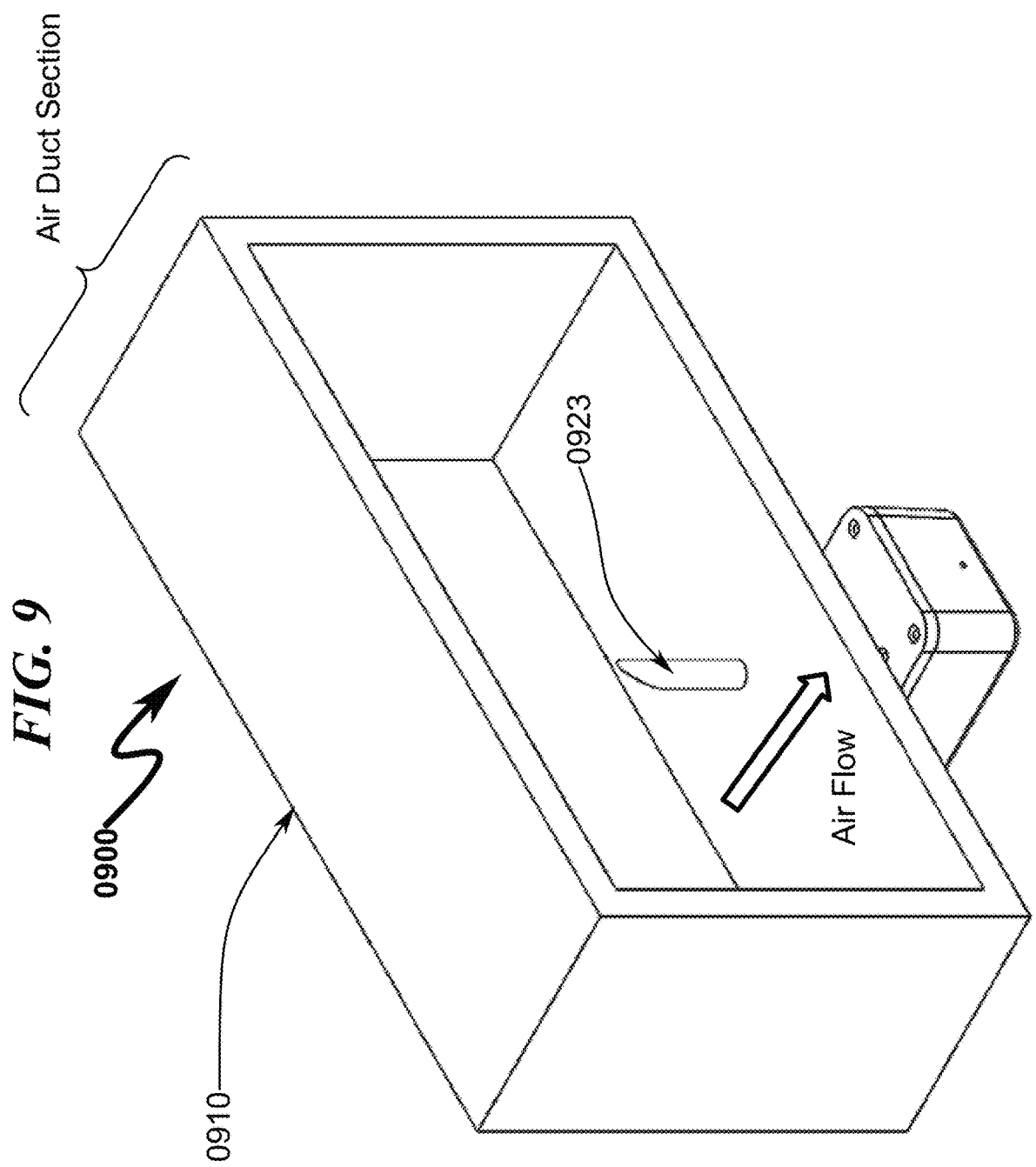
FIG. 9 illustrates a top right front perspective view of an air plenum configured with a preferred exemplary embodiment of a present invention air flow sensor.
Figure 10:
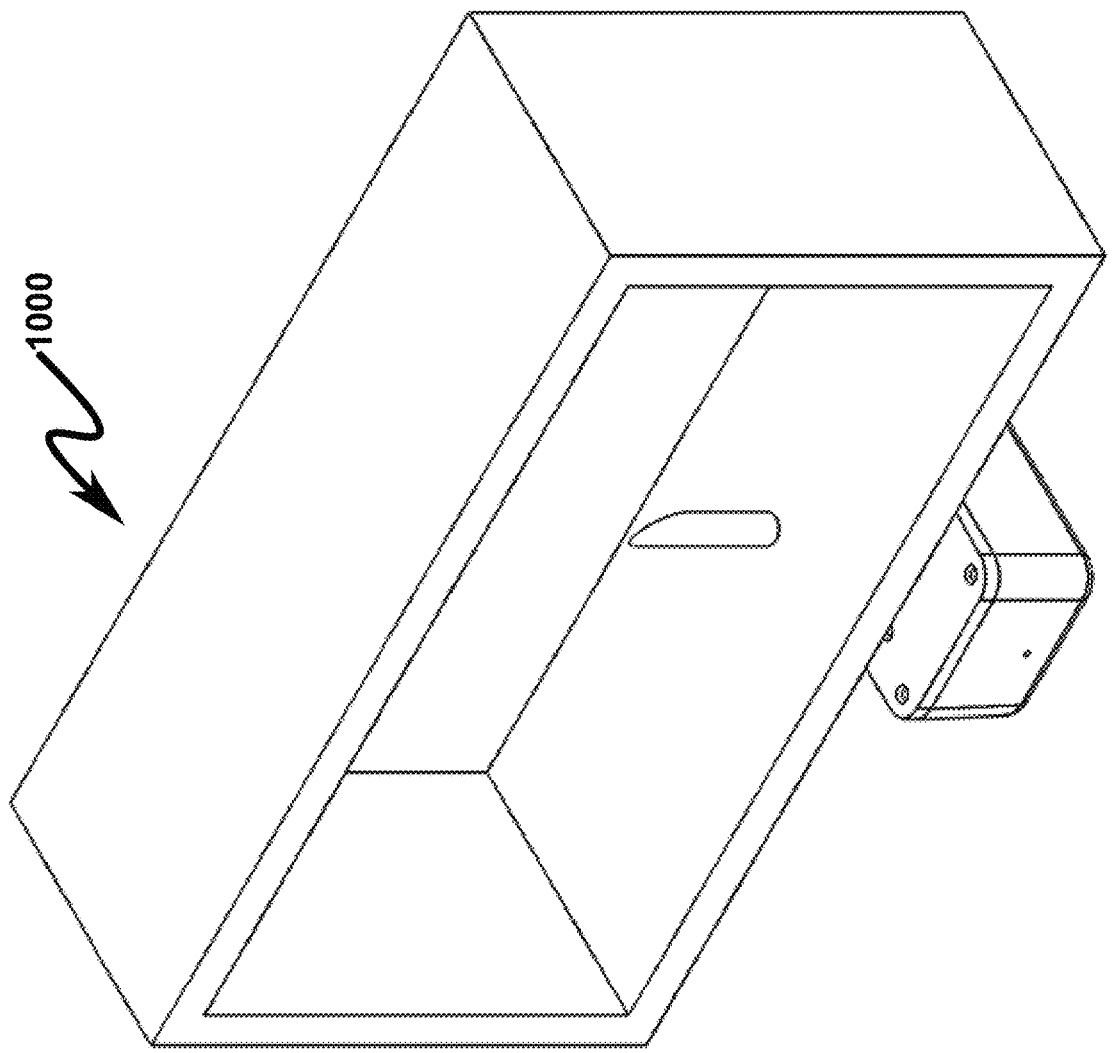
FIG. 10 illustrates a top right rear perspective view of an air plenum configured with a preferred exemplary embodiment of a present invention air flow sensor.
Figure 11:
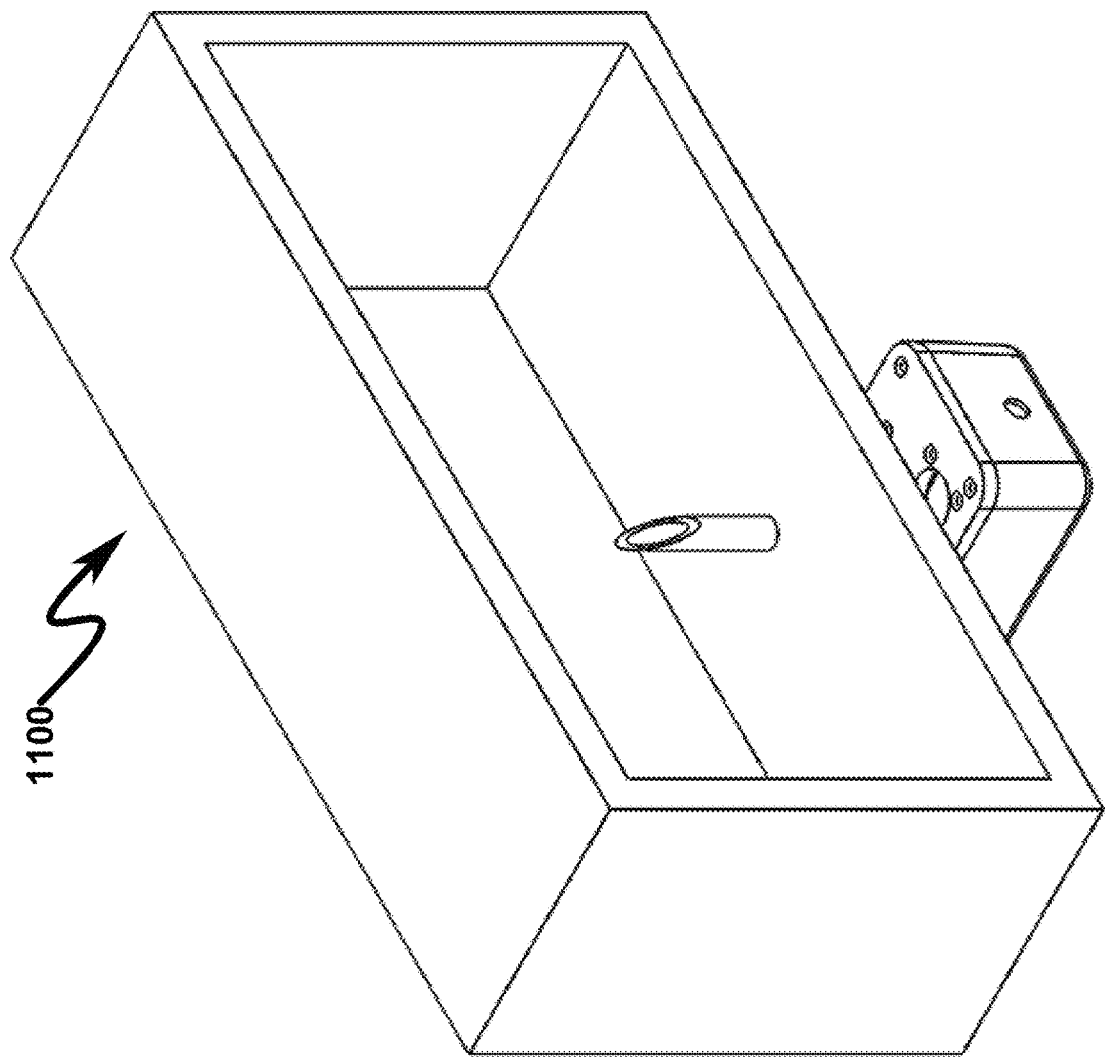
FIG. 11 illustrates a top left rear perspective view of an air plenum configured with a preferred exemplary embodiment of a present invention air flow sensor.
Figure 12:
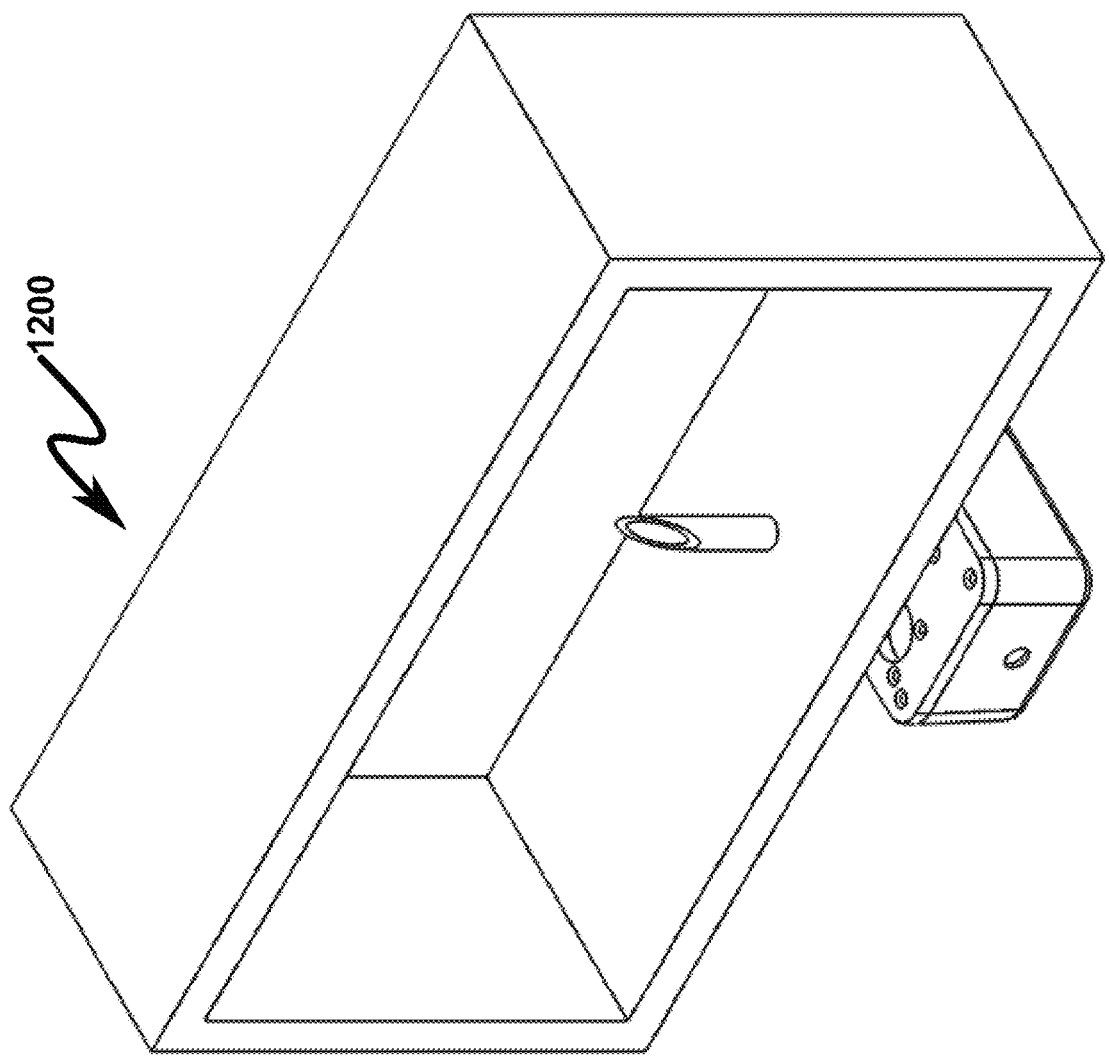
FIG. 12 illustrates a top left front perspective view of an air plenum configured with a preferred exemplary embodiment of a present invention air flow sensor.
Figure 13:
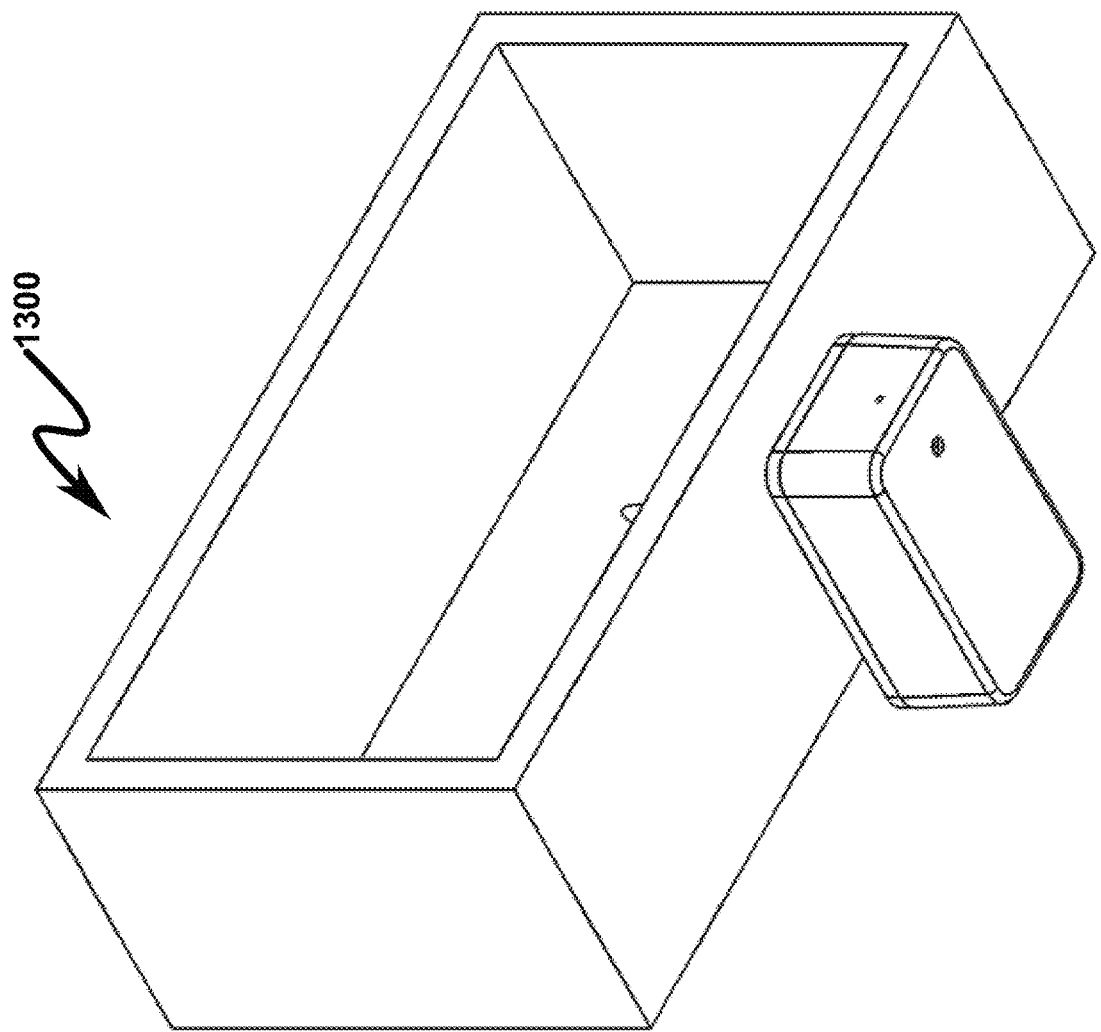
FIG. 13 illustrates a bottom right front perspective view of an air plenum configured with a preferred exemplary embodiment of a present invention air flow sensor.
Figure 14:
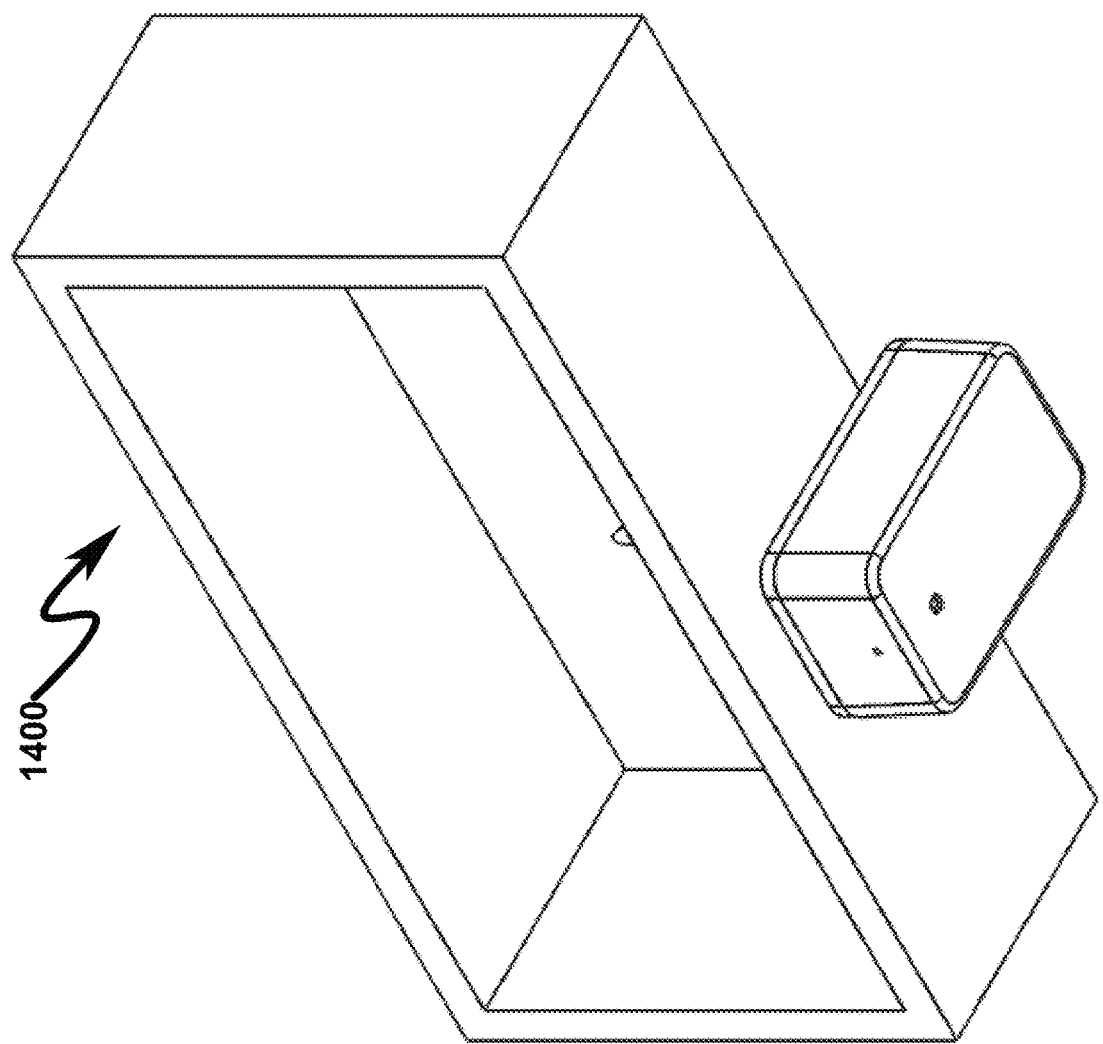
FIG. 14 illustrates a bottom right rear perspective view of an air plenum configured with a preferred exemplary embodiment of a present invention air flow sensor.
Figure 15:
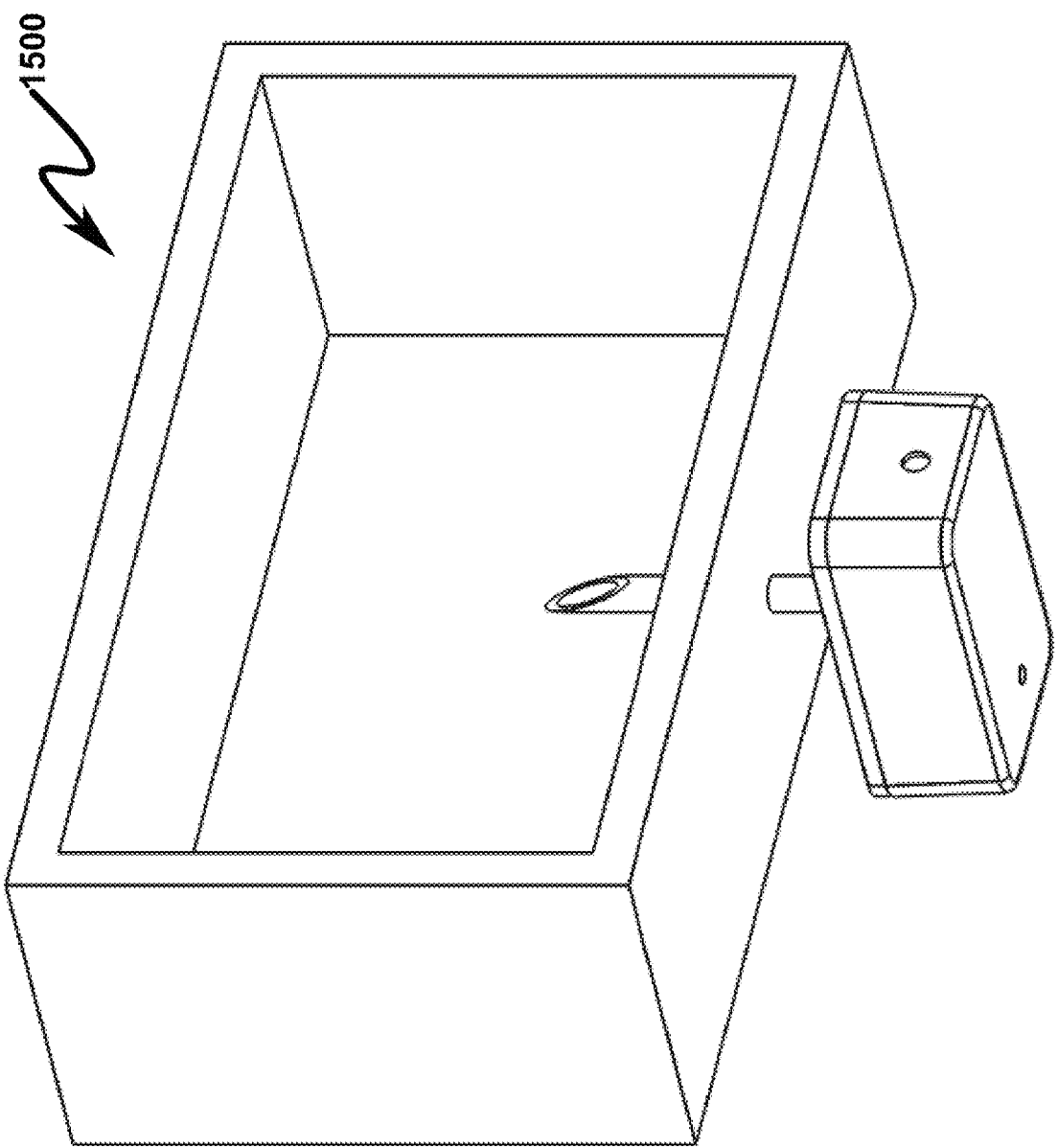
FIG. 15 illustrates a bottom left rear perspective view of an air plenum configured with a preferred exemplary embodiment of a present invention air flow sensor.
Figure 16:
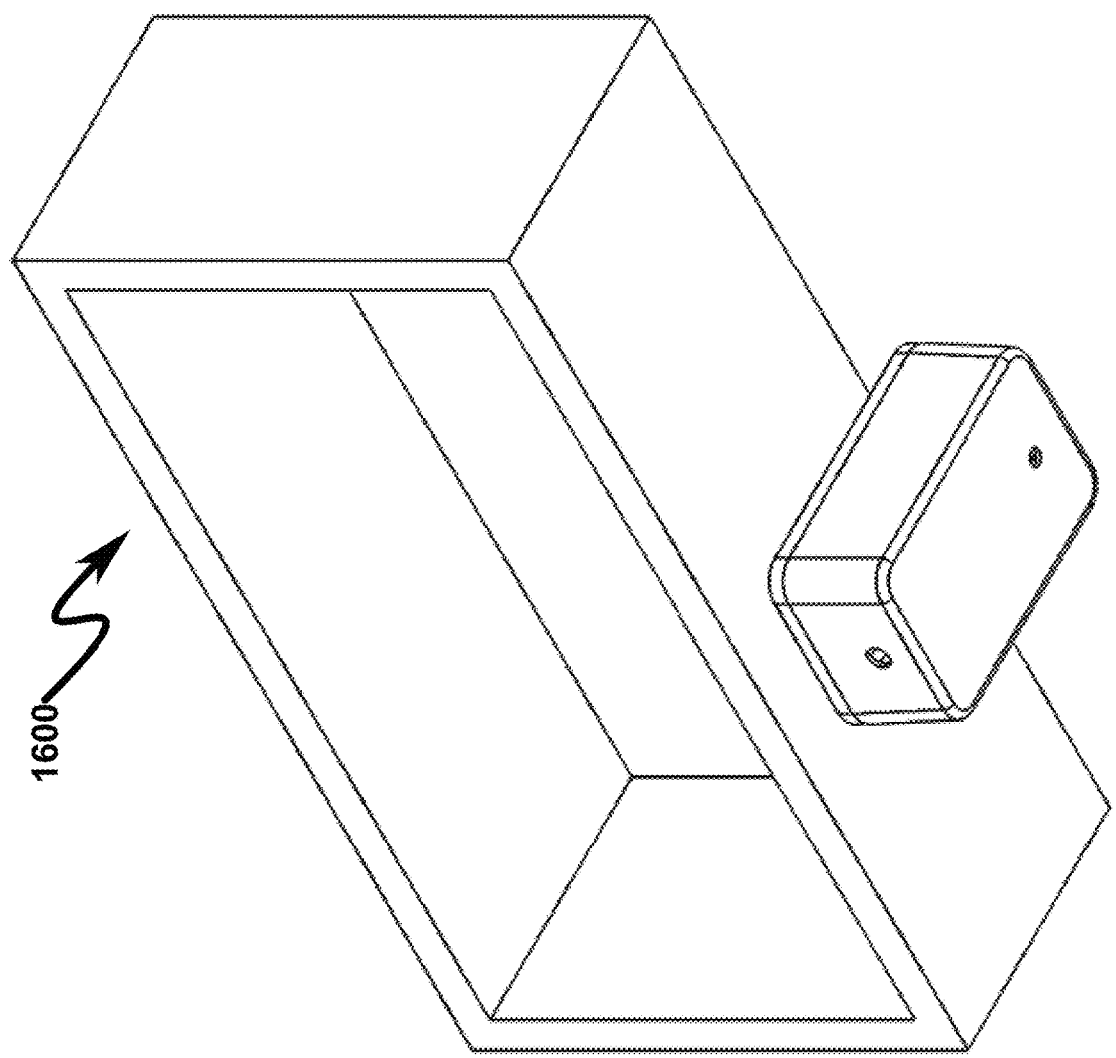
FIG. 16 illustrates a bottom left front perspective view of an air plenum configured with a preferred exemplary embodiment of a present invention air flow sensor.

Placement of the mechanical air flow sensor (AFS) depicted in FIG. 5 (0500)-FIG. 8 (0800) is typically accomplished as generally depicted in FIG. 9 (0900)-FIG. 16 (1600) wherein the AFS (0923) is inserted into an air duct (0910) so that air flow is directed into the AFS input port (AIP) (0923).

UVL Placement (1700)-(2400)

Figure 17:
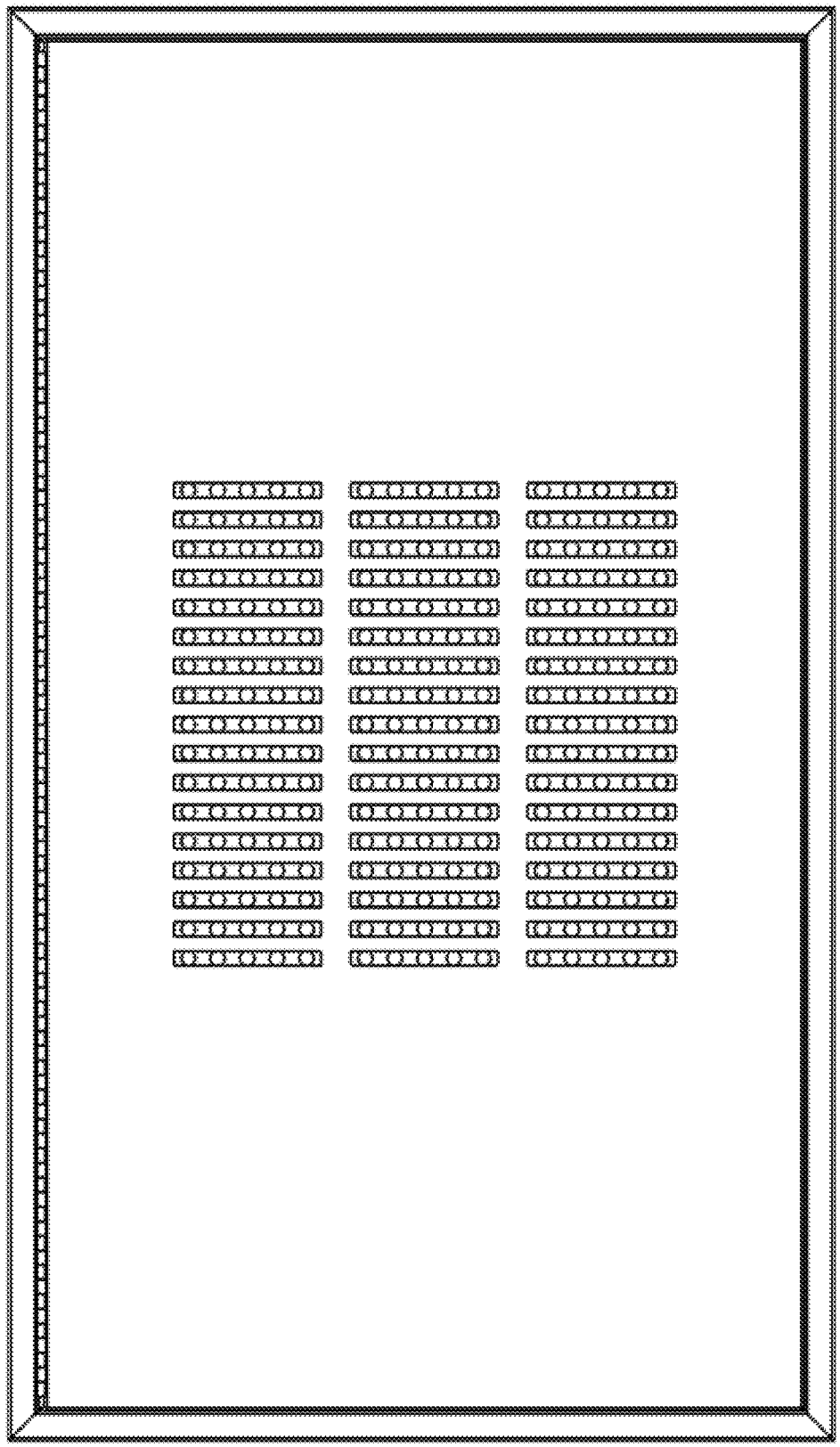
FIG. 17 illustrates a top view of an air intake grill/filter/door assembly augmented with one preferred exemplary embodiment of the present invention.
Figure 18:
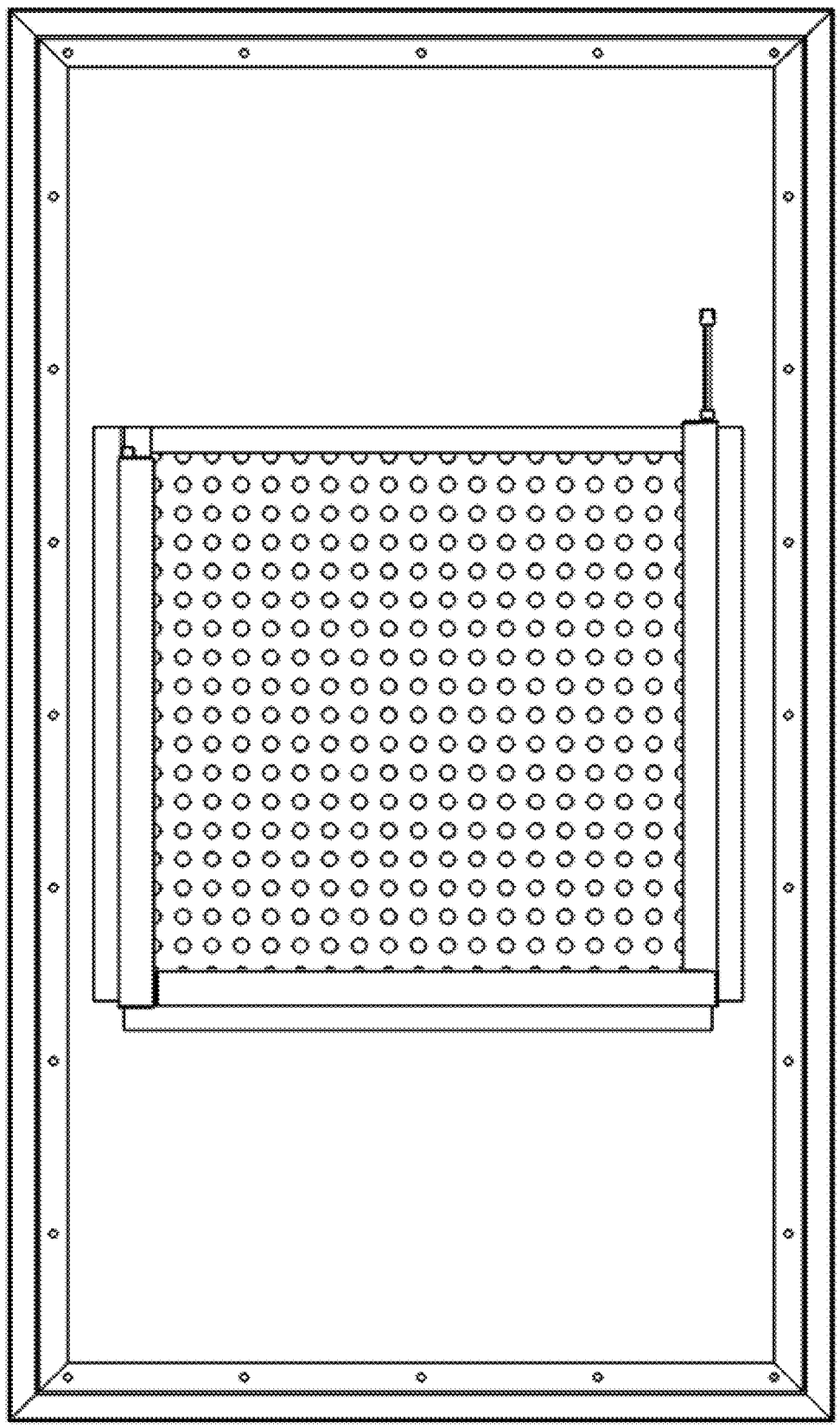
FIG. 18 illustrates a bottom view of an air intake grill/filter/door assembly augmented with one preferred exemplary embodiment of the present invention.
Figure 19:
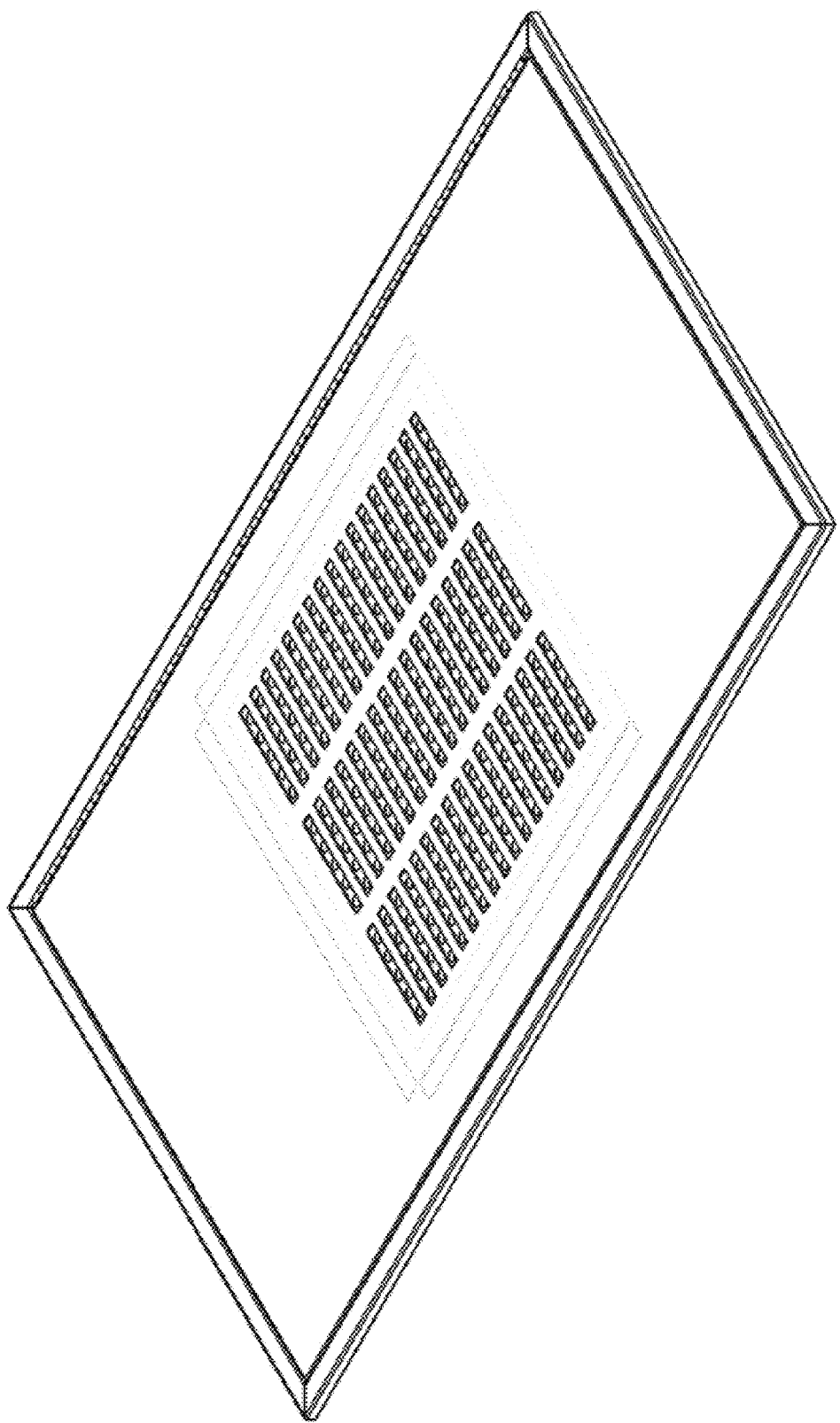
FIG. 19 illustrates a top front perspective view of an air intake grill/filter/door assembly augmented with one preferred exemplary embodiment of the present invention (access door closed)
Figure 20:
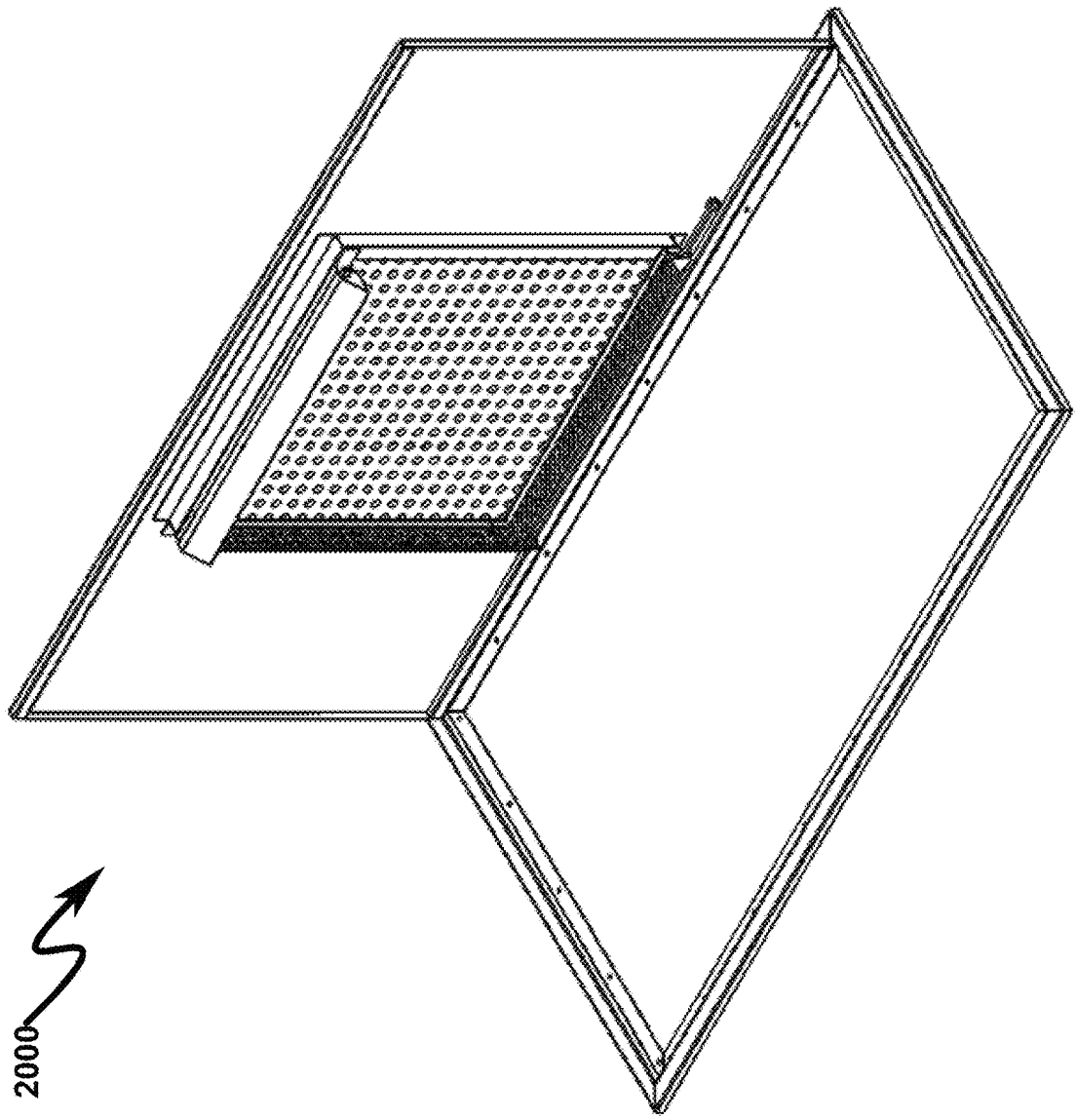
FIG. 20 illustrates a top front perspective view of an air intake grill/filter/door assembly augmented with one preferred exemplary embodiment of the present invention (access door open)
Figure 21:
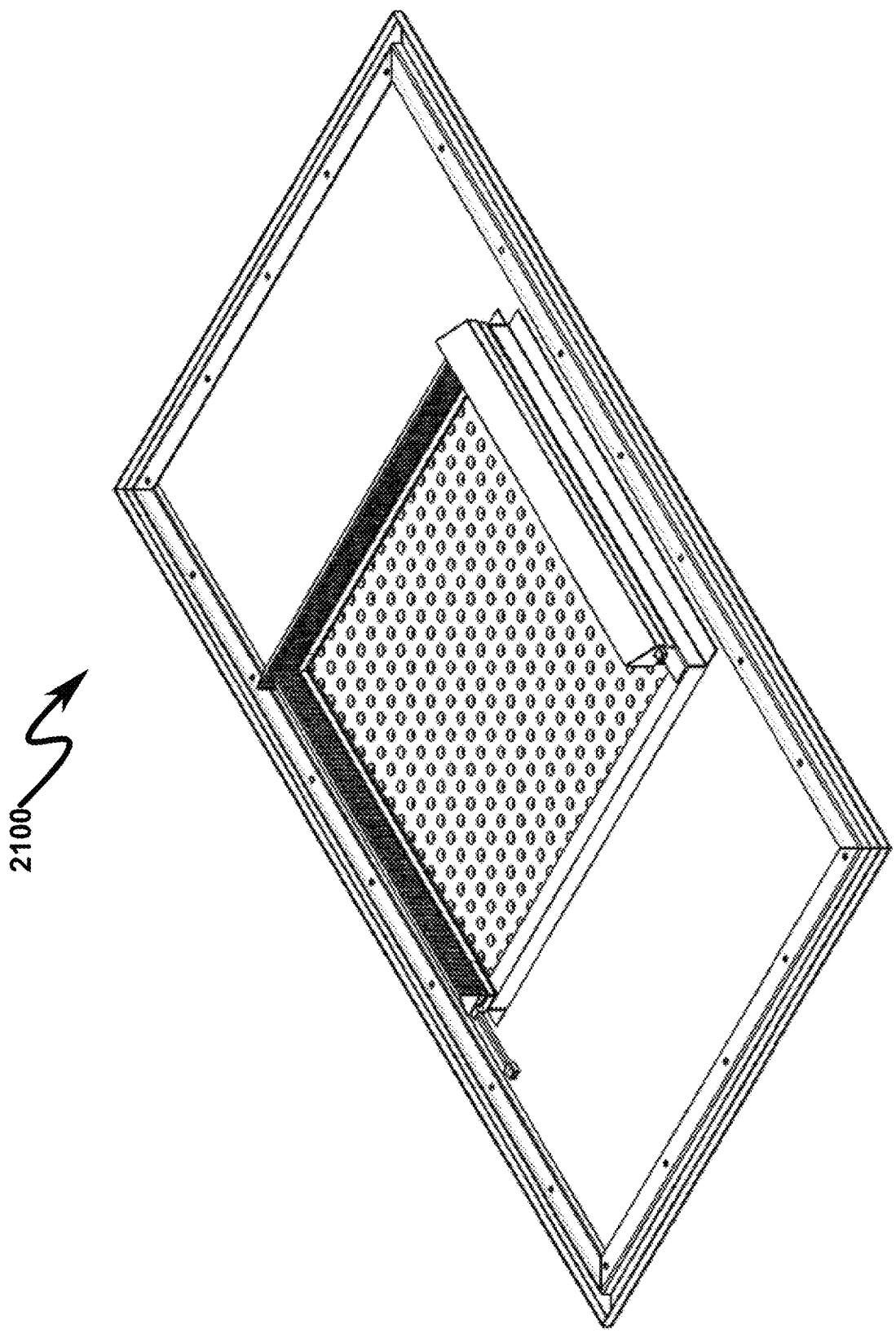
FIG. 21 illustrates a bottom right front perspective view of an air intake grill/filter/door assembly augmented with one preferred exemplary embodiment of the present invention.
Figure 22:
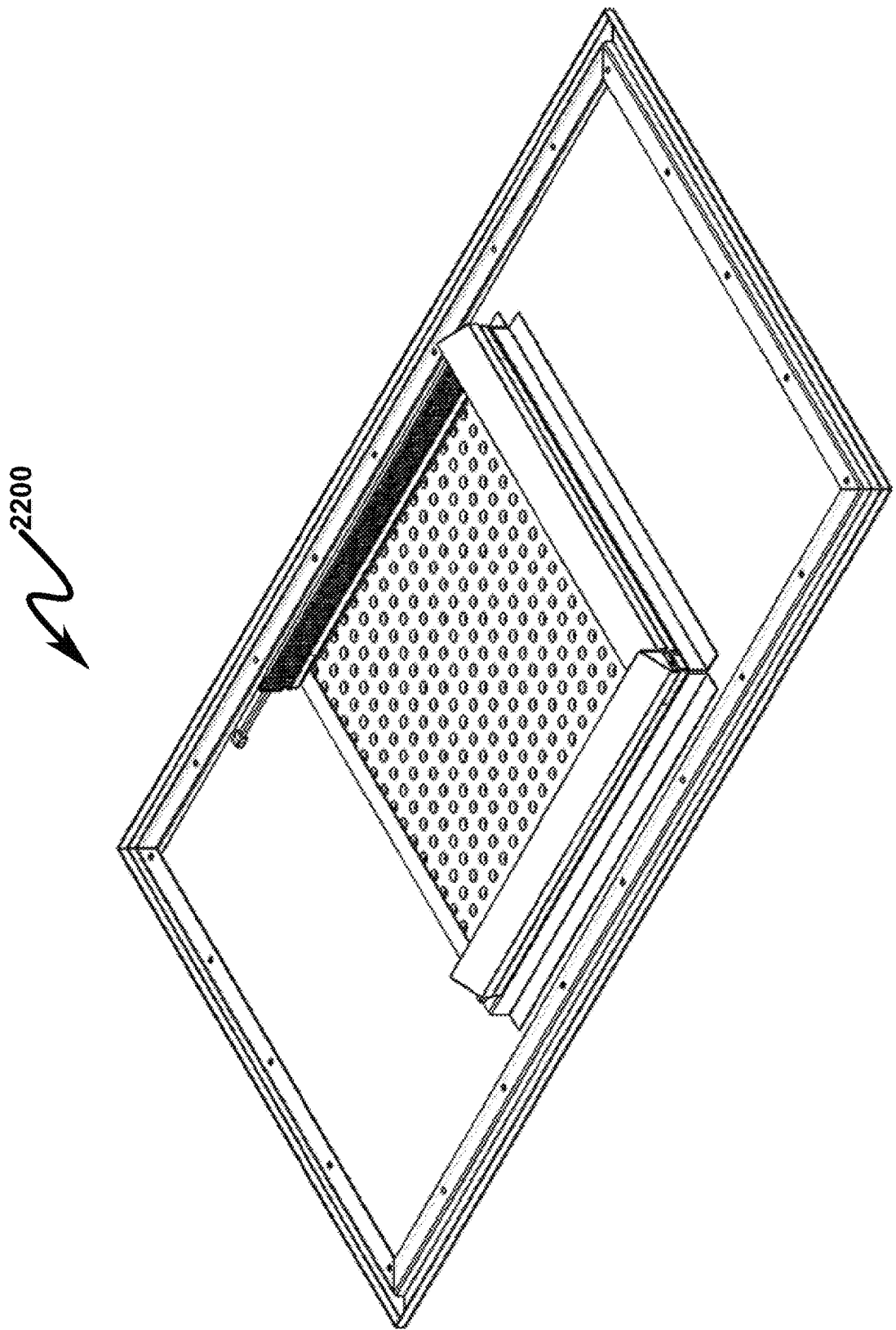
FIG. 22 illustrates a bottom right rear perspective view of an air intake grill/filter/door assembly augmented with one preferred exemplary embodiment of the present invention.
Figure 23:
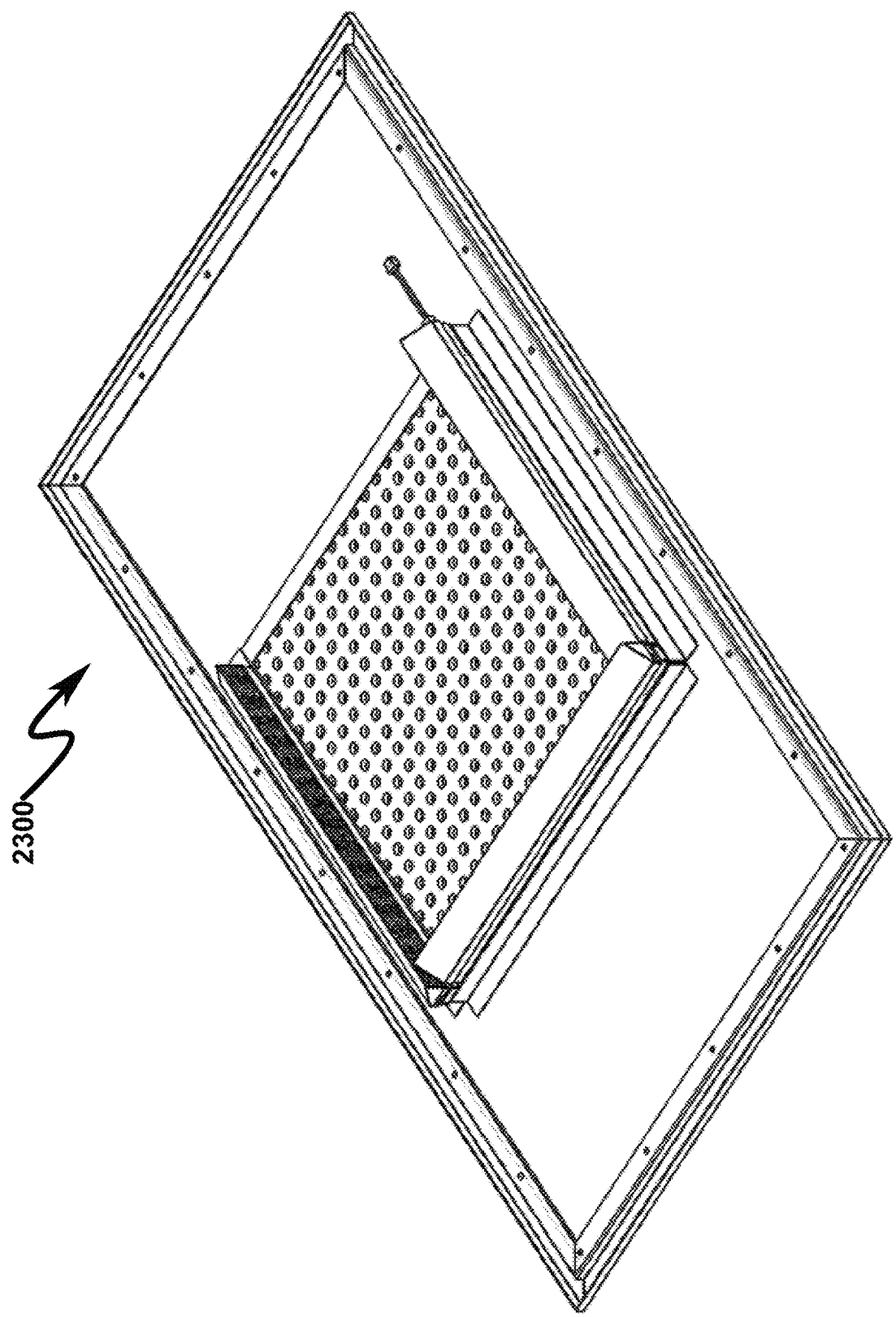
FIG. 23 illustrates a bottom left rear perspective view of an air intake grill/filter/door assembly augmented with one preferred exemplary embodiment of the present invention.
Figure 24:
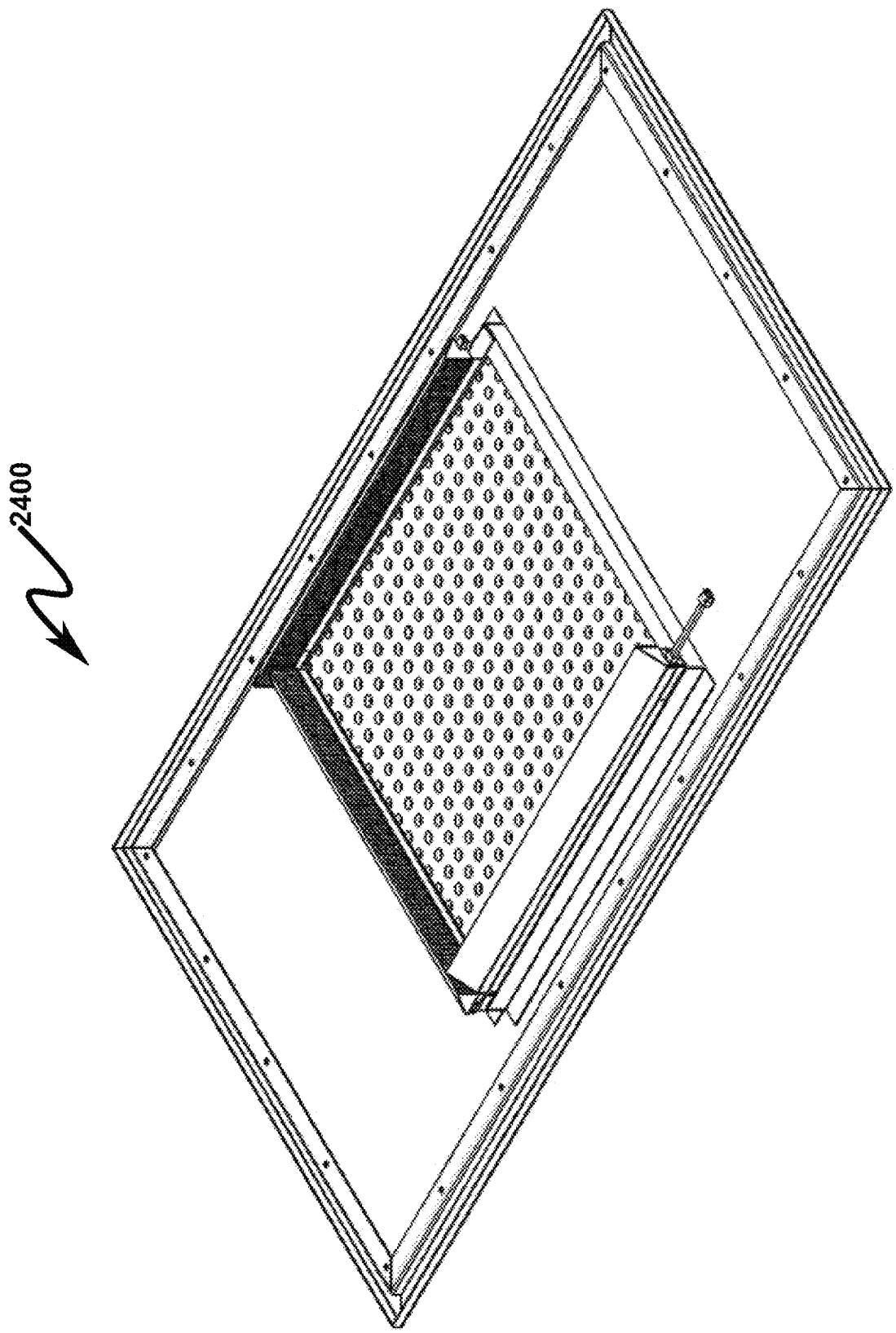
FIG. 24 illustrates a bottom left front perspective view of an air intake grill/filter/door assembly augmented with one preferred exemplary embodiment of the present invention.

As generally depicted in FIG. 17 (1700)-FIG. 24 (2400), UVL placement may in some circumstances be associated with a HVAC access door or other HVAC duct. Here it is shown mating to the retention frame associated with an air filter in the access door of a HVAC system. Using magnetic coupling as depicted in these drawings allows the UVL to be retrofit to existing HVAC systems without the need for the use of any mechanical modification of the HVAC system and eliminates that need for screws or other penetrating fasteners that may cause leaks in the HVAC system air flow.

UVL Construction (2500)-(3200)

Figure 25:
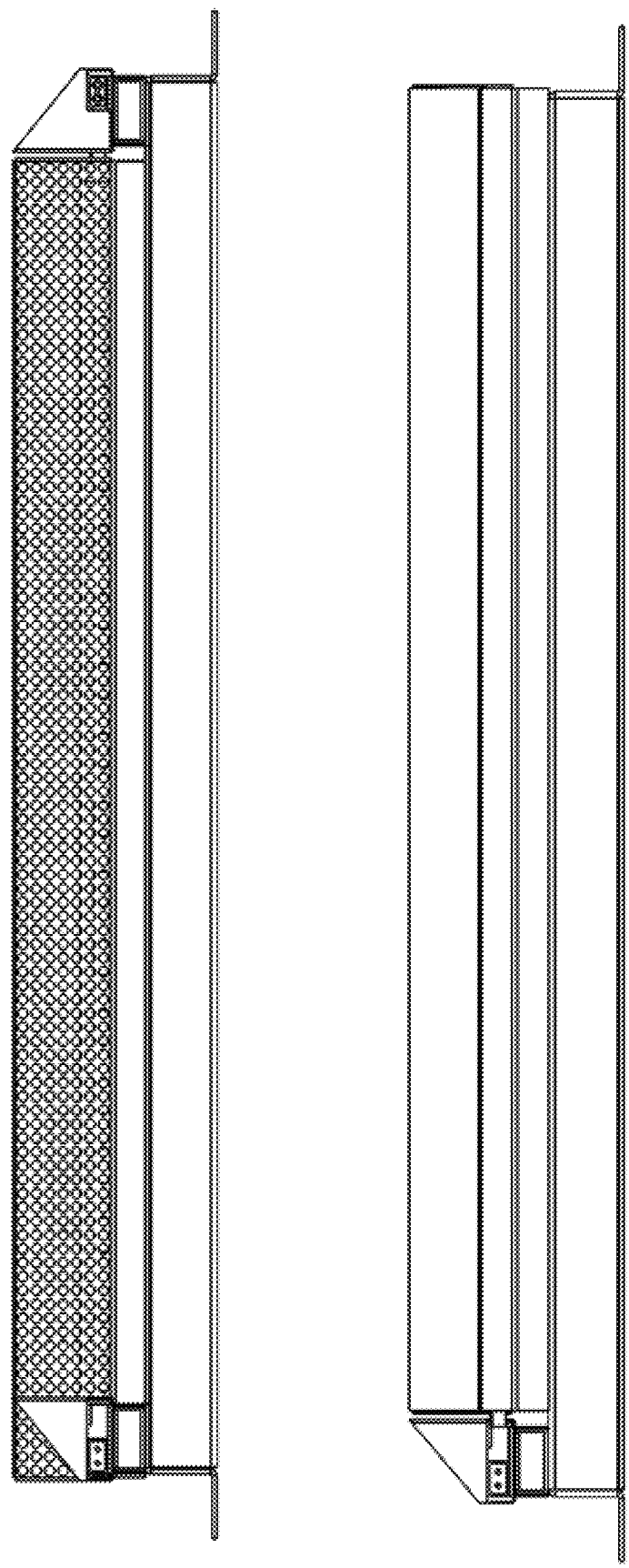
FIG. 25 illustrates front and rear views of a preferred exemplary system invention embodiment incorporating a filter containment frame (FCF) augmented with a modular UV-C lamp (MUL)
Figure 26:
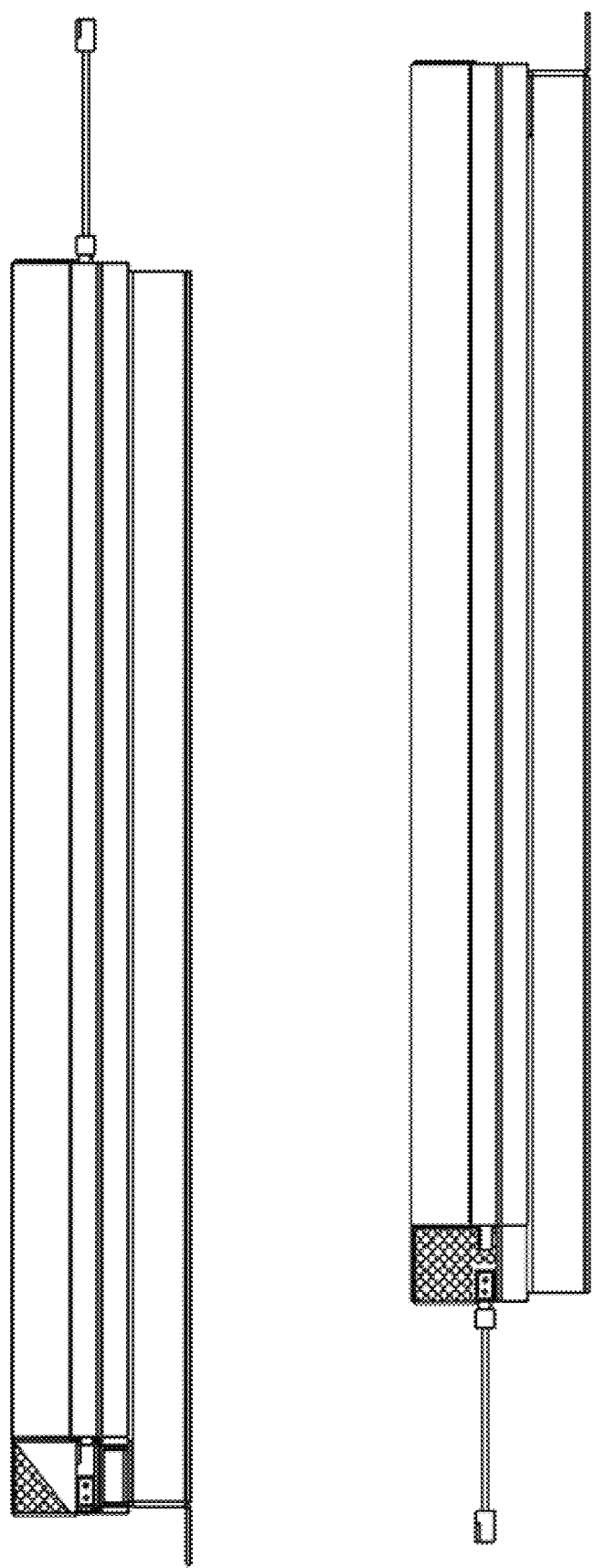
FIG. 26 illustrates left and right side views of a preferred exemplary system invention embodiment incorporating a filter containment frame (FCF) augmented with a modular UV-C lamp (MUL)
Figure 27:
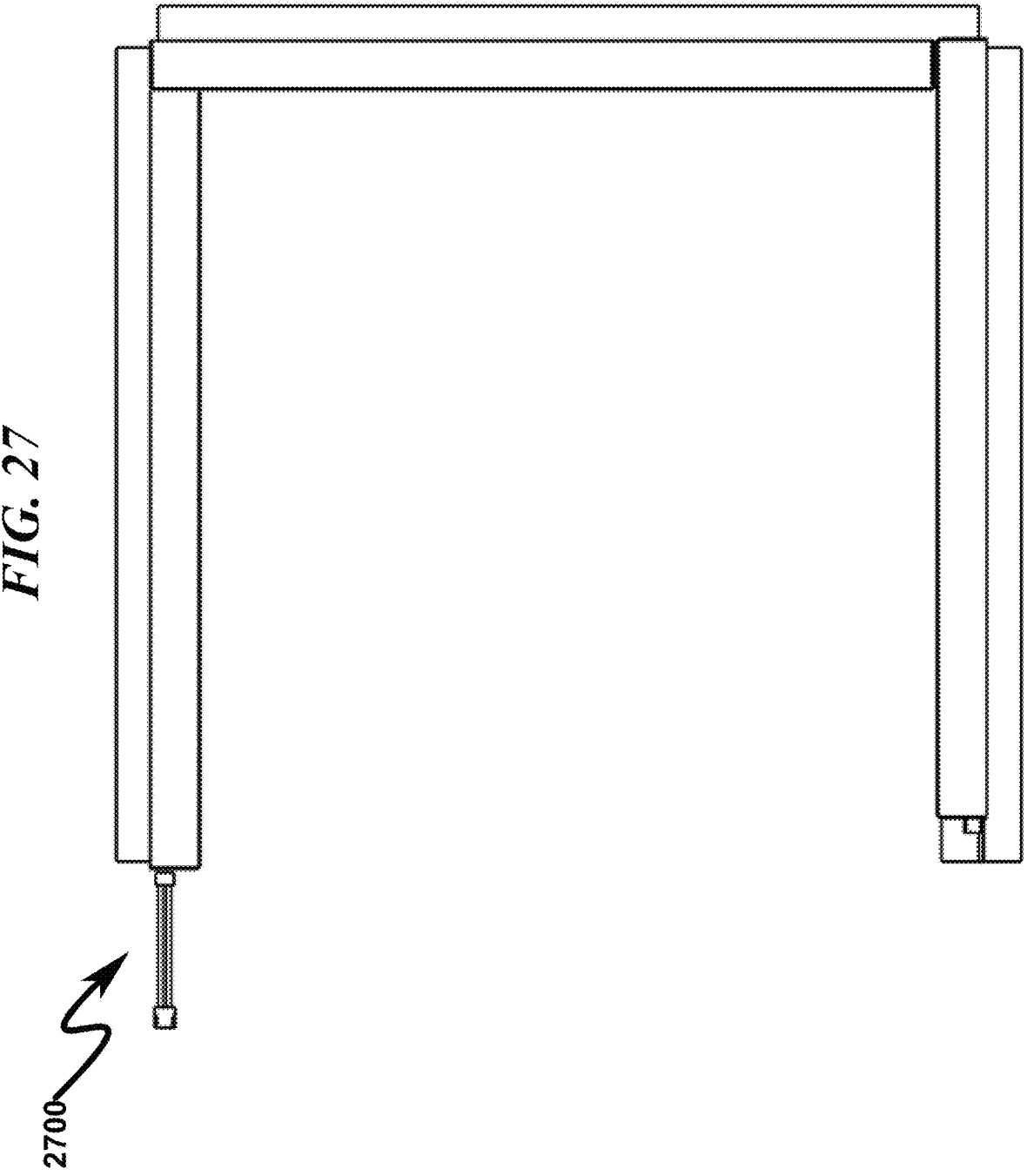
FIG. 27 illustrates a top view of a preferred exemplary system invention embodiment incorporating a filter containment frame (FCF) augmented with a modular UV-C lamp (MUL)
Figure 28:
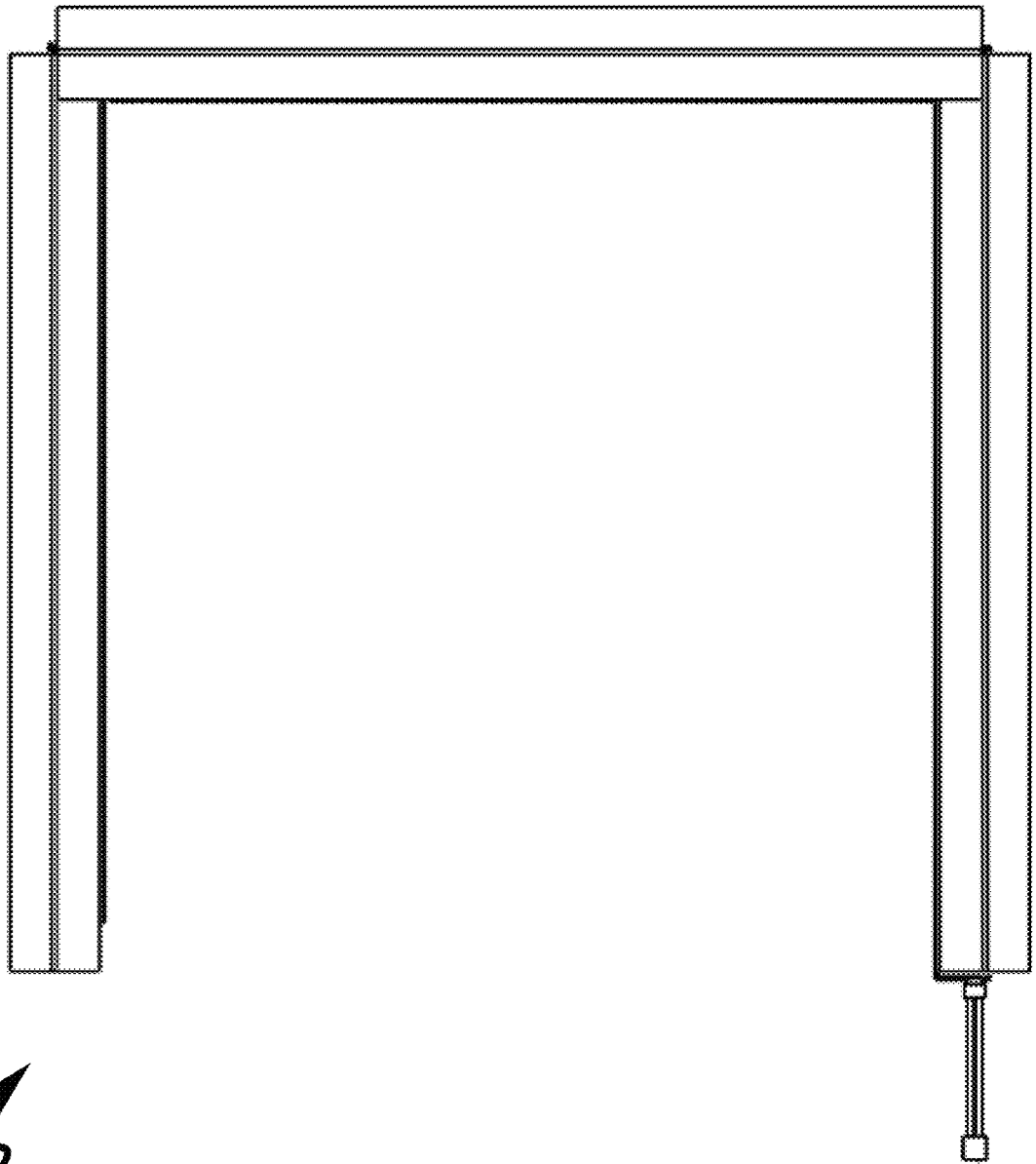
FIG. 28 illustrates a bottom view of a preferred exemplary system invention embodiment incorporating a filter containment frame (FCF) augmented with a modular UV-C lamp (MUL)
Figure 29:
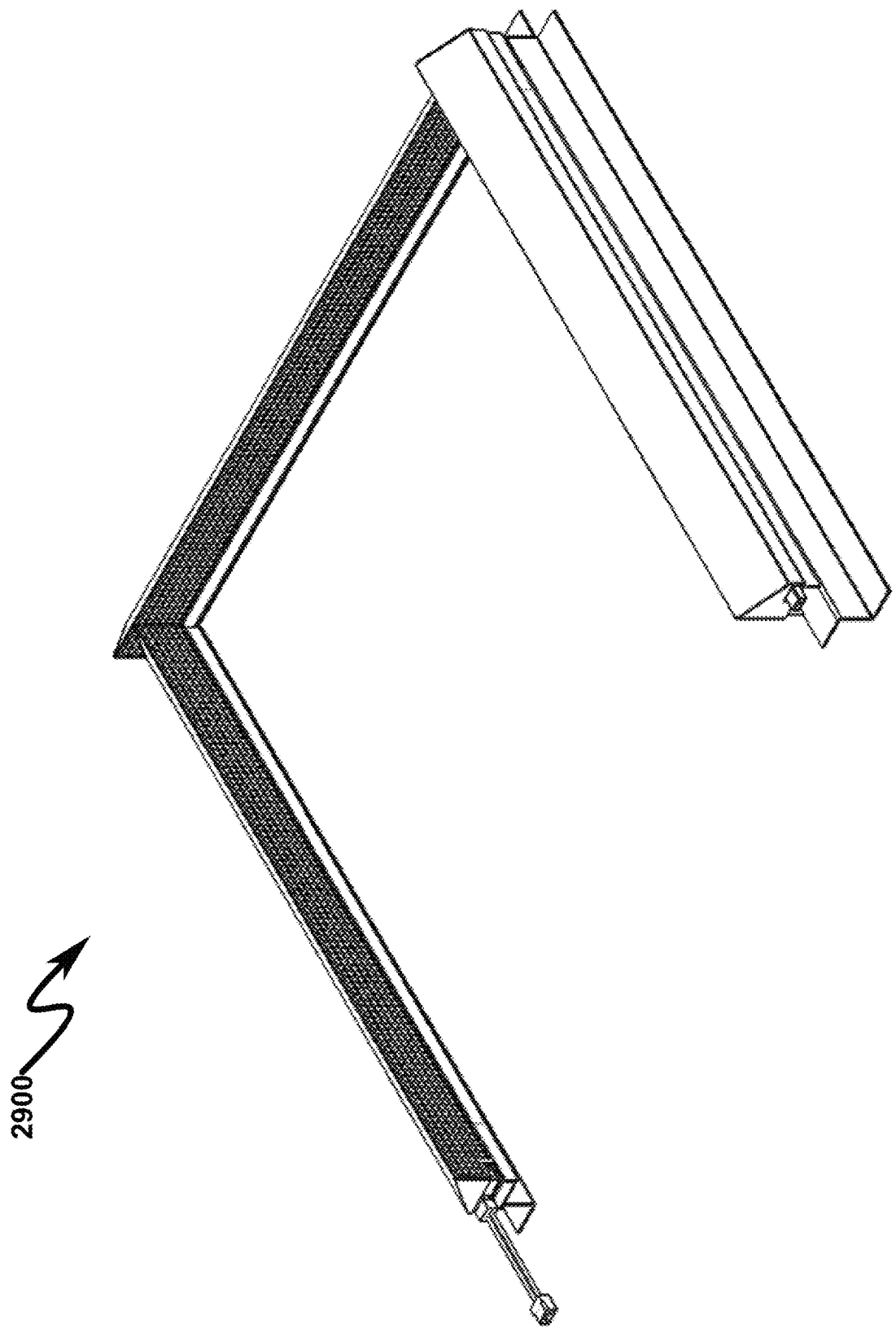
FIG. 29 illustrates a top front right side perspective view of a preferred exemplary system invention embodiment incorporating a filter containment frame (FCF) augmented with a modular UV-C lamp (MUL)
Figure 30:
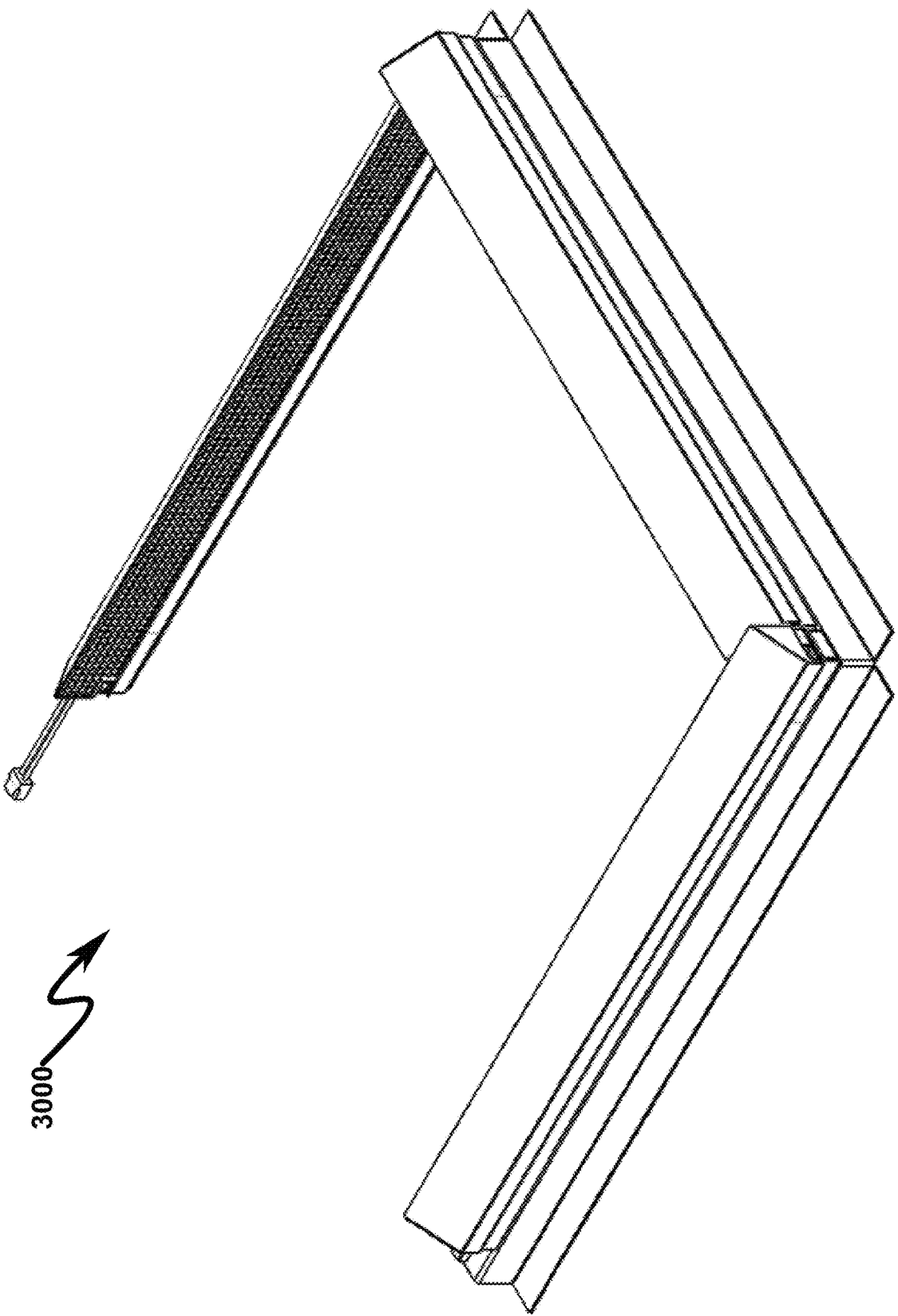
FIG. 30 illustrates a top rear right side perspective view of a preferred exemplary system invention embodiment incorporating a filter containment frame (FCF) augmented with a modular UV-C lamp (MUL)
Figure 31:
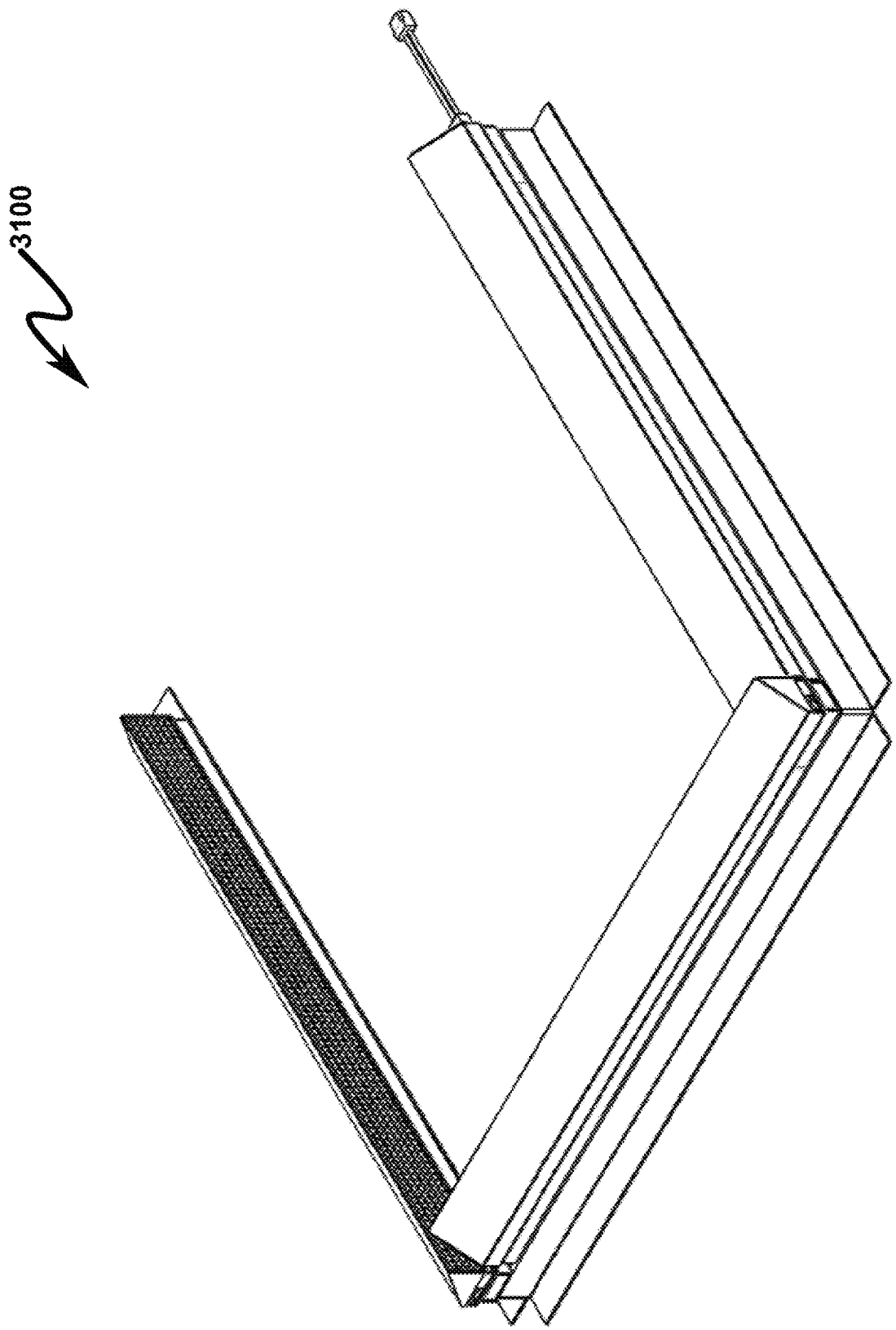
FIG. 31 illustrates a top rear left side perspective view of a preferred exemplary system invention embodiment incorporating a filter containment frame (FCF) augmented with a modular UV-C lamp (MUL)
Figure 32:
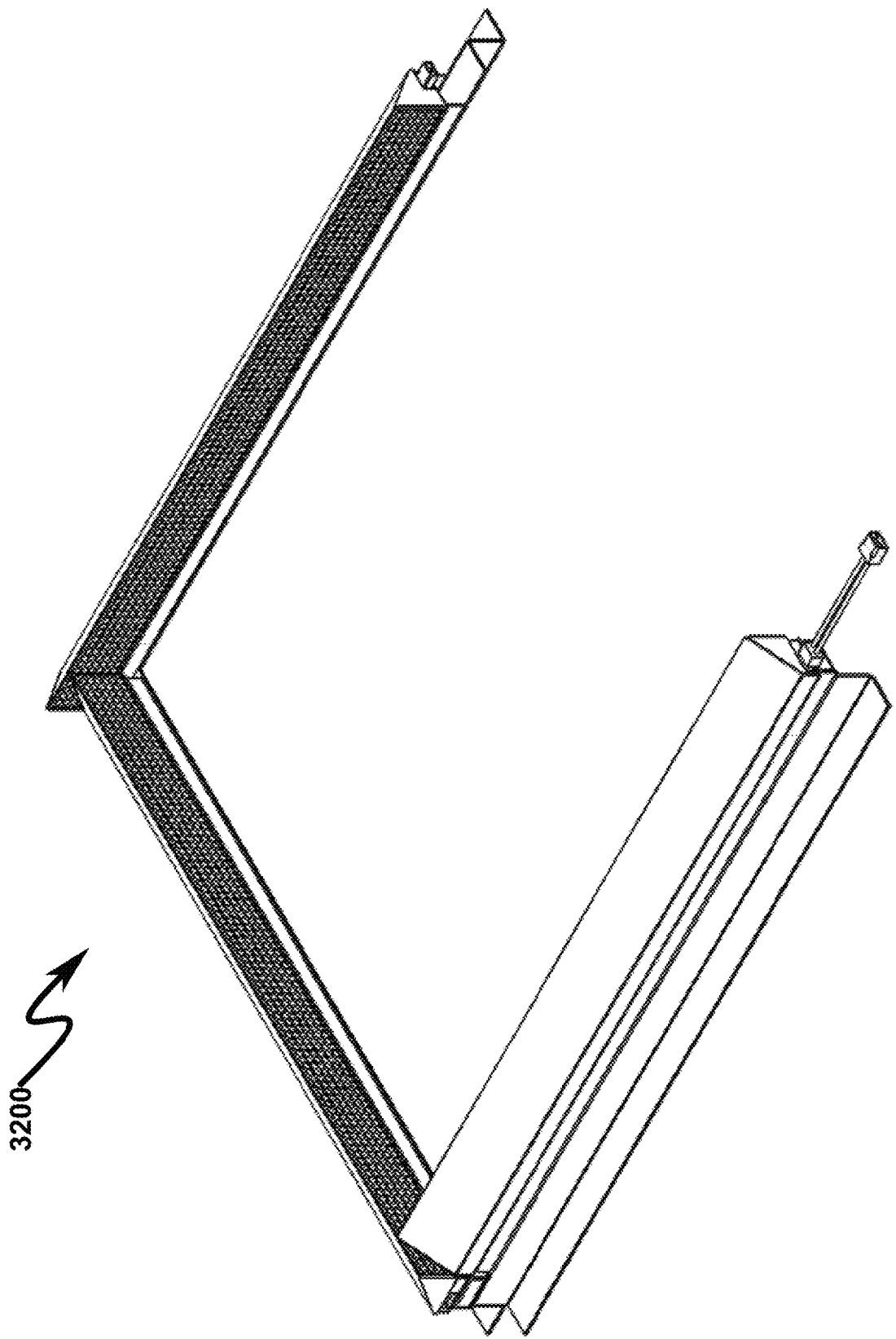
FIG. 32 illustrates a top front left side perspective view of a preferred exemplary system invention embodiment incorporating a filter containment frame (FCF) augmented with a modular UV-C lamp (MUL)

As generally depicted in FIG. 25 (2500)-FIG. 32 (3200), the UVL may take the form of a modular assembly that may be mated together using connectors allowing a linear or right-angle configuration. As depicted in these drawings, the right-angle configuration is shown wherein the right-angle power input from one UVL is connected to the corresponding output power port of another UVL allowing a U-shaped bracket to be constructed that may magnetically mate to the metal bracket that retains the air filter in the HVAC duct or service door.

UVL LED Detail (3300)-(4000)

Figure 33:
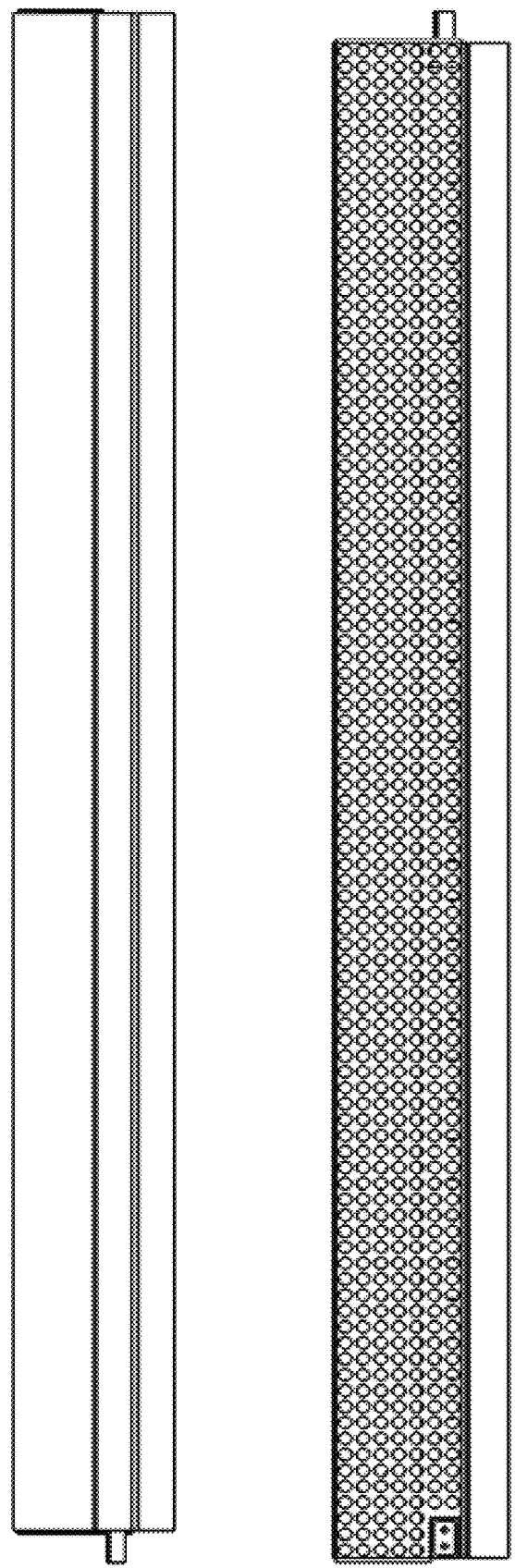
FIG. 33 illustrates front and rear views of a preferred exemplary system invention embodiment modular UV-C LED lamp (MUL)
Figure 34:
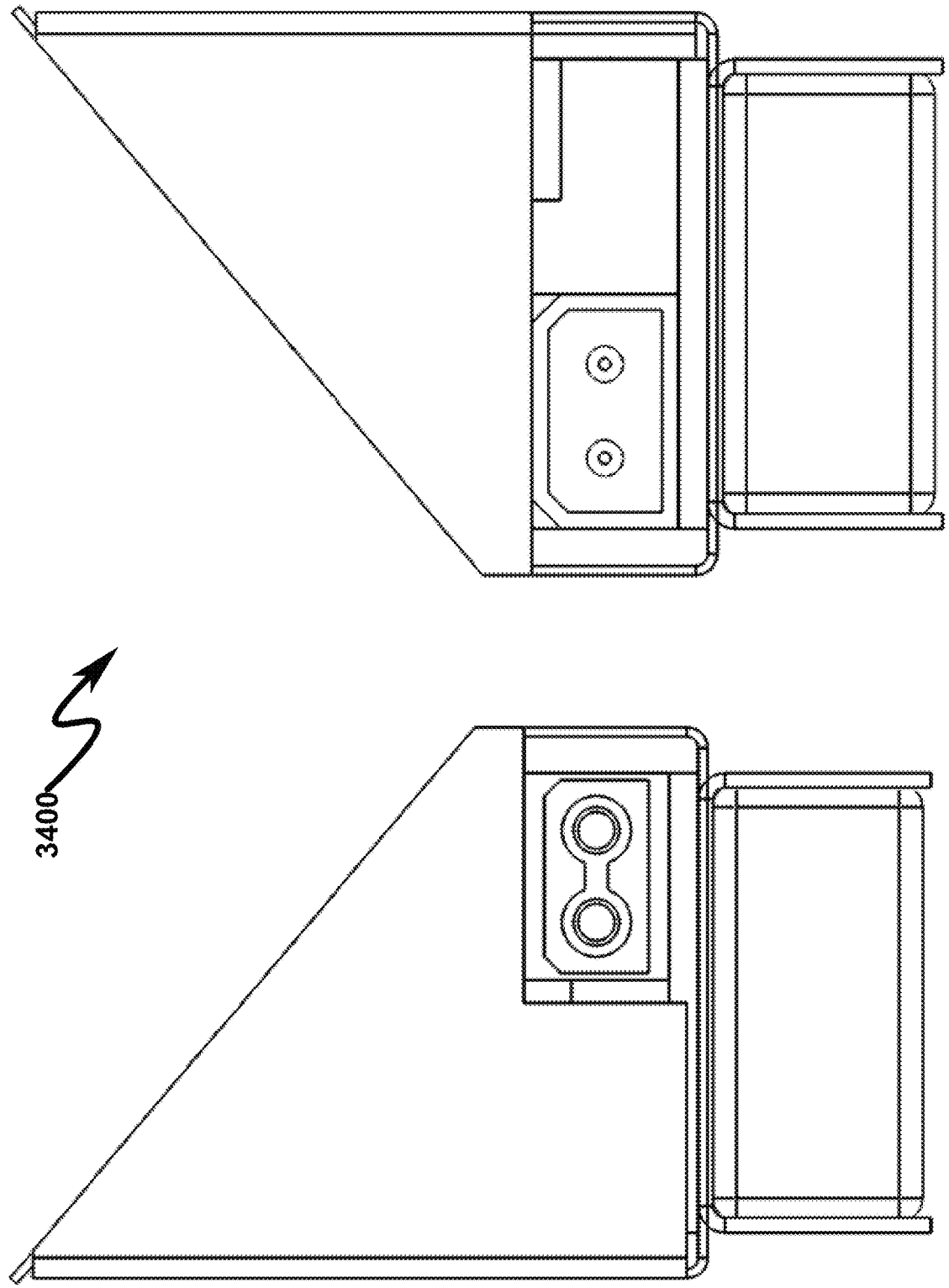
FIG. 34 illustrates left and right side views of a preferred exemplary system invention embodiment modular UV-C LED lamp (MUL)
Figure 35:
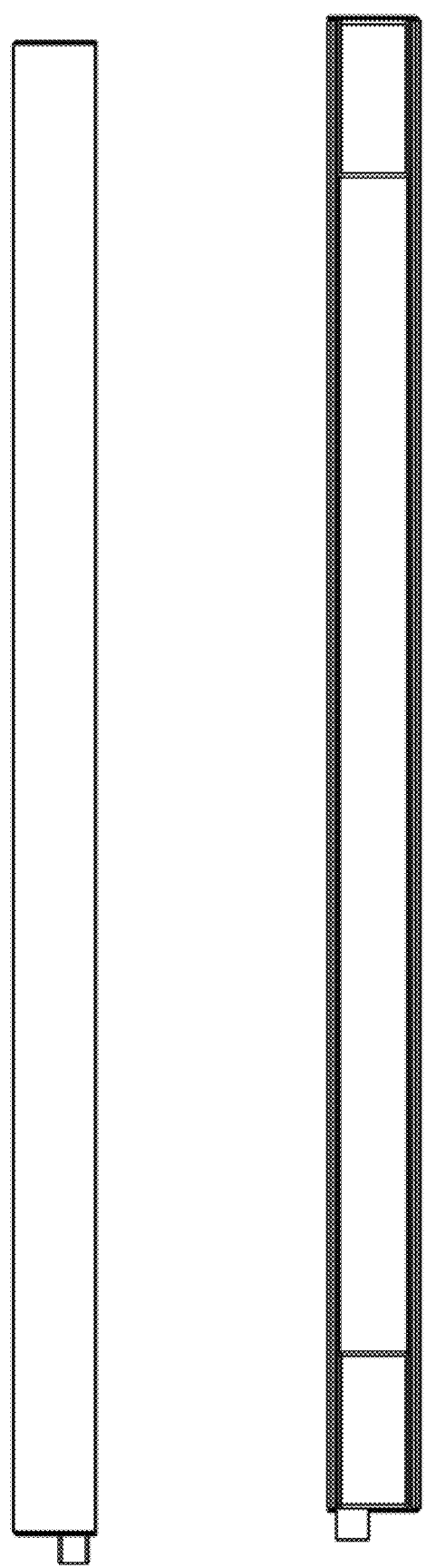
FIG. 35 illustrates top and bottom views of a preferred exemplary system invention embodiment modular UV-C LED lamp (MUL)
Figure 36:
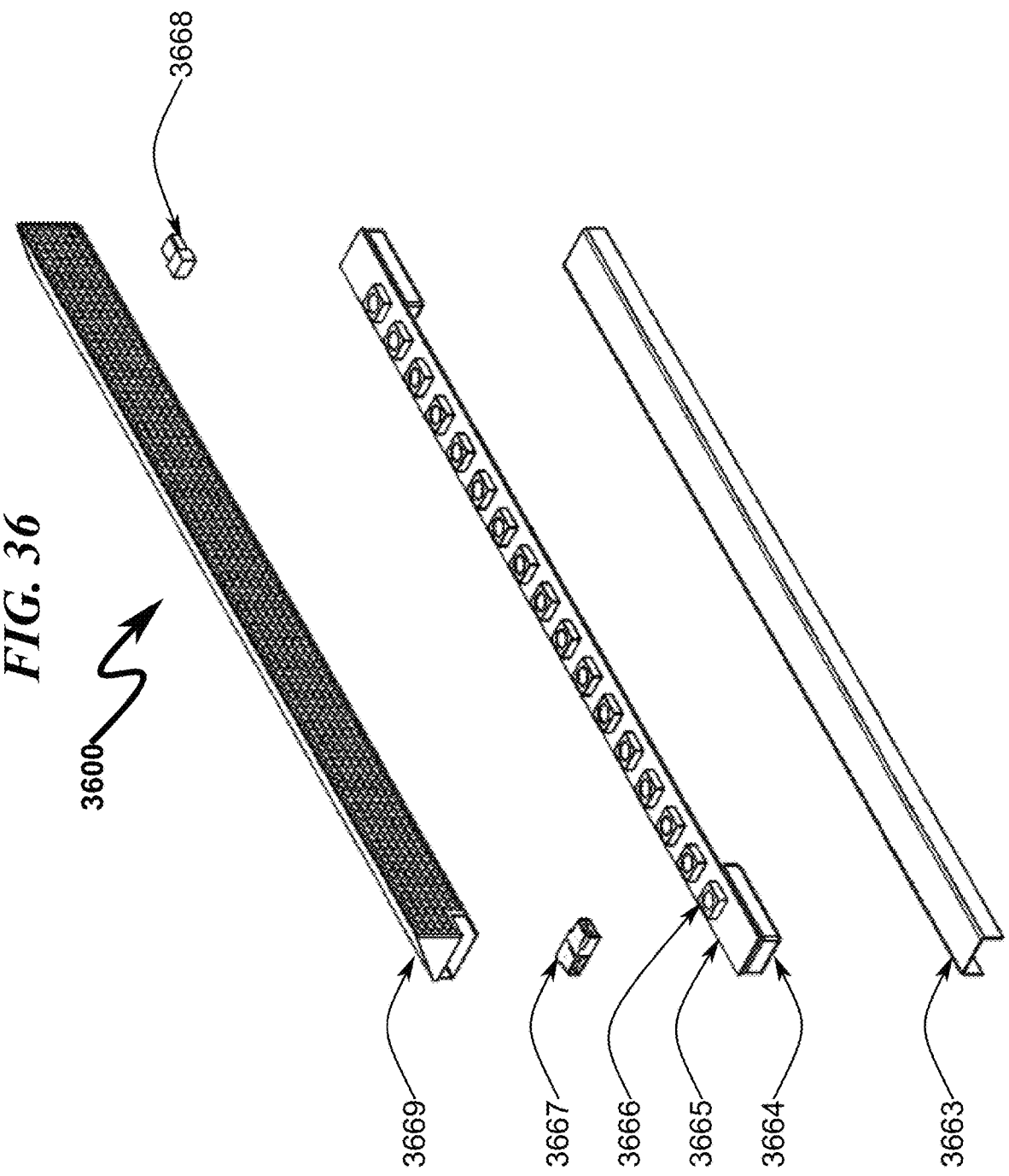
FIG. 36 illustrates an assembly perspective view of a preferred exemplary system invention embodiment modular UV-C LED lamp (MUL) with and without perforated reflective shield (PRS)

As generally depicted in FIG. 33 (3300)-FIG. 36 (3600), the UVL may take the form of a modular assembly having a U-shaped base frame (3663) to which magnets (3664) are positioned for attachment to an air filter frame that exists within a plenum or other HVAC service door. A circuit board (3665) supports multiple UV-C LEDs (3666) and associated input power connectors (3667) and output power connector (3668). A reflective shield (3669) having a grill opening is configured to reflect UV-C light emitted from the UV-C LEDs (3666) towards the interior of the HVAC duct and thus concentrate the UV-C light towards air flow within the HVAC duct. The input power connectors (3667) and output power connector (3668) are configured to allow the UVL assembly to be daisy-chained in a linear fashion or to be daisy chained in a right-angle configuration as illustrated in FIG. 25 (2500)-FIG. 32 (3200).

Figure 37:
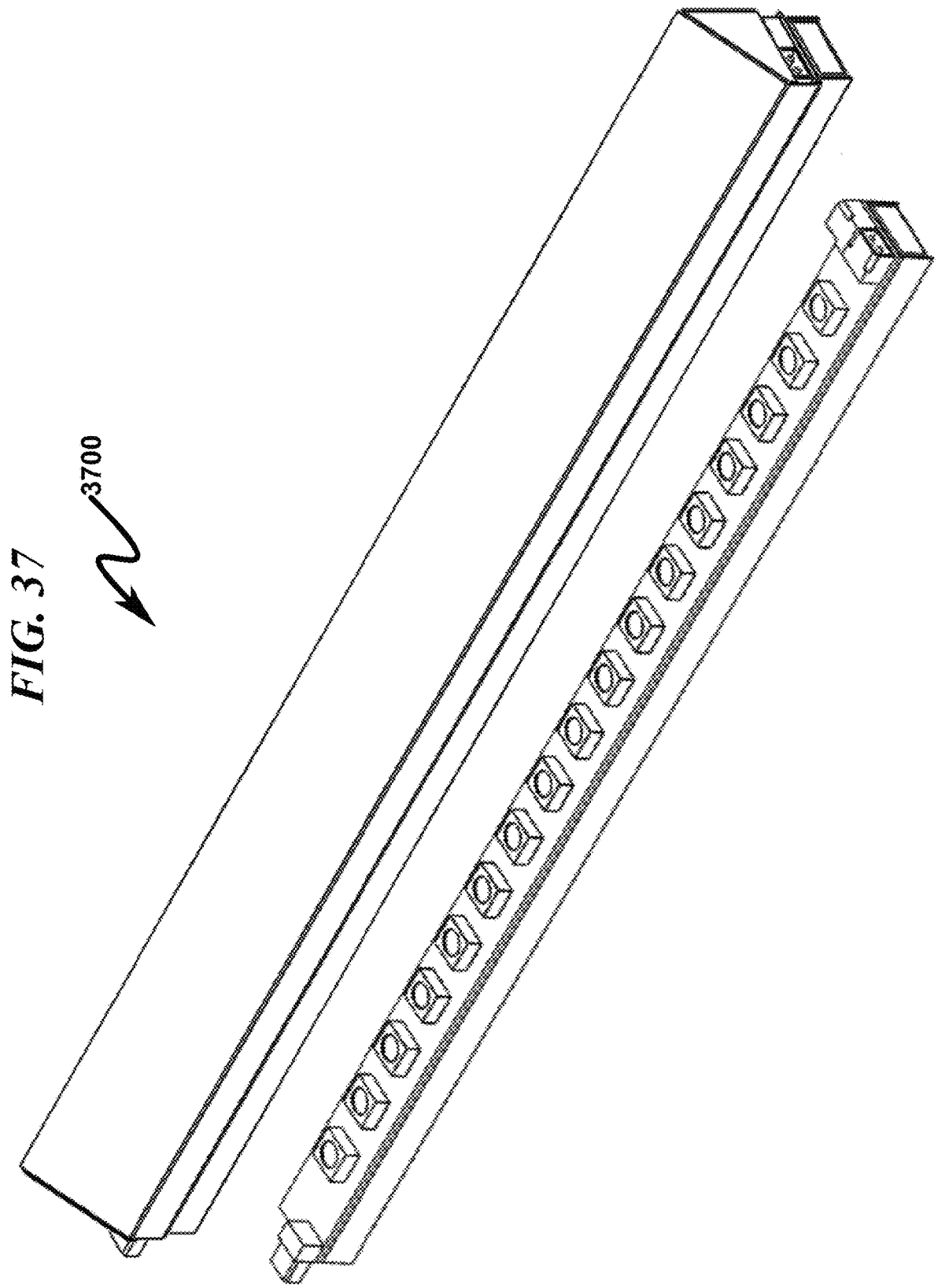
FIG. 37 illustrates top front right side perspective views of a preferred exemplary system invention embodiment modular UV-C LED lamp (MUL) with and without perforated reflective shield (PRS)
Figure 38:
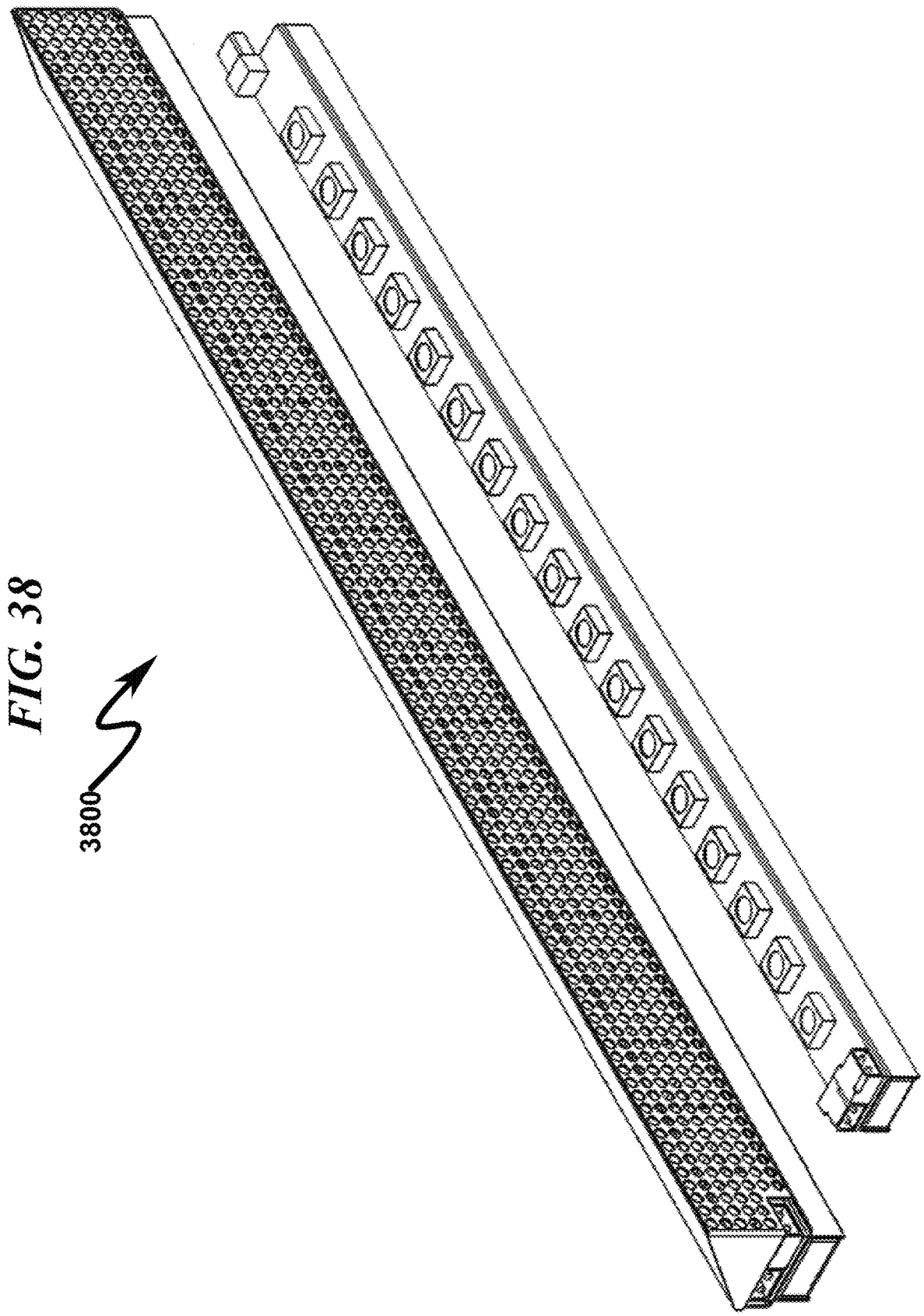
FIG. 38 illustrates top rear right side perspective views of a preferred exemplary system invention embodiment modular UV-C LED lamp (MUL) with and without perforated reflective shield (PRS)
Figure 39:
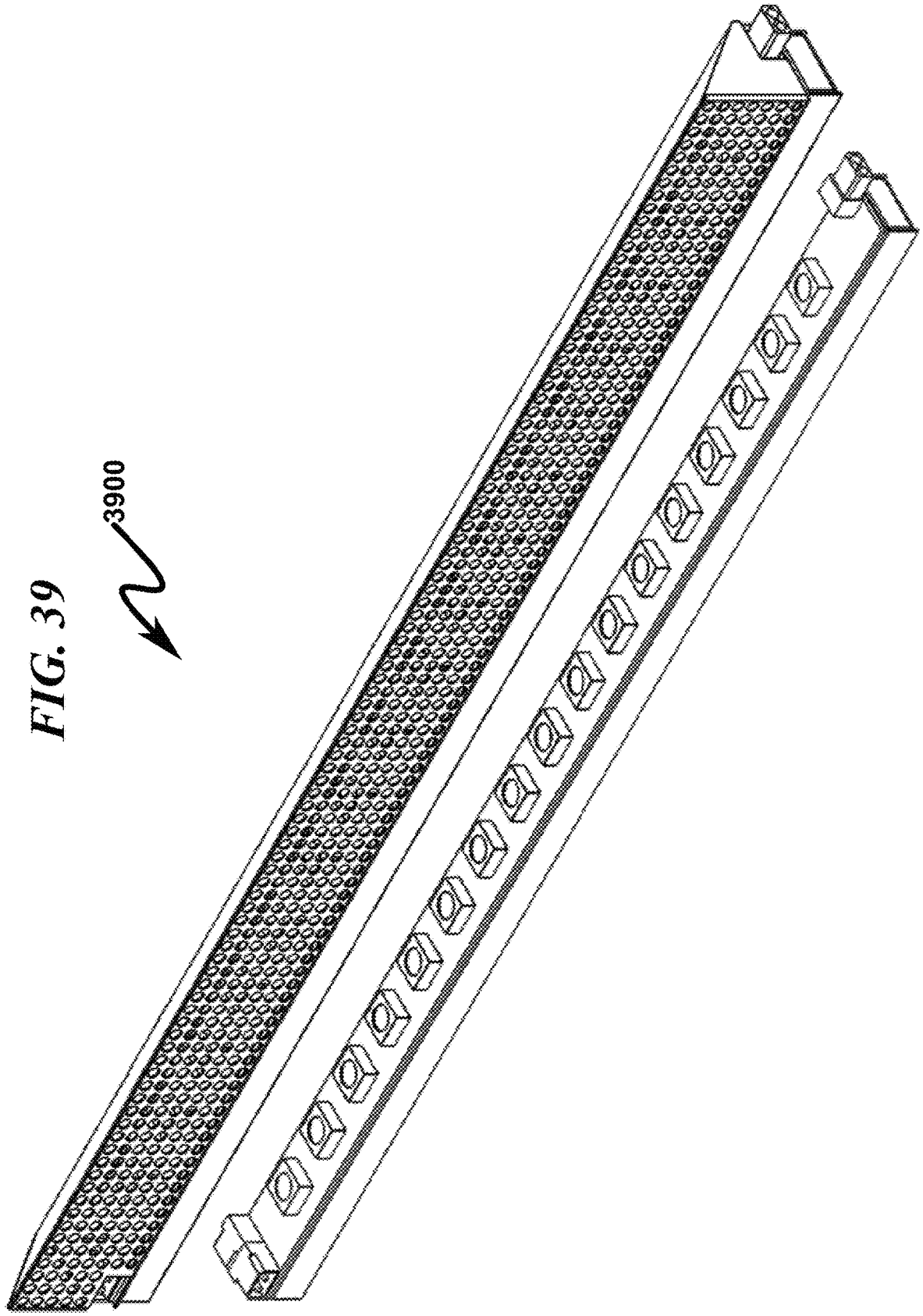
FIG. 39 illustrates top rear left side perspective views of a preferred exemplary system invention embodiment modular UV-C LED lamp (MUL) with and without perforated reflective shield (PRS)
Figure 40:
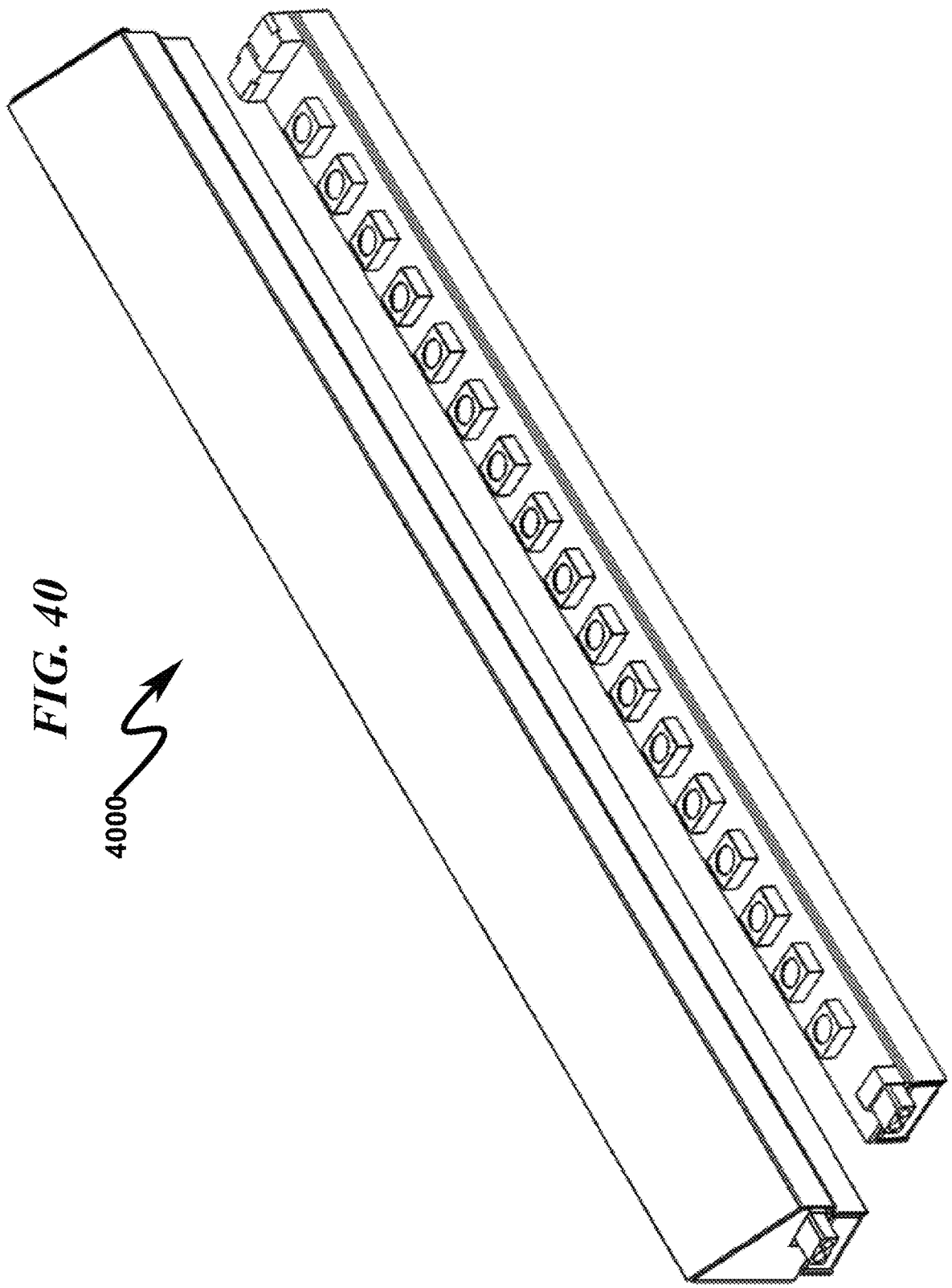
FIG. 40 illustrates top front left side perspective views of a preferred exemplary system invention embodiment modular UV-C LED lamp (MUL) with and without perforated reflective shield (PRS)

As generally depicted in FIG. 37 (3700)-FIG. 40 (4000), the UVL may take the form of one a printed circuit board comprising multiple UV-C LED displays. However, other configurations are also possible.

UVL Variants (4100)-(4800)

Figure 41:
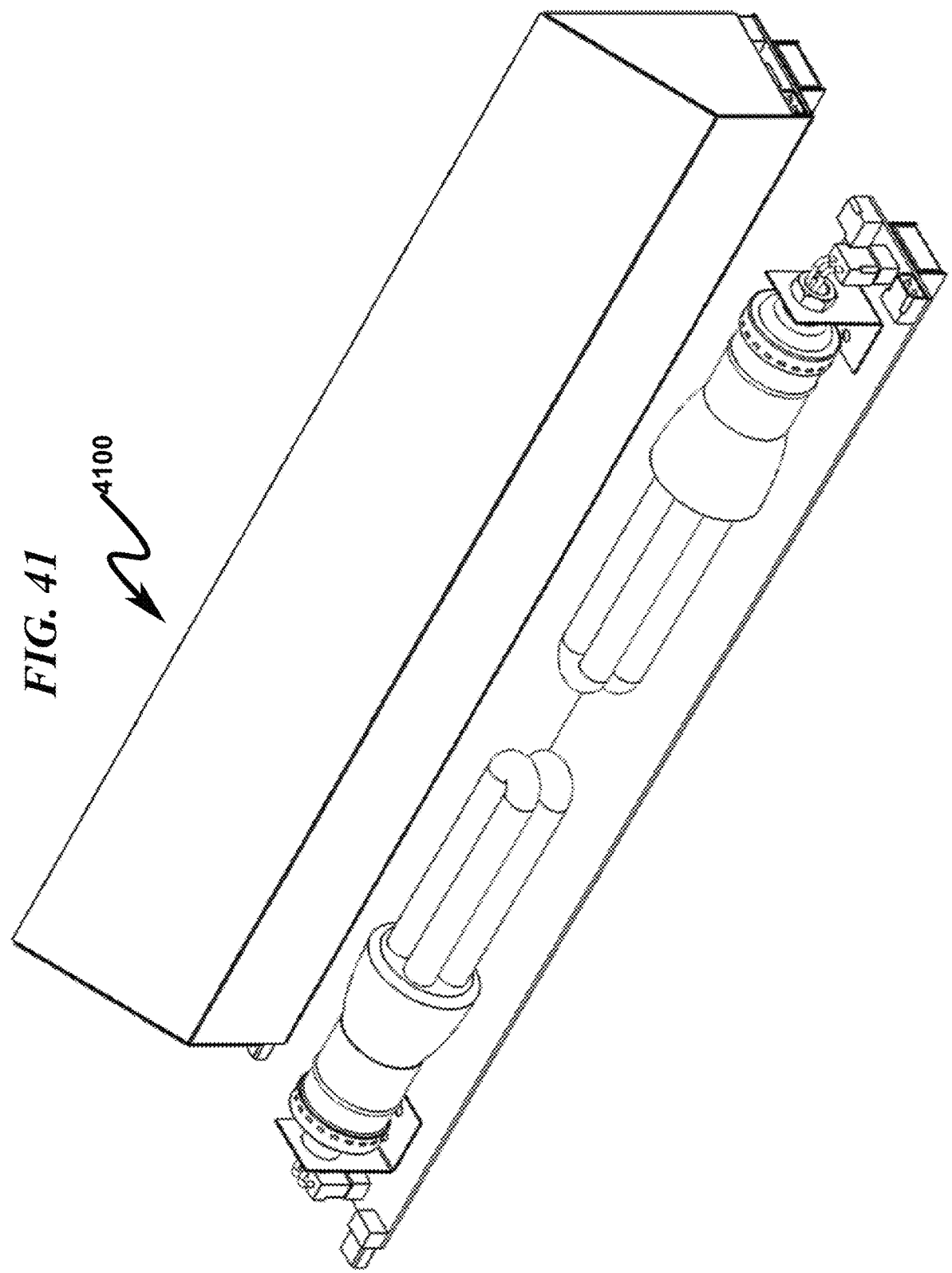
FIG. 41 illustrates top front right side perspective views of a preferred exemplary system invention embodiment modular UV-C bulb lamp (MUB) with and without perforated reflective shield (PRS)
Figure 42:
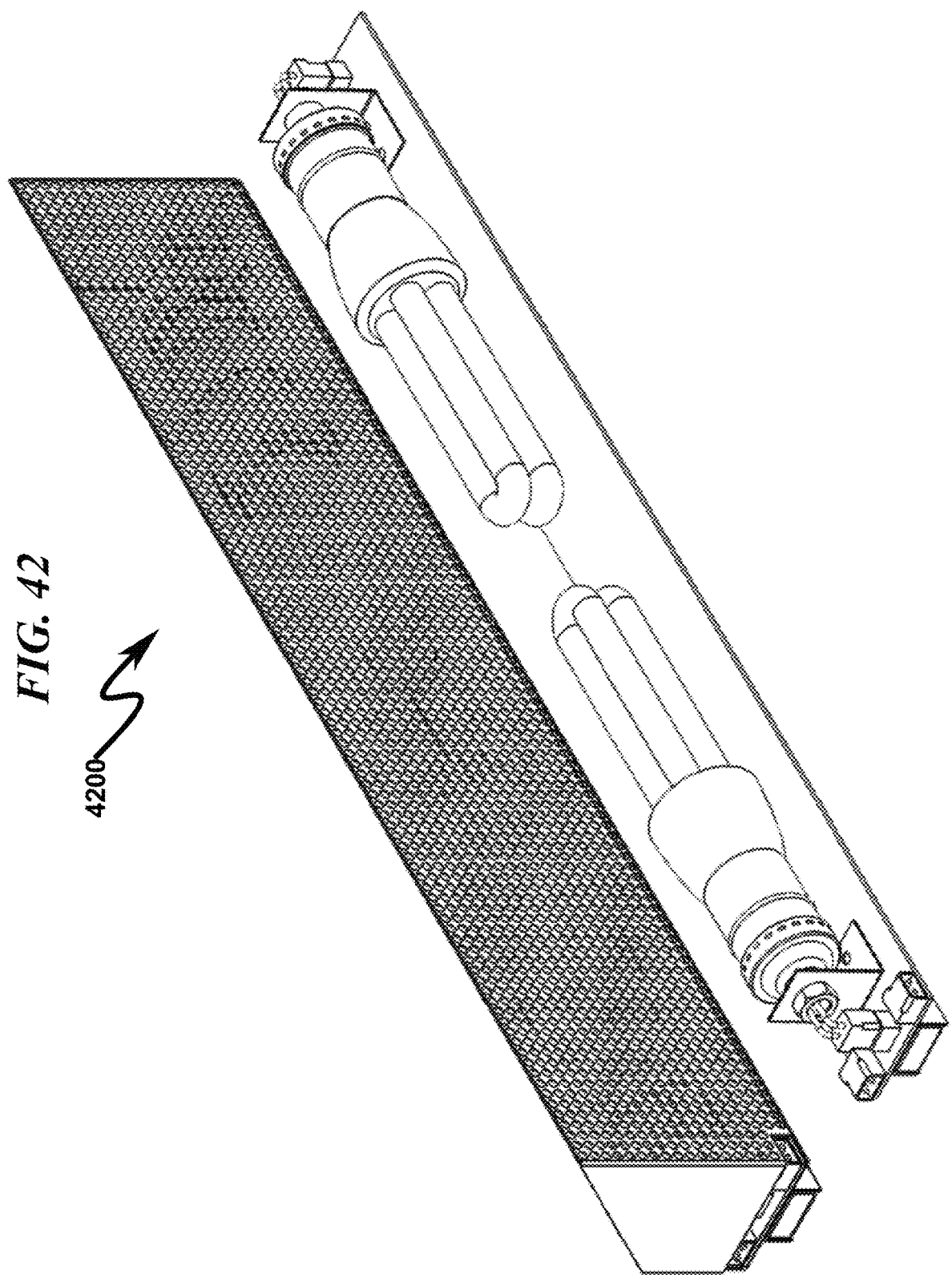
FIG. 42 illustrates top rear right side perspective views of a preferred exemplary system invention embodiment modular UV-C bulb lamp (MUB) with and without perforated reflective shield (PRS)
Figure 43:
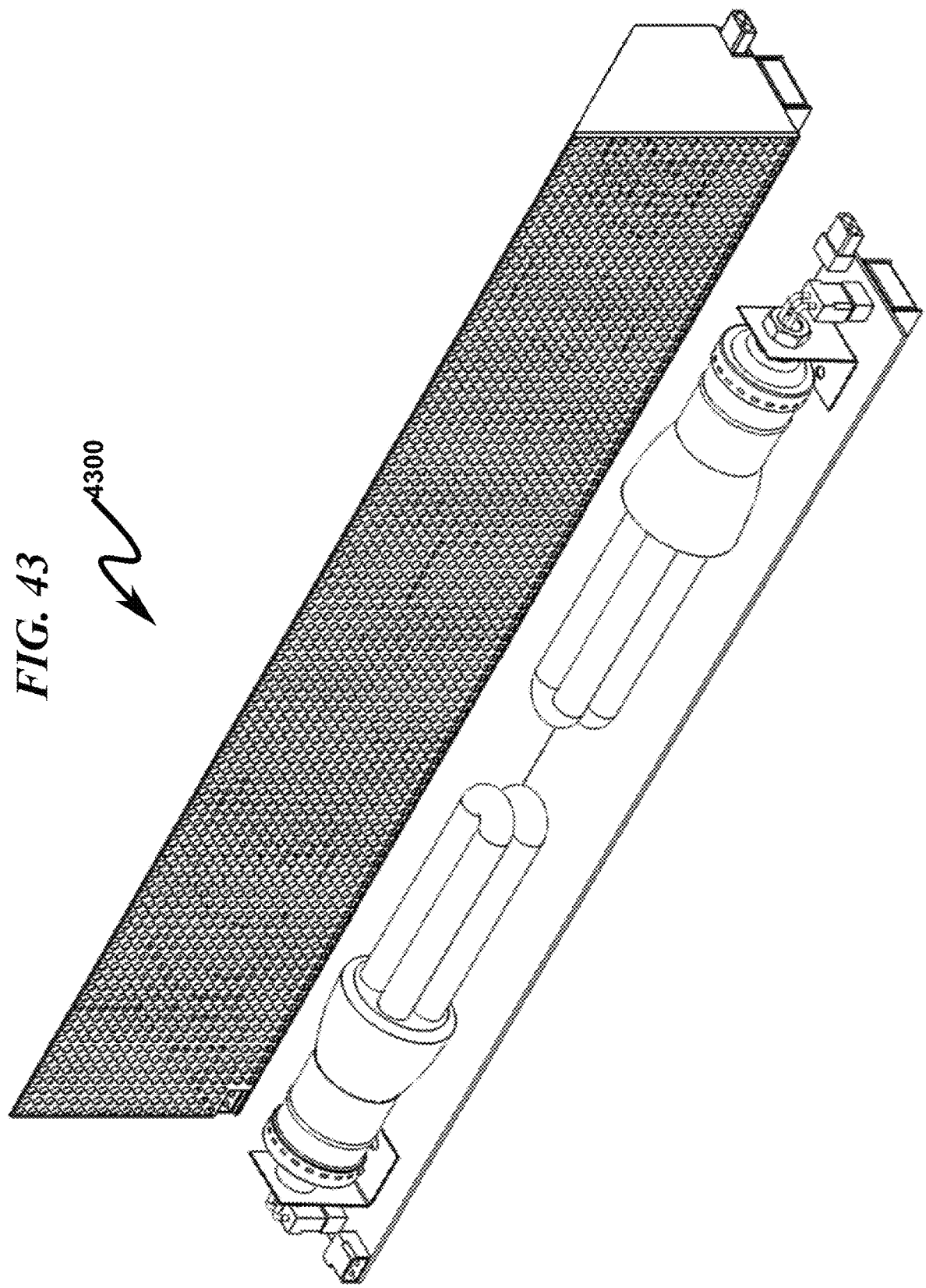
FIG. 43 illustrates top rear left side perspective views of a preferred exemplary system invention embodiment modular UV-C bulb lamp (MUB) with and without perforated reflective shield (PRS)
Figure 44:
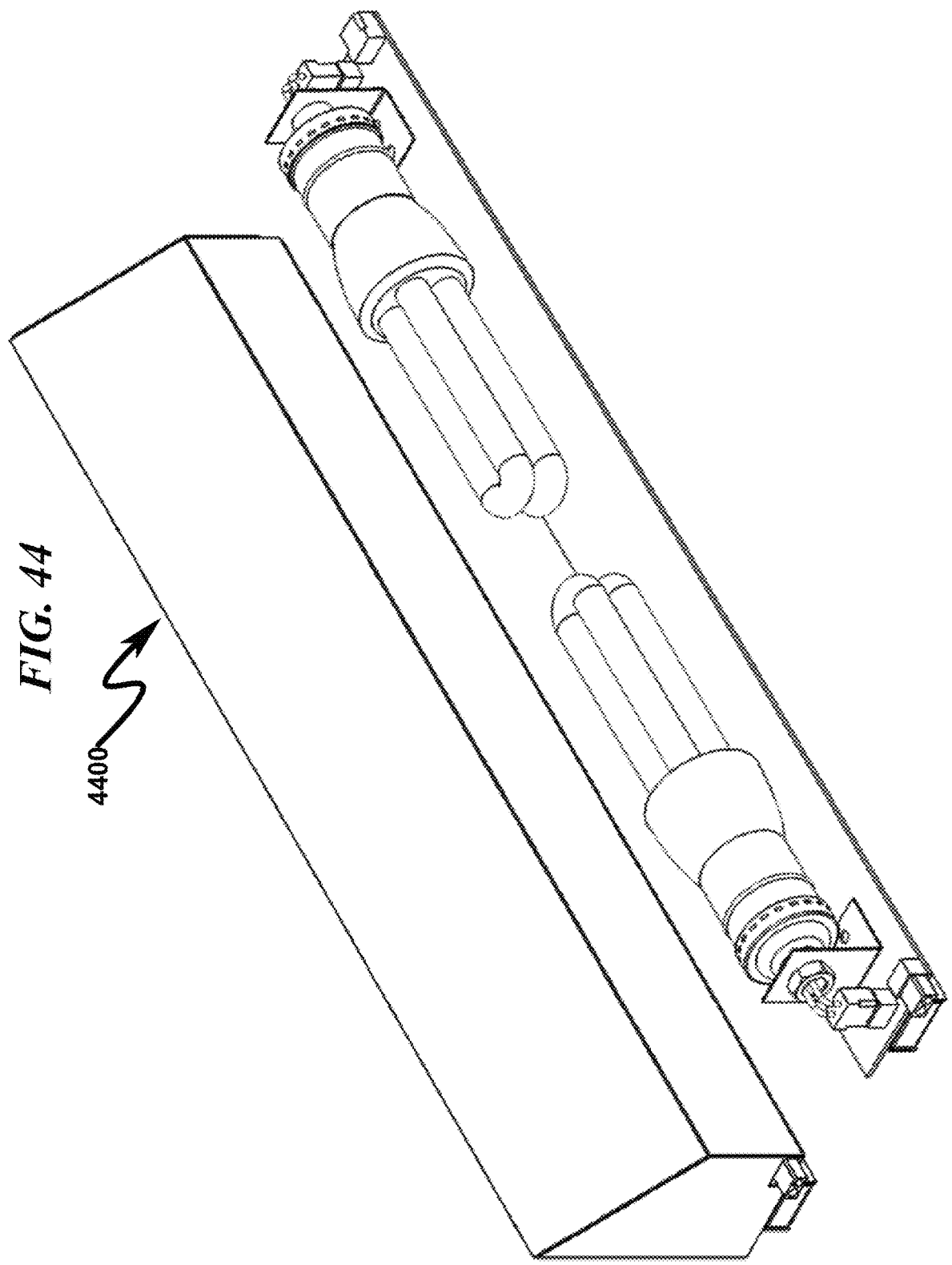
FIG. 44 illustrates top front left side perspective views of a preferred exemplary system invention embodiment modular UV-C bulb lamp (MUB) with and without perforated reflective shield (PRS)

As generally depicted in FIG. 41 (4100)-FIG. 44 (4400), the UVL may take the form of one or more UV-C quartz lamps using conventional E26 Edison screw electrical sockets.

Figure 45:
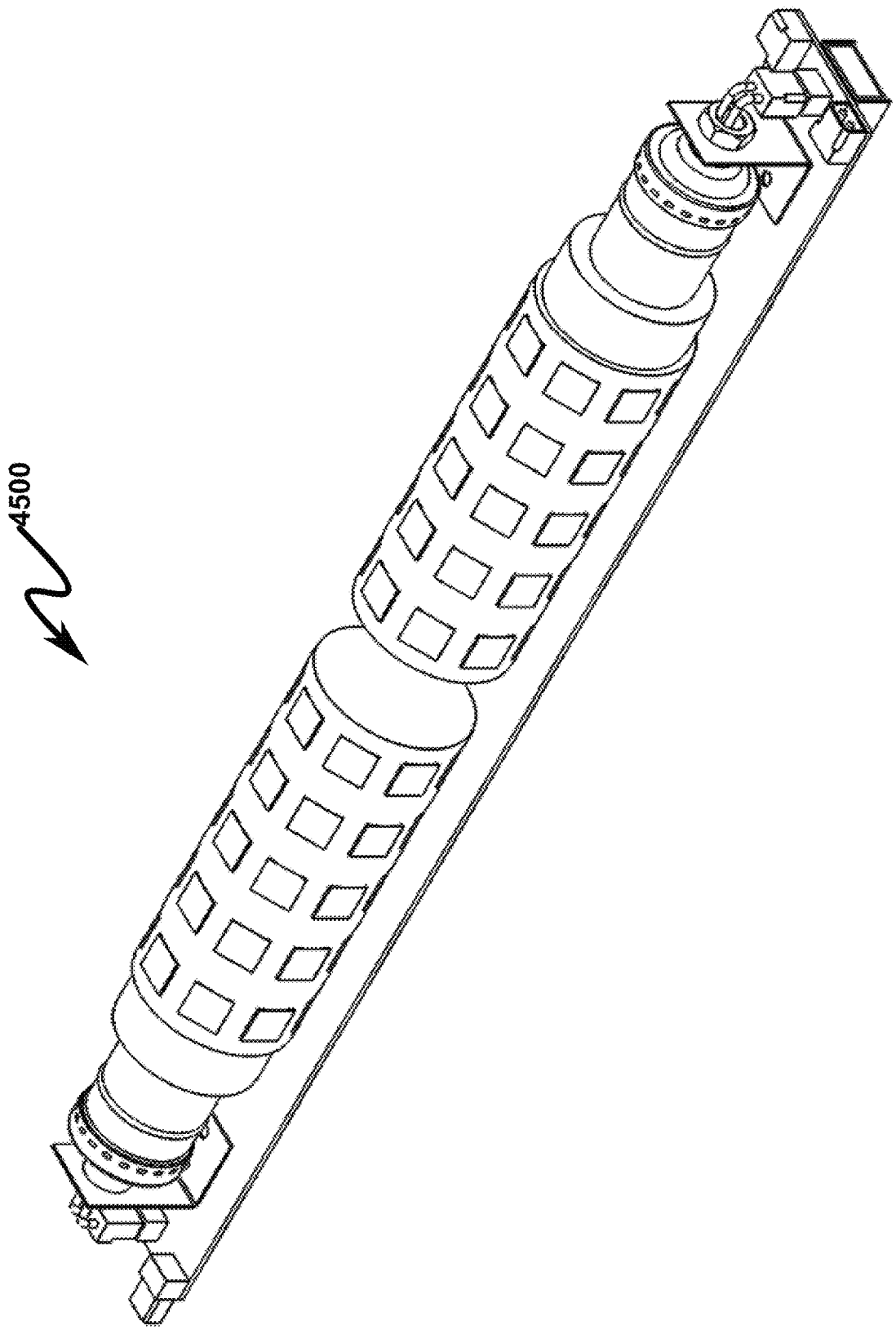
FIG. 45 illustrates a top front right side perspective view of a preferred exemplary system invention embodiment modular UV-C Edison LED lamp (MUE) without perforated reflective shield (PRS)
Figure 46:
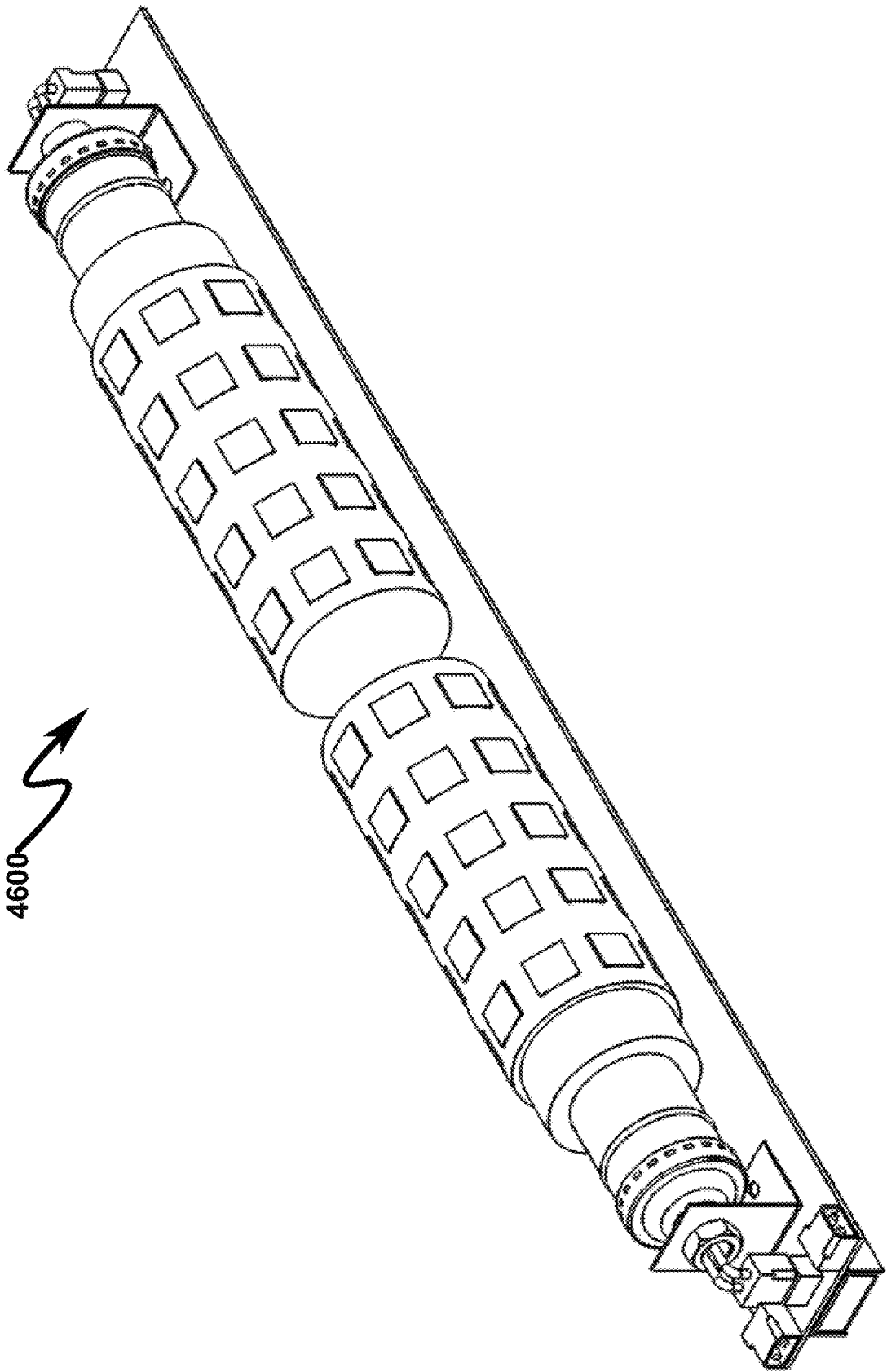
FIG. 46 illustrates a top rear right side perspective view of a preferred exemplary system invention embodiment modular UV-C Edison LED lamp (MUE) without perforated reflective shield (PRS)
Figure 47:
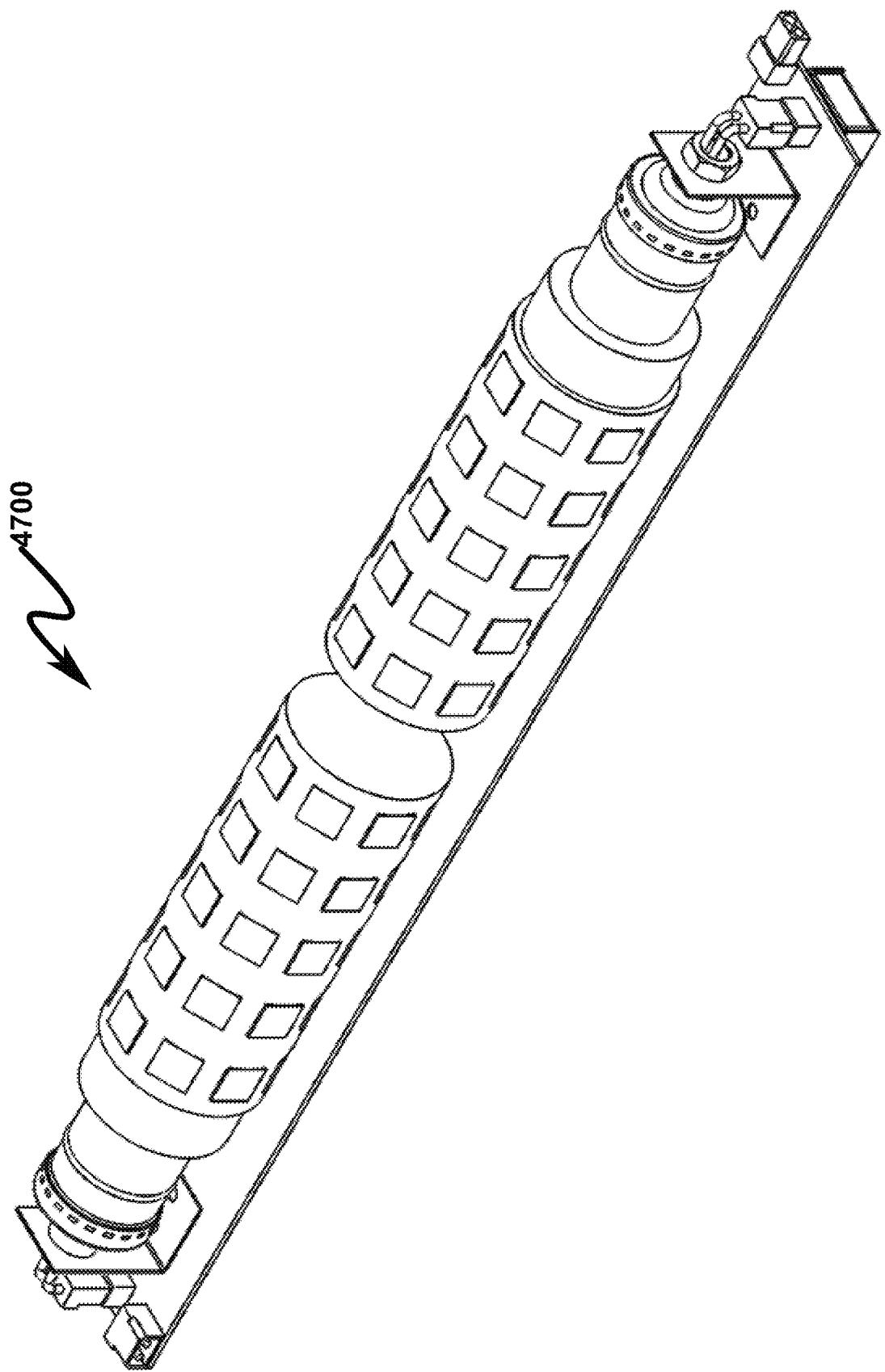
FIG. 47 illustrates a top rear left side perspective view of a preferred exemplary system invention embodiment modular UV-C Edison LED lamp (MUE) without perforated reflective shield (PRS)
Figure 48:
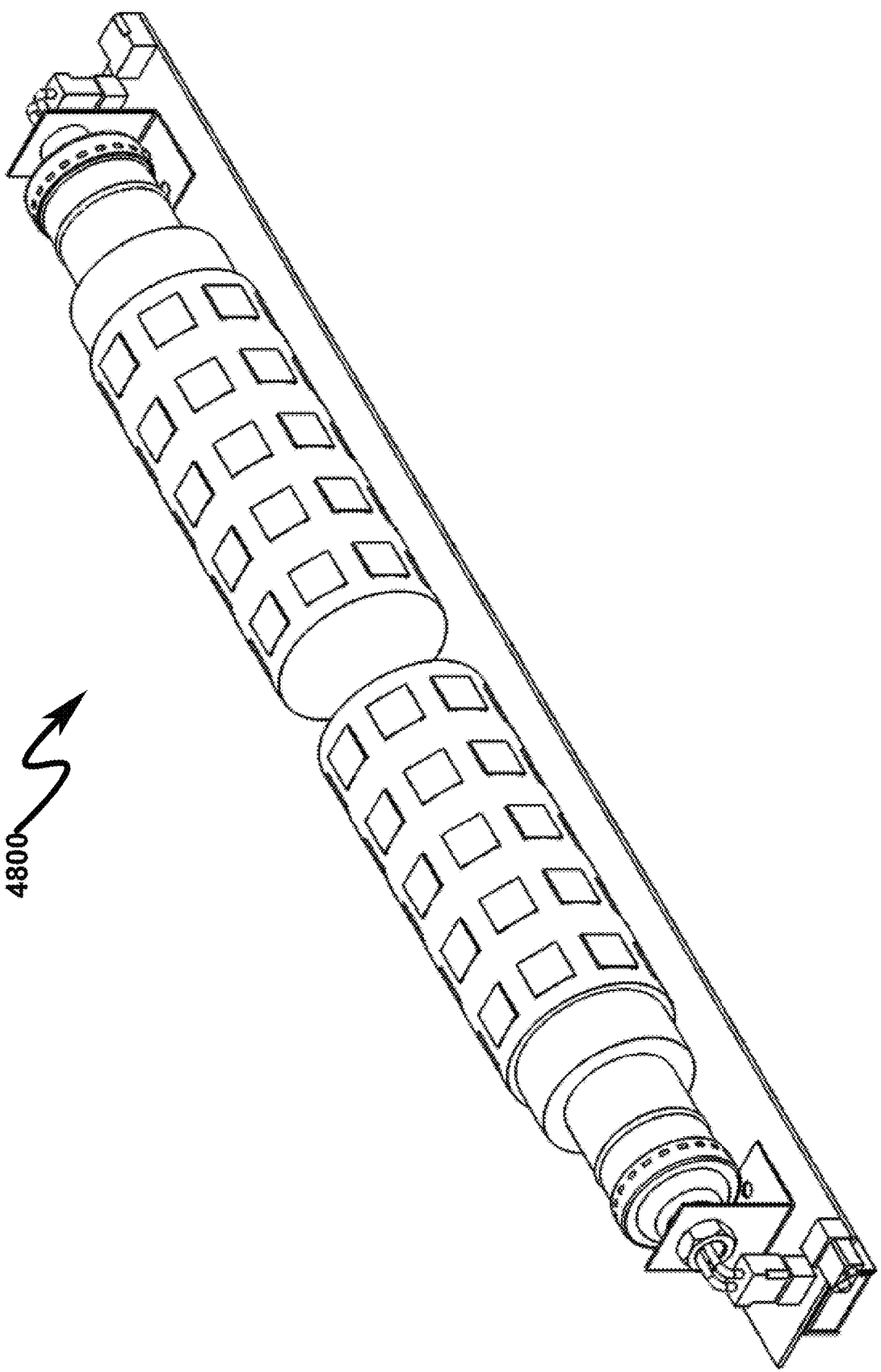
FIG. 48 illustrates a top front left side perspective view of a preferred exemplary system invention embodiment modular UV-C Edison LED lamp (MUE) without perforated reflective shield (PRS)
Figure 49:
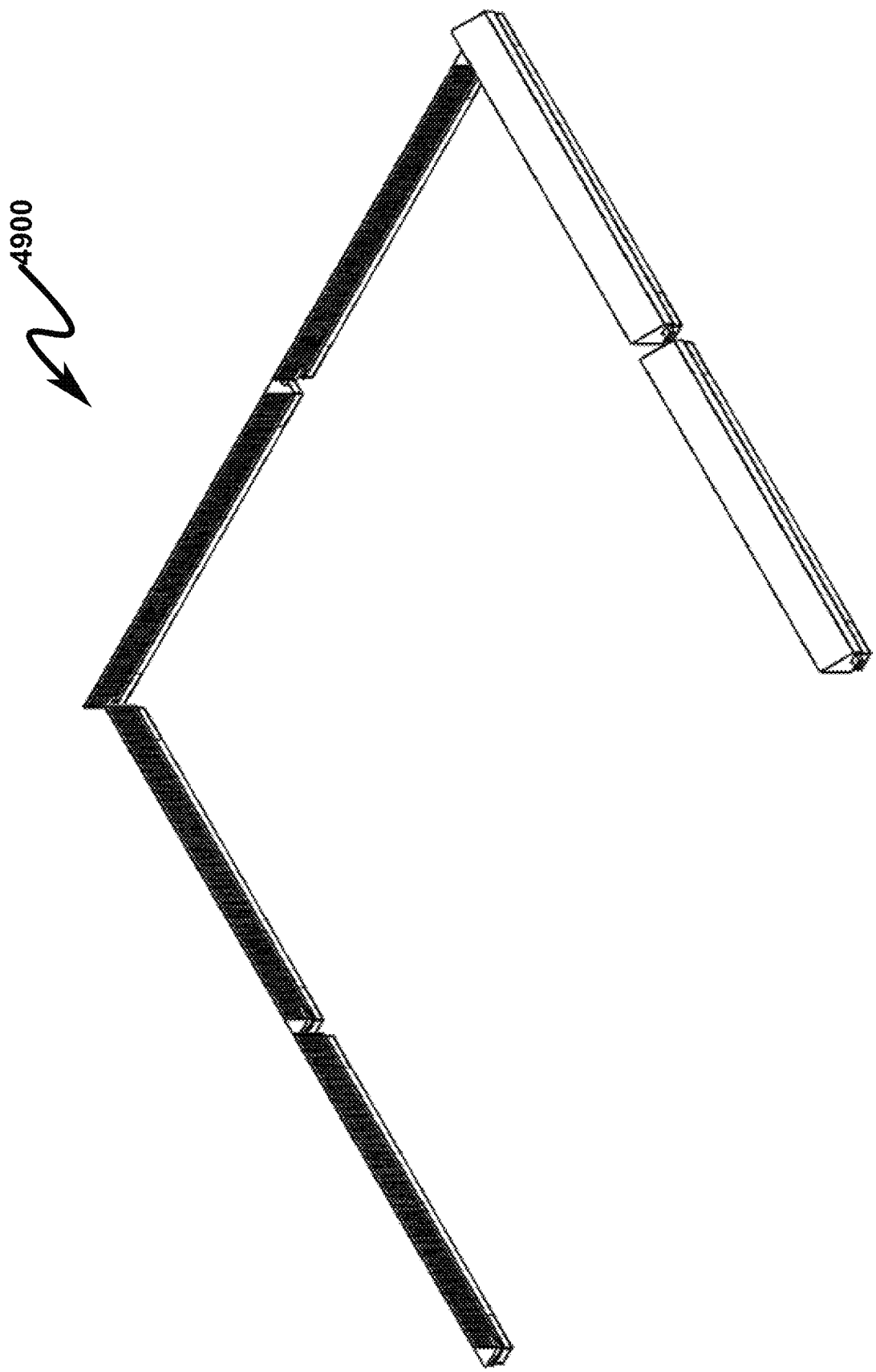
FIG. 49 illustrates a top front right side perspective view of a modular UVL assembly illustrating linear and right-angle coupling methodologies in a U-shaped UVL assembly.
Figure 50:
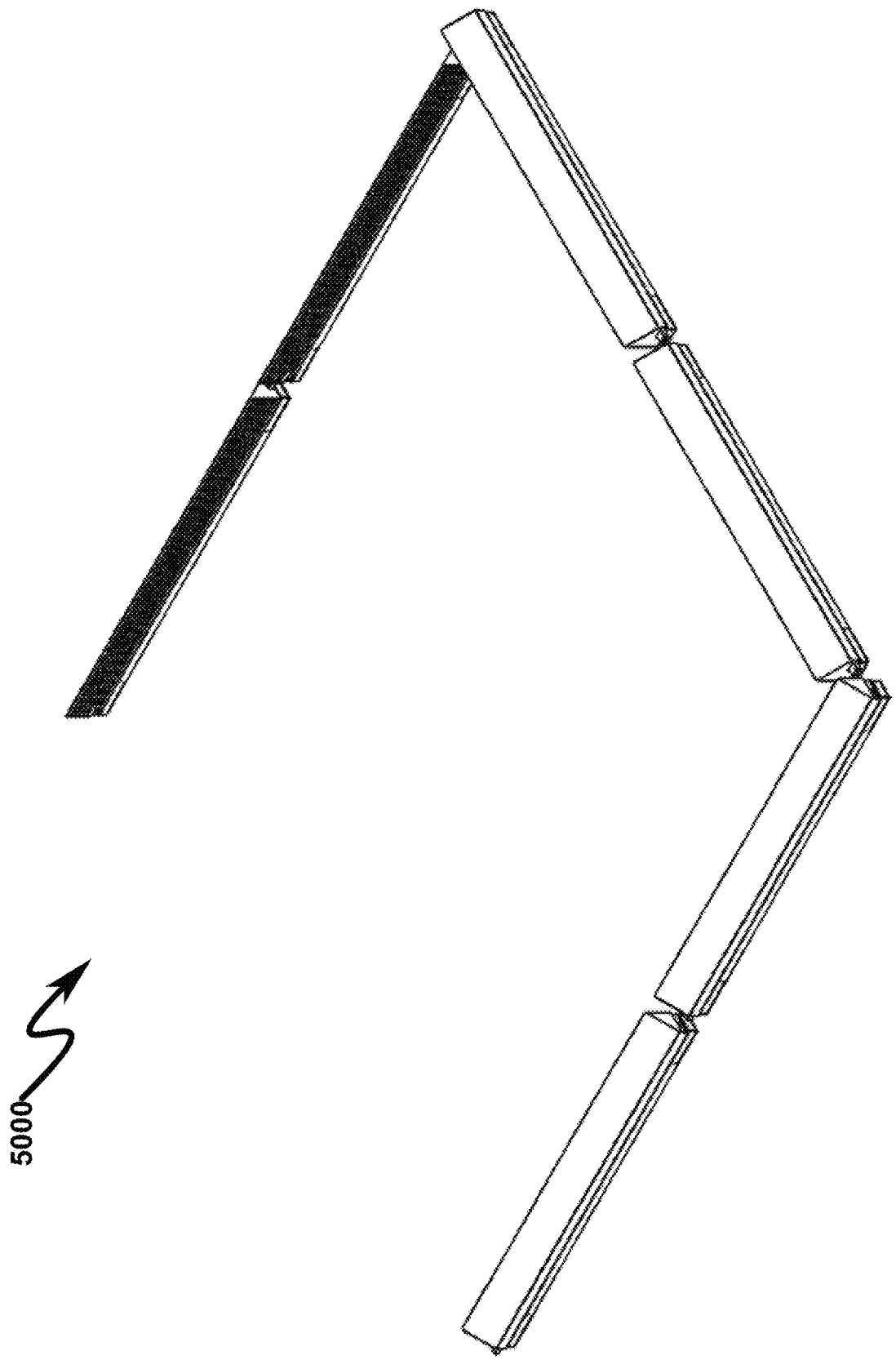
FIG. 50 illustrates a top rear right side perspective view of a modular UVL assembly illustrating linear and right-angle coupling methodologies in a U-shaped UVL assembly.
Figure 51:
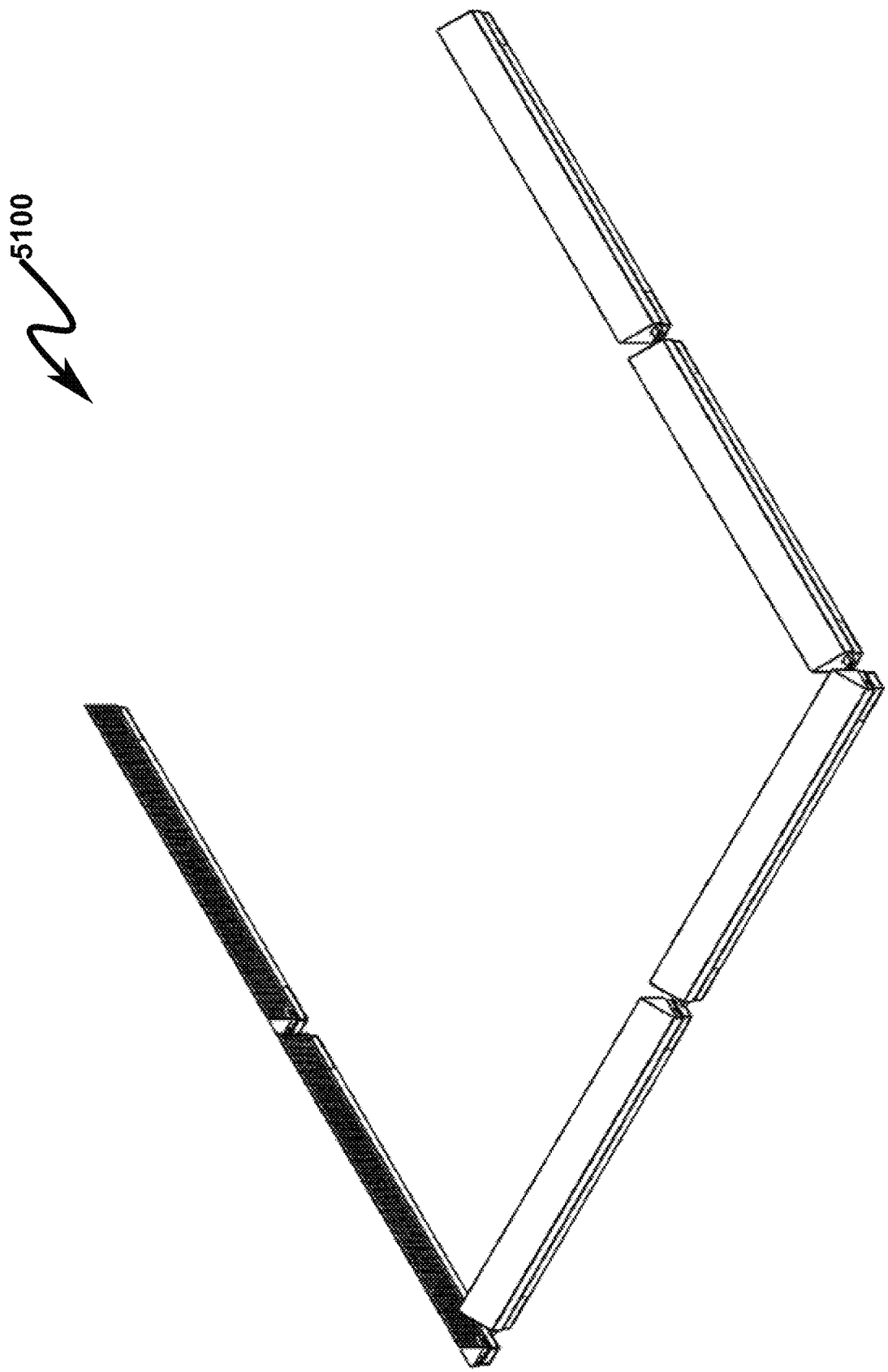
FIG. 51 illustrates a top rear left side perspective view of a modular UVL assembly illustrating linear and right-angle coupling methodologies in a U-shaped UVL assembly.
Figure 52:
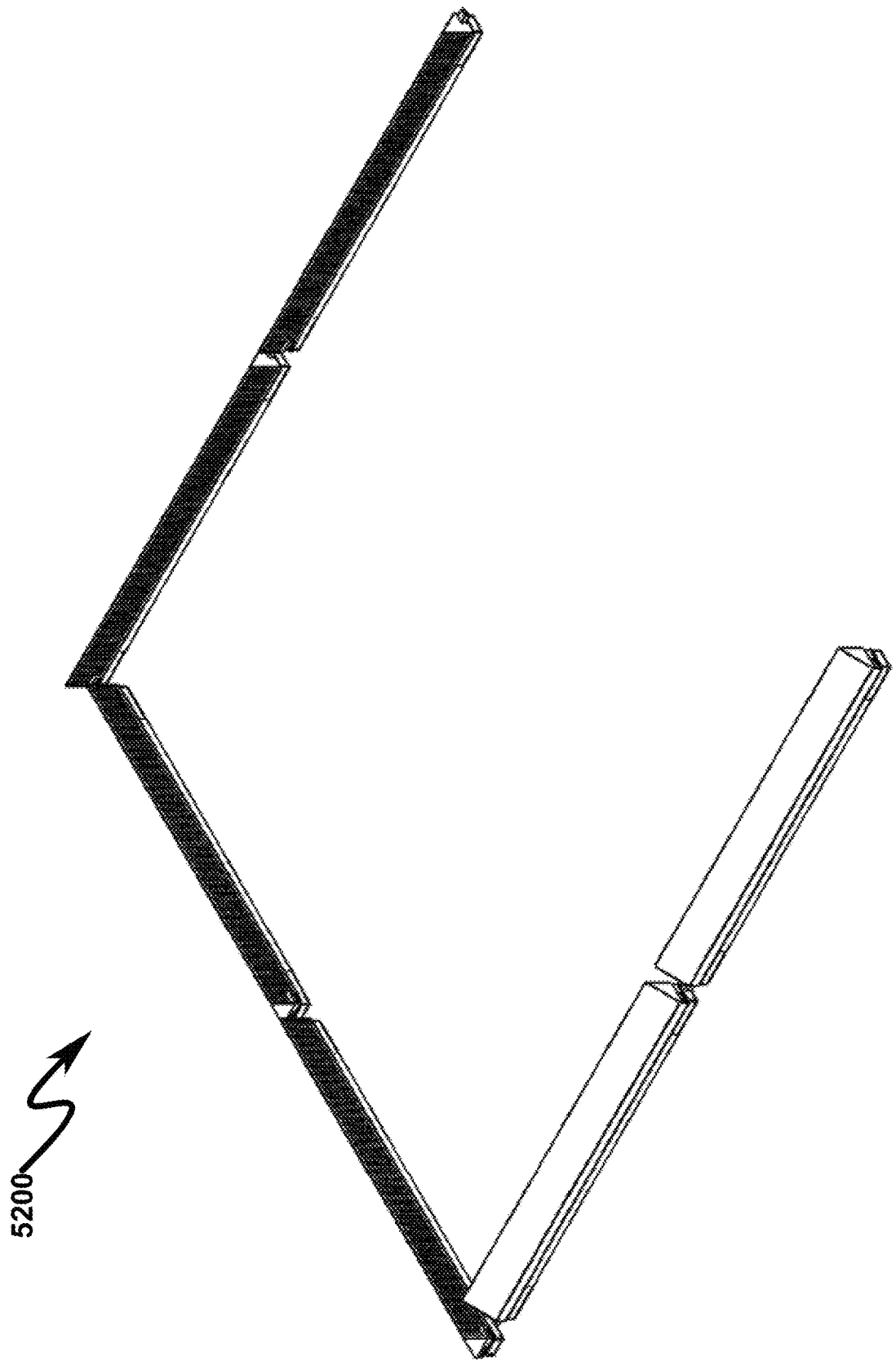
FIG. 52 illustrates a top front left side perspective view of a modular UVL assembly illustrating linear and right-angle coupling methodologies in a U-shaped UVL assembly.
Figure 53:
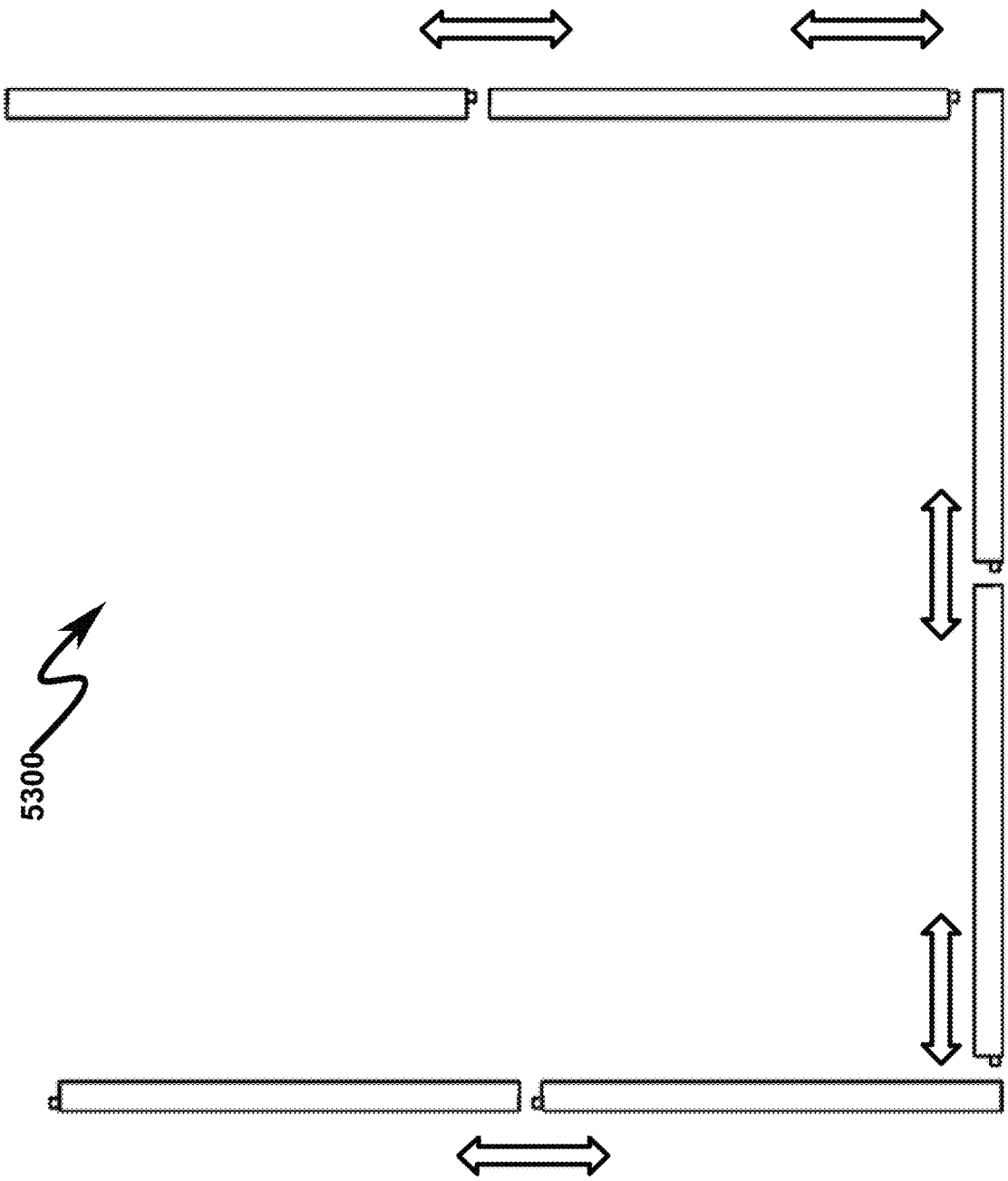
FIG. 53 illustrates a top view of a modular UVL assembly illustrating linear and right-angle coupling methodologies in a U-shaped UVL assembly.
Figure 54:
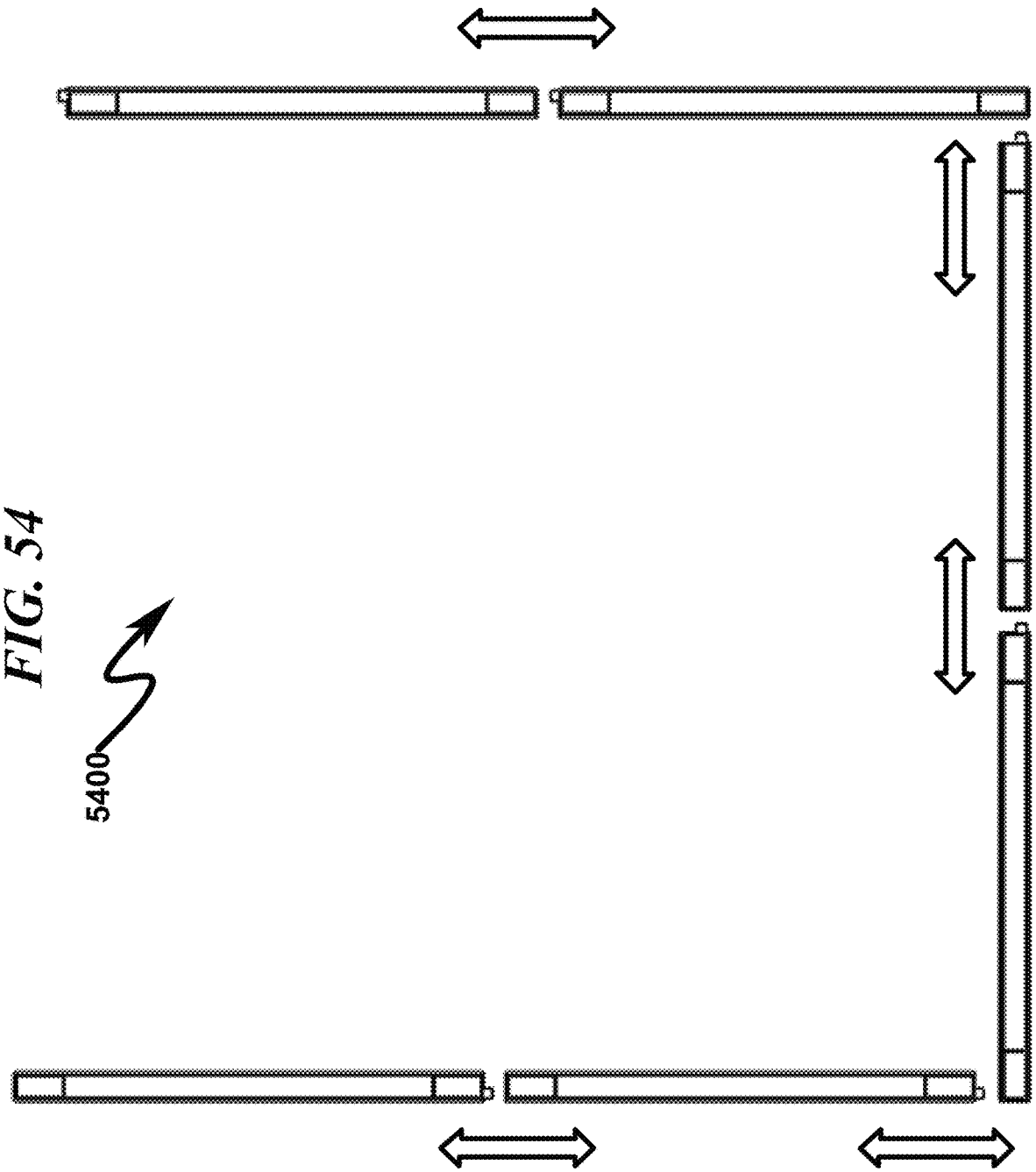
FIG. 54 illustrates a bottom view of a modular UVL assembly illustrating linear and right-angle coupling methodologies in a U-shaped UVL assembly.

As generally depicted in FIG. 45 (4500)-FIG. 48 (4800), the UVL may take the form of one or more UV-C LED lamps using conventional E26 Edison screw electrical sockets.

UVL Coupling Detail (4800)-(5600)

Figure 56:
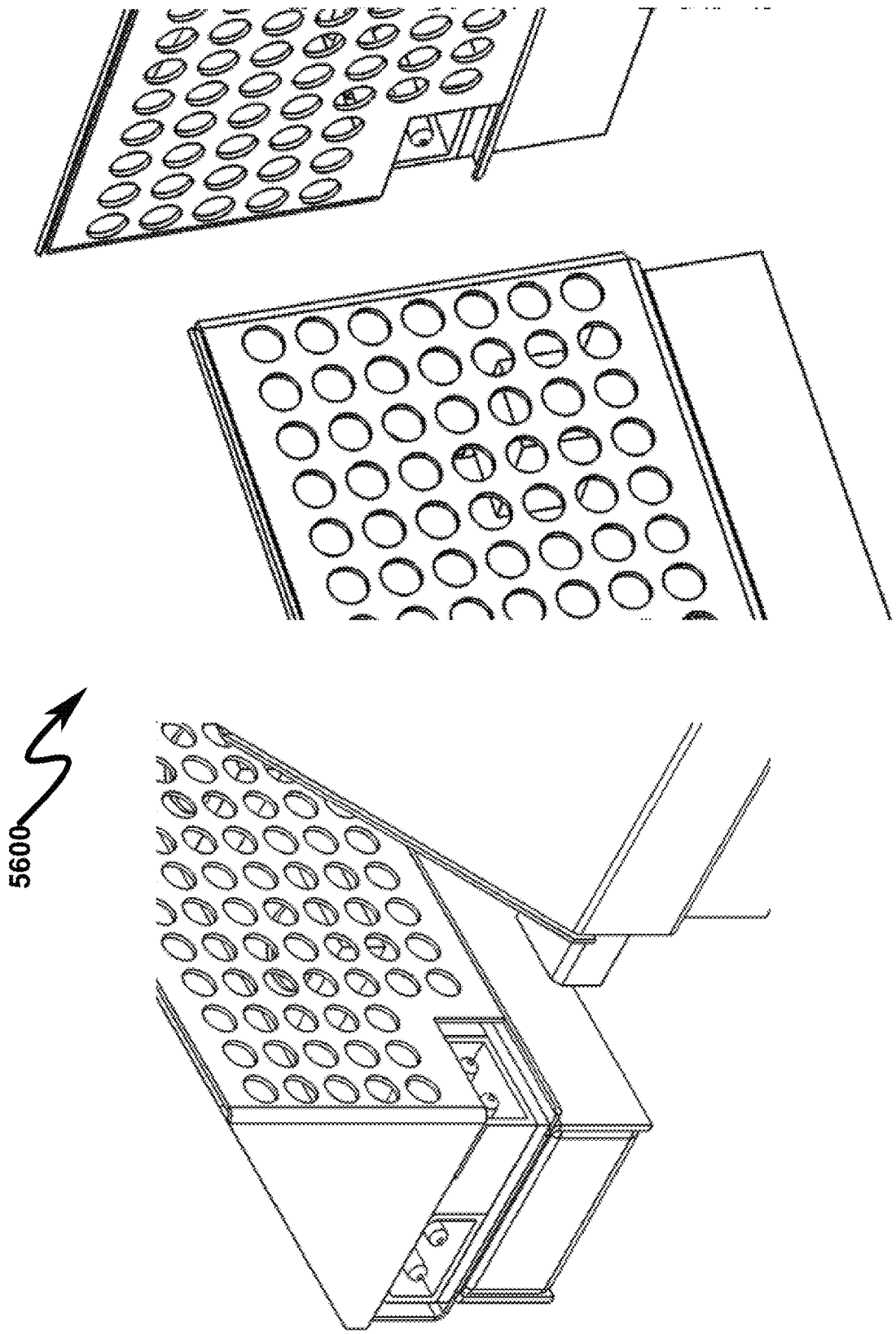
FIG. 56 illustrates perspective detail views of a modular UVL assembly illustrating right-angle coupling methodologies in a U-shaped UVL assembly.

As generally depicted in FIG. 48 (4800)-FIG. 56 (5600), the UVL may be configured to support linear and right-angle coupling of UVL modules to allow for dynamic reconfiguration of the UVL assembly to fit a wide variety of HVAC duct systems.

Figure 55:
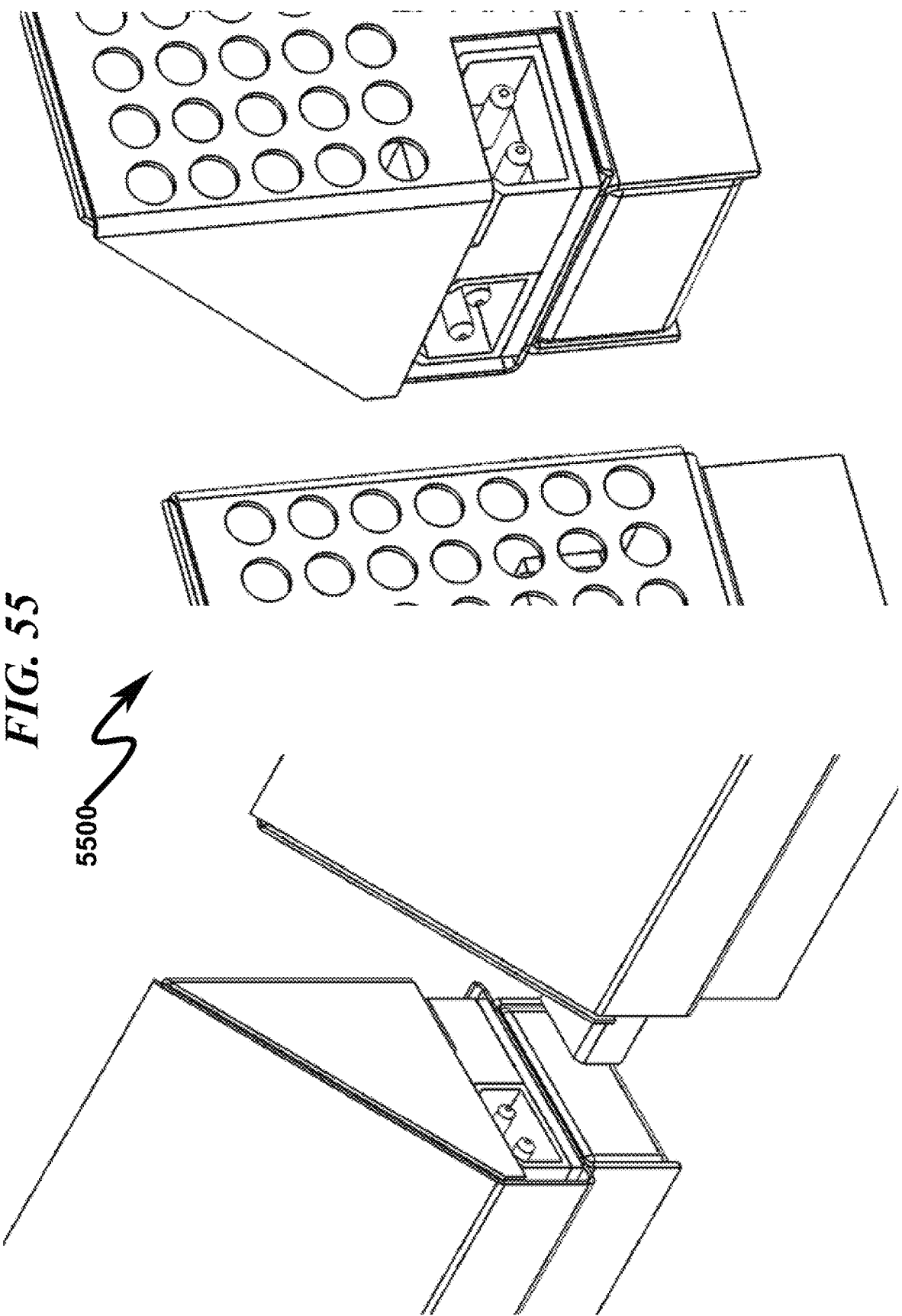
FIG. 55 illustrates perspective detail views of a modular UVL assembly illustrating linear coupling methodologies in a U-shaped UVL assembly.

An example of this flexibility is generally depicted in FIG. 48 (4800)-FIG. 56 (5600) wherein a U-shaped UVL assembly is formed using six UVL modules. Three pairs of the UVL modules are shown in a linear coupled configuration (detail of the coupling provided in FIG. 55 (5500)) and each of these three pairs is then coupled together using a right-angle electrical coupling method (as generally depicted in FIG. 56 (5600)). Using this methodology a series of UVL modules of different lengths can be manufactured and then daisy-chained together at linear/right-angle configurations in the field to fit a wide variety of HVAC duct systems without any need for a mechanical modification of the HVAC system.

While not shown, the unused connectors on the UVL may be configured that a shorting connector must be inserted into the exposed electrical connector to ensure that no electrical wiring is exposed. This safety measure allows the system to be installed with a failsafe for safe operation of the overall electrical wiring harness that supports electrical distribution to the UVL lamps.

Wireless AFS System Detail (5700)-(5800)

Figure 57:
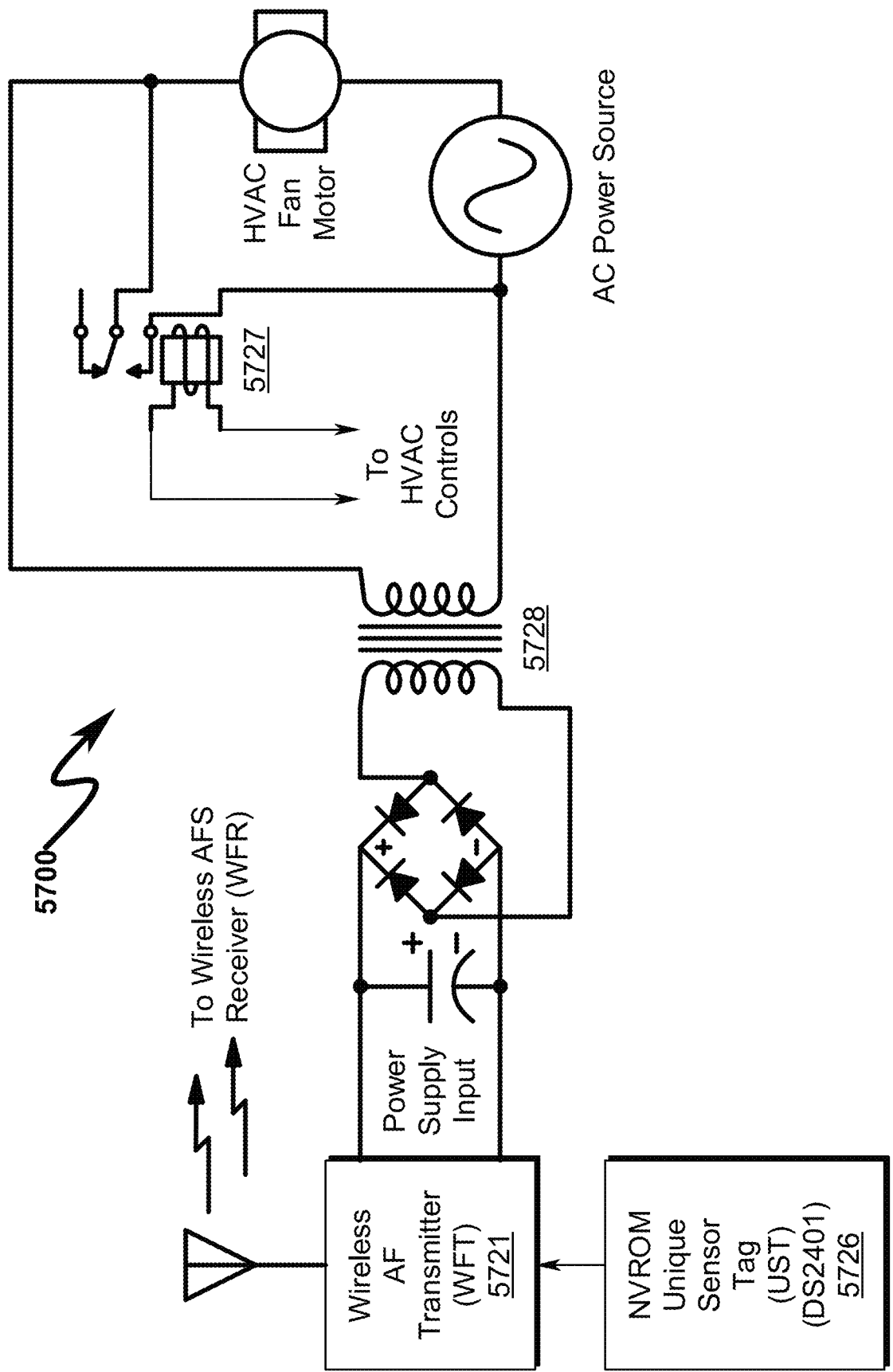
FIG. 57 illustrates a system block diagram depicting a wireless air flow (WAF) transmitter configuration useful in some preferred invention embodiments.
Figure 64:
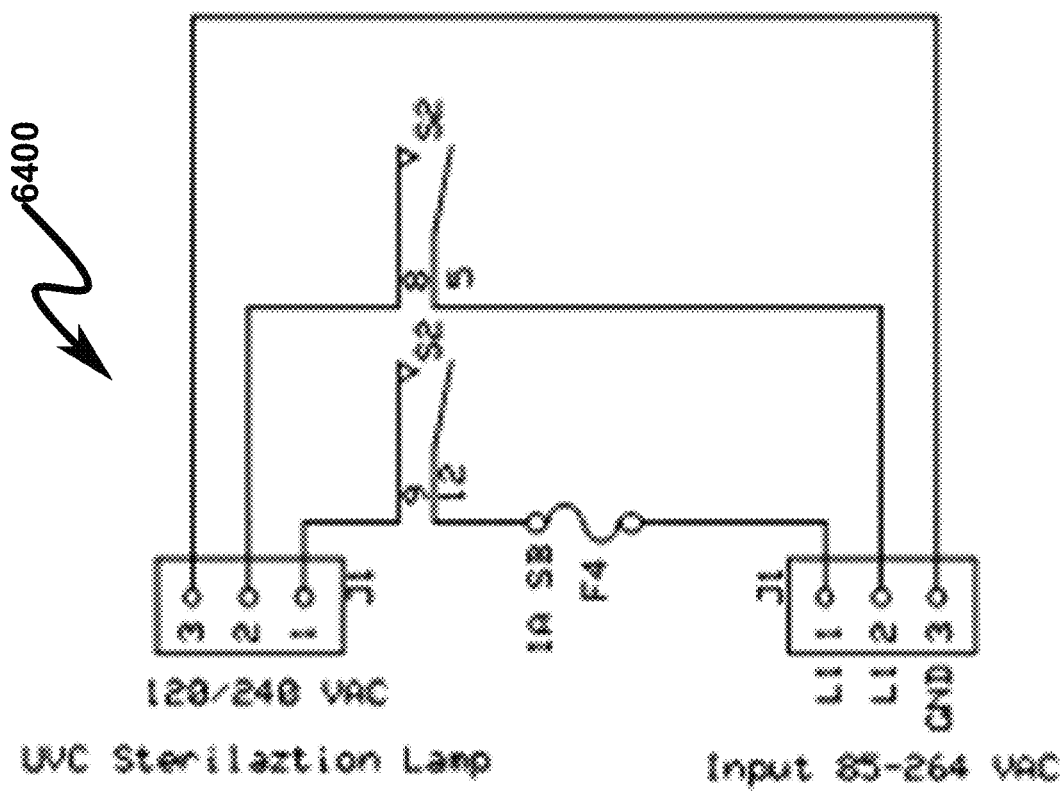
FIG. 64 illustrates an exemplary embodiment of a portion of the DCP used to actuate directly coupled one or more UVLs (page 2/2)

As generally depicted in FIG. 57 (5700)-FIG. 64 (6400), the AFS may be configured to operate in a wireless fashion allowing placement of the AFS within any portion of the HVD.

FIG. 57 (5700) illustrates a system configuration in which the AFS wireless AF transmitter (WFT) (5721) is configured with a unique sensor tag (UST) configured as a unique serial number implemented with a DALLAS SEMICONDUCTOR MODEL DS2401 SILICON SERIAL NUMBER. When the HVAC contactor/relay (5727) is energized, the WFT (5721) is powered by a transformer (5728) and associated bridge rectifier/capacitor combination. This enables the WFT (5721) to read the contents of the UST (5726) and transmit it to the corresponding AF receiver (WFR) to inform the DCP that air flow is active in the HVAC system.

Figure 58:
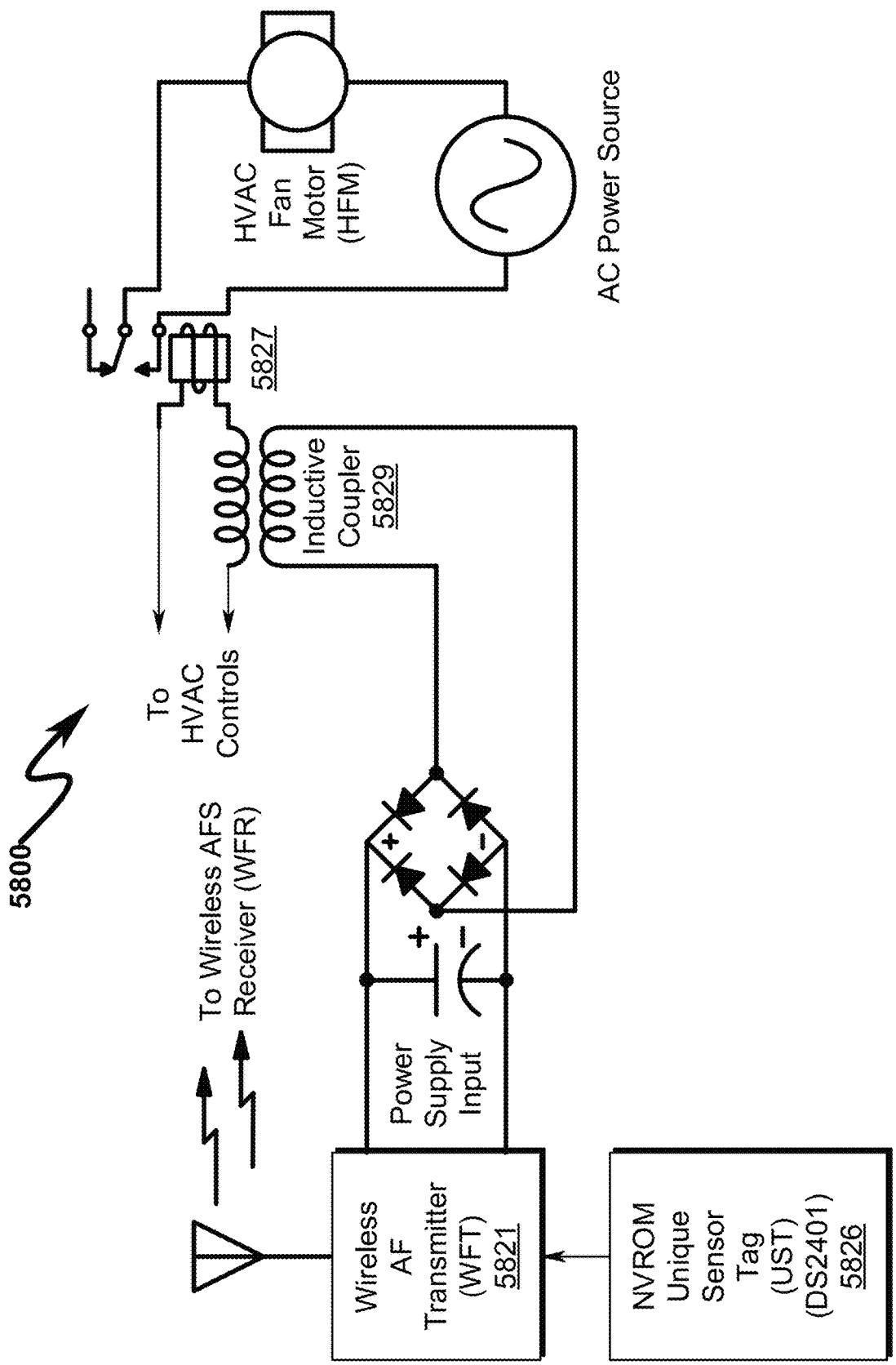
FIG. 58 illustrates a system block diagram depicting an alternate wireless air flow (WAF) transmitter configuration useful in some preferred invention embodiments.

An alternative implementation of the WFR is depicted in FIG. 58 (5800) wherein when the HVAC contactor/relay (5827) is energized to activate the HVAC fan motor (HFM), an inductive coupler (5829) couples current from the energizing coil of the HVAC contactor/relay (5827) to provide power to the WFT (5821).

Wireless AFS Method Detail (5900)-(6000)

Figure 59:
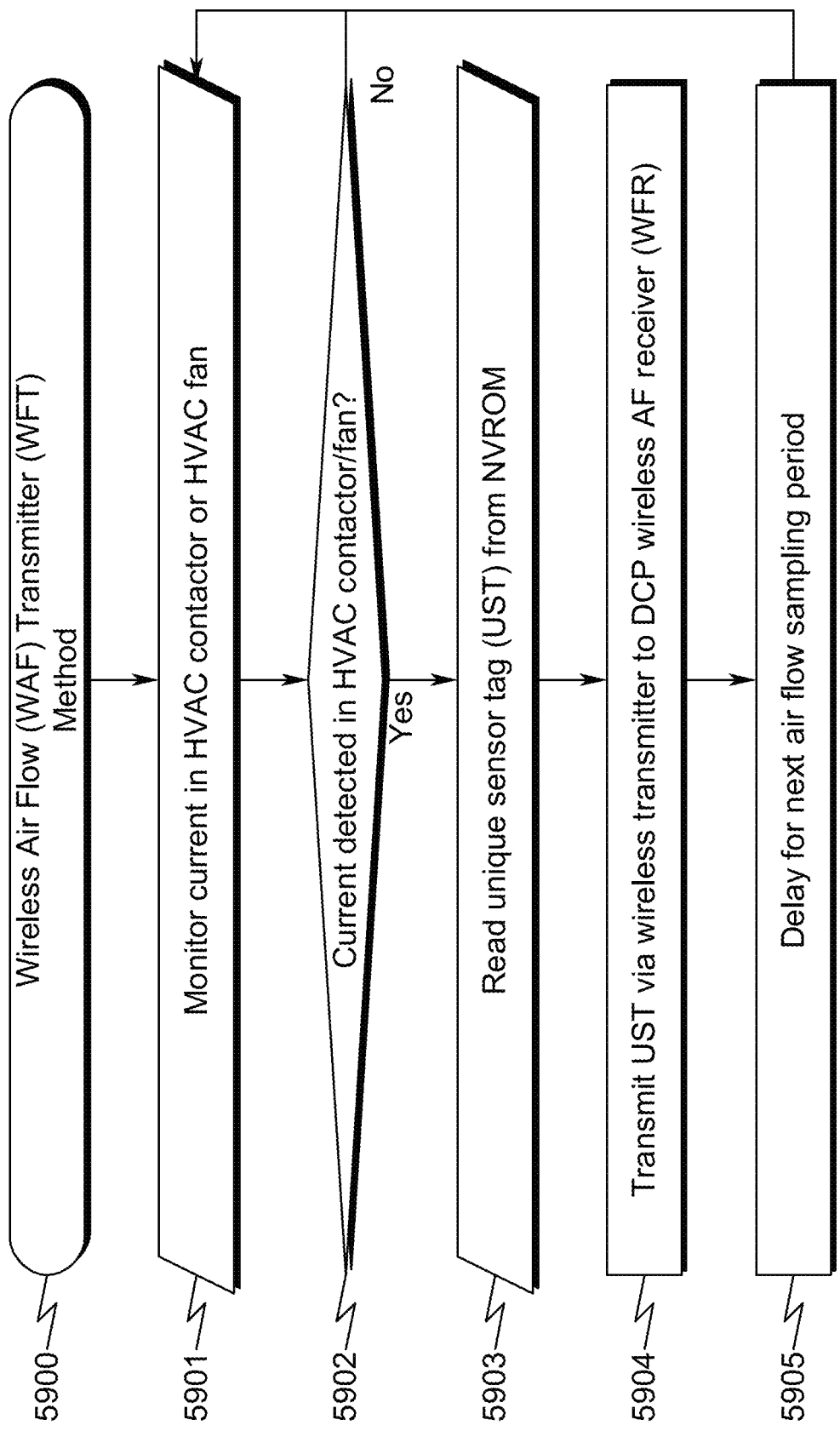
FIG. 59 illustrates a flowchart depicting a wireless air flow (WAF) transmitter (WFT) method useful in some preferred invention embodiments.
Figure 60:
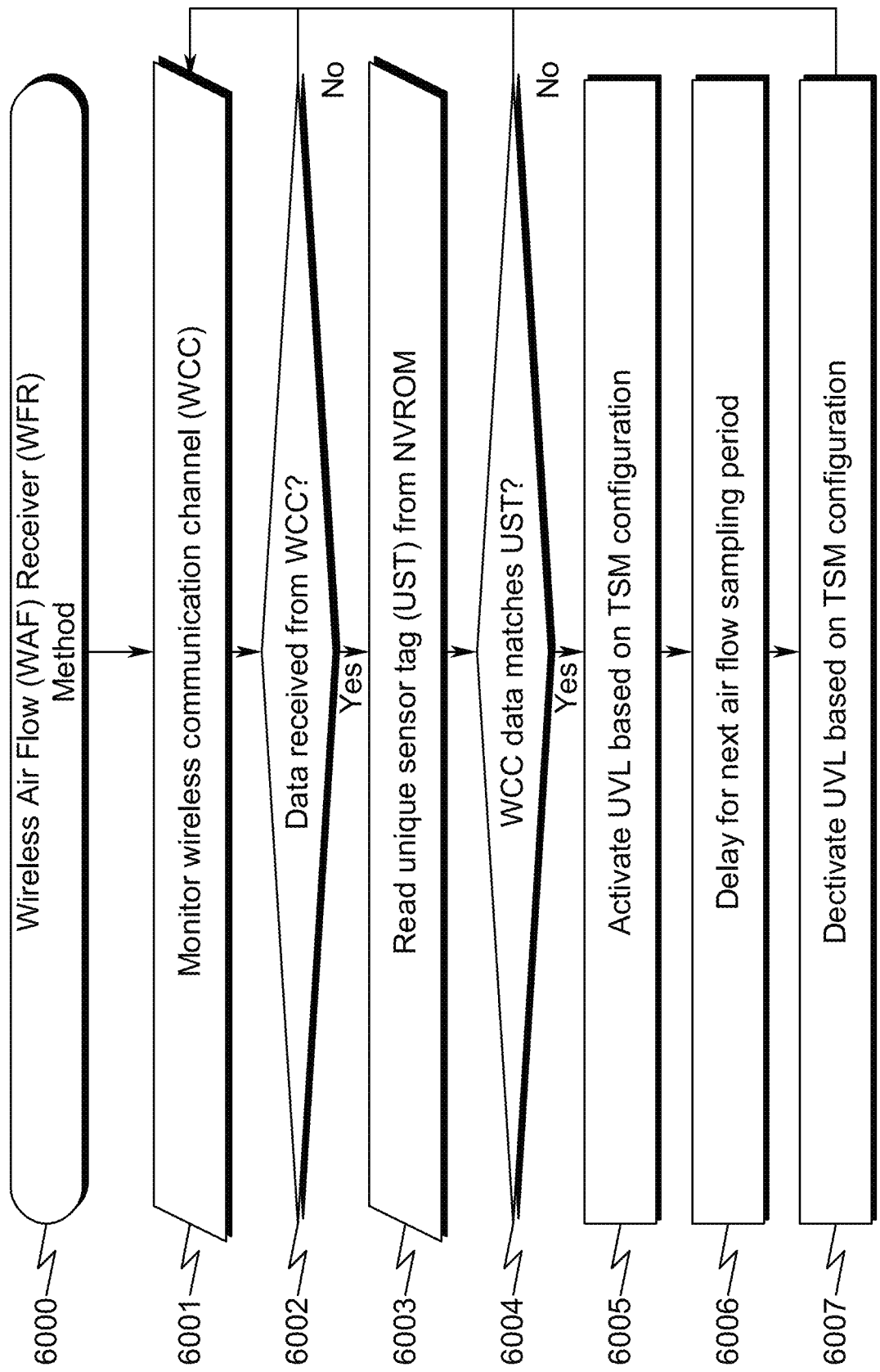
FIG. 60 illustrates a flowchart depicting a wireless air flow (WAF) receiver (WFR) method useful in some preferred invention embodiments.

Operation of the wireless AFS is generally depicted in the flowcharts of FIG. 59 (5900)-FIG. 60 (6000).

The wireless AFS transmitter (WFT) method may be generally described as including the following steps:

(1) monitoring current in the HVAC contactor and/or HVAC fan (5901);
(2) determining if current is detected in the HVAC contactor and/or fan, and if not, proceeding to step (1) (5902);
(3) reading a unique sensor tag (UST) from non-volatile memory (5903);
(4) transmitting the UST via wireless transmitter to a DCP wireless AF receiver (WFR) (5904); and
(5) delaying for the next air flow sampling period and then proceeding to step (1) (5905).

This general method may be modified heavily depending on a number of factors, with rearrangement and/or addition/ deletion of steps anticipated by the scope of the present invention. Integration of this and other preferred exemplary embodiment methods in conjunction with a variety of preferred exemplary embodiment systems described herein is anticipated by the overall scope of the present invention.

The corresponding wireless AFS receiver (WFR) method may be generally described as including the following steps:
(1) monitoring a wireless AF communication channel (WCC) from a WFT (6001);
(2) determining data has been received from the WCC, and if not, proceeding to step (1) (6002);
(3) reading a unique sensor tag (UST) from non-volatile memory (6003);
(4) determining if the WCC data received matches the UST data, and if not, proceeding to step (1) (6004);
(5) activating the UVL based on the current state of the TSM configuration (6005);
(6) delaying for the next air flow sampling period (6006); and
(7) deactivating the UVL based on the current state of the TSM configuration and proceeding to step (1) (6007).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Wireless LFI System Detail (6100)

Figure 61:
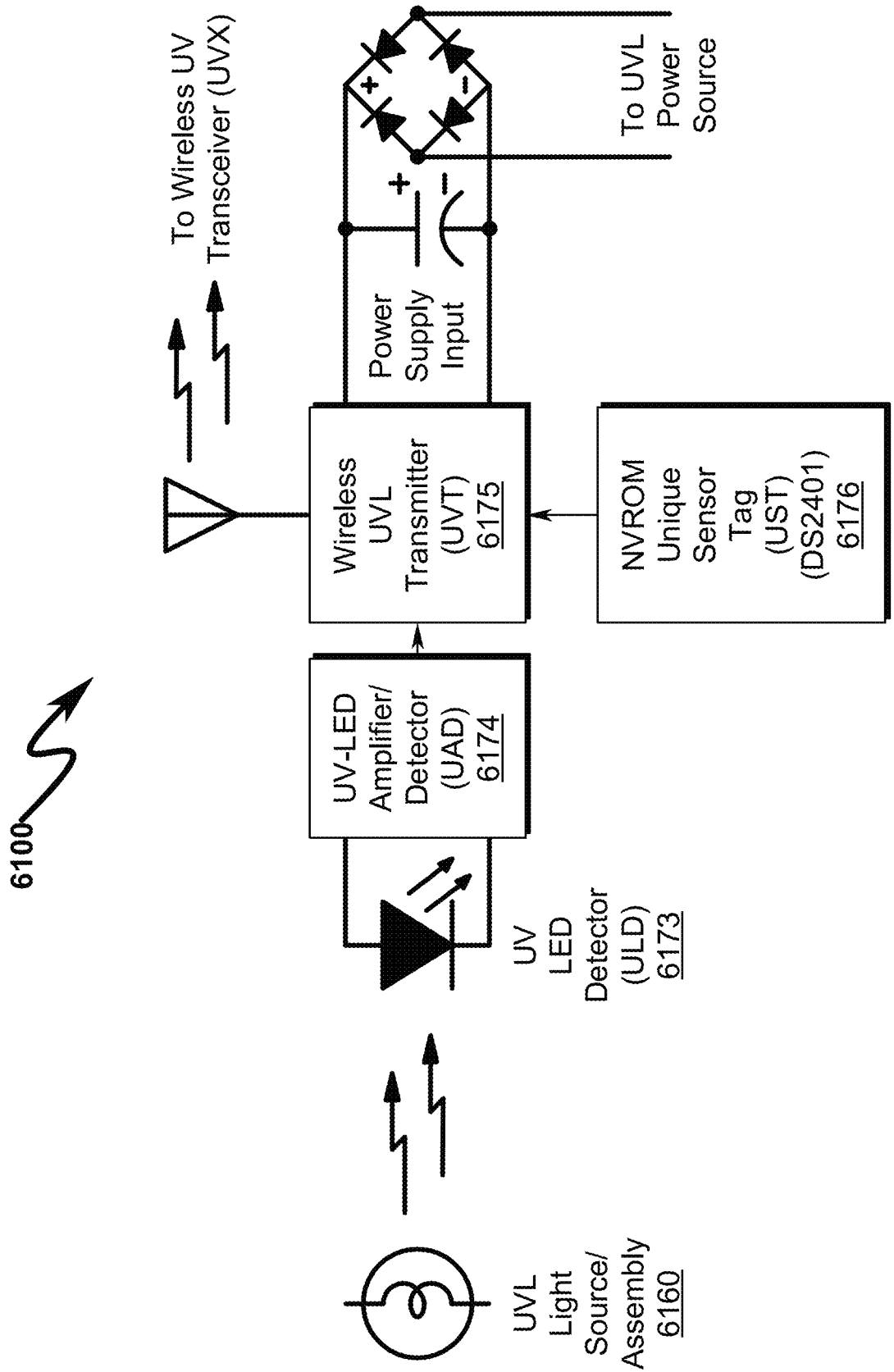
FIG. 61 illustrates a system block diagram depicting a wireless lamp feedback indicator (LFI) configuration useful in some preferred invention embodiments.
Figure 62:
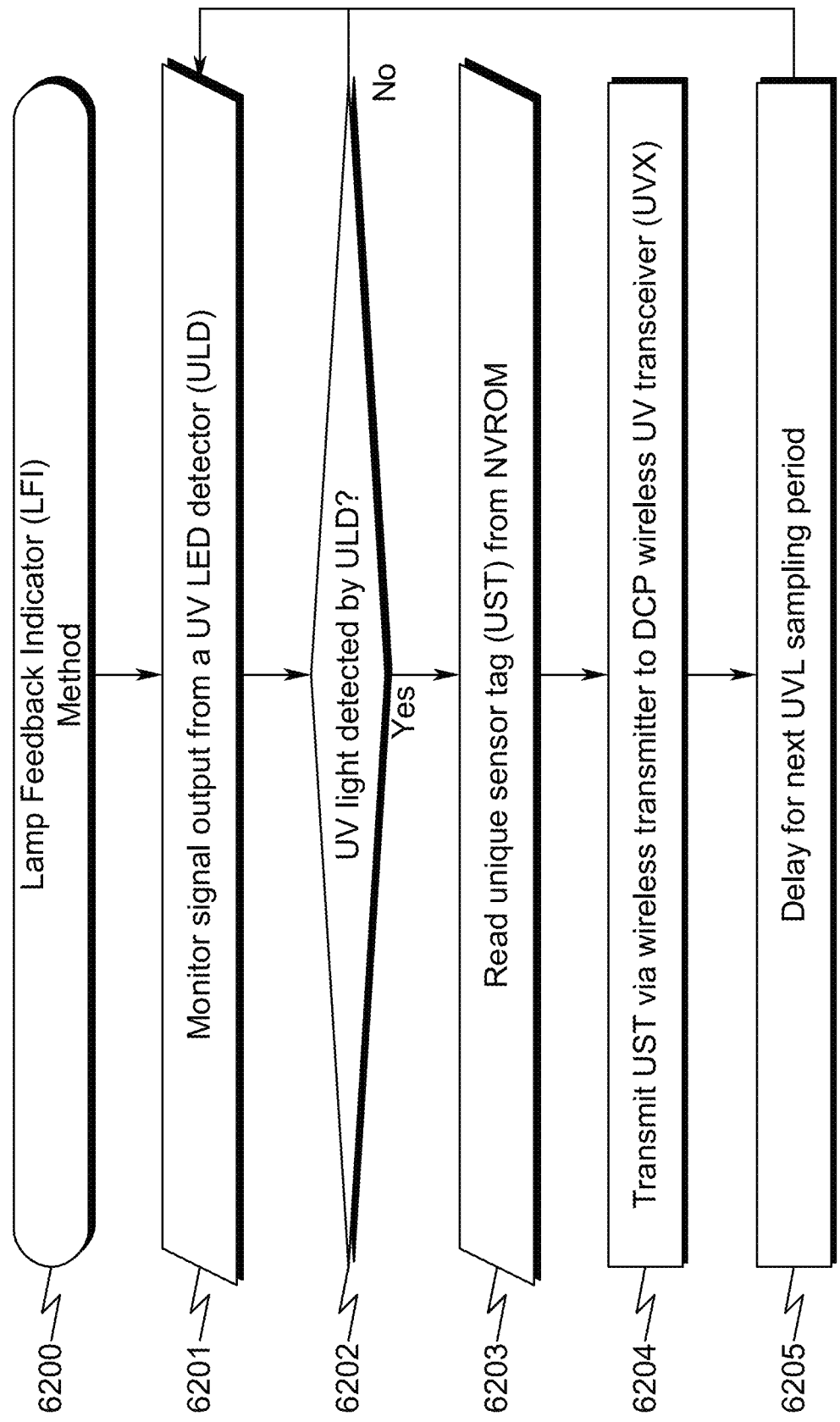
FIG. 62 illustrates a flowchart depicting a wireless lamp feedback indicator (LFI) method useful in some preferred invention embodiments.

As generally depicted in FIG. 61 (6100), the LFI may be configured to operate in a wireless fashion allowing monitoring of the operation of the UVL within the ATS.

In this configuration the UVL light source or assembly (6160) irradiates a UV LED detector (ULD) (6173) that is typically a UV LED lamp (or other semiconductor LED device) configured in reverse emission mode to weakly generate an output signal in the presence of UV radiation. This signal is then amplified by a UV-LED amplifier/detector (UAD) (6174) and then sent to a wireless UVL transmitter (UVT) (6175). The UVT (6175) is configured to read a unique sensor tag (UST) from NV memory (6176) and transmit this wirelessly to the UV transceiver (UVX) connected to the DCP. This unique signal pattern is then used to verify that the UVL light source is operating properly. Should the UVL light source fail, the transmission stops and the DCP can initiate an alarm condition indicating a failure of the UVL and need for repair/replacement.

Wireless LFI Method Detail (6200)

The wireless LFI method may be generally described as including the following steps:
(1) monitoring a signal output from a UV LED detector (ULD) (6201);
(2) determining if UV light is detected by the ULD, and if not, proceeding to step (1) (6202);
(3) reading a unique sensor tag (UST) from non-volatile memory (6203);
(4) transmitting the UST via wireless transmitter to a DCP wireless UV transceiver (UVX) (6204); and
(5) delaying for the UVL sampling period and then proceeding to step (1) (6205).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Exemplary DCP Implementation (6300)-(6400)

Figure 63:
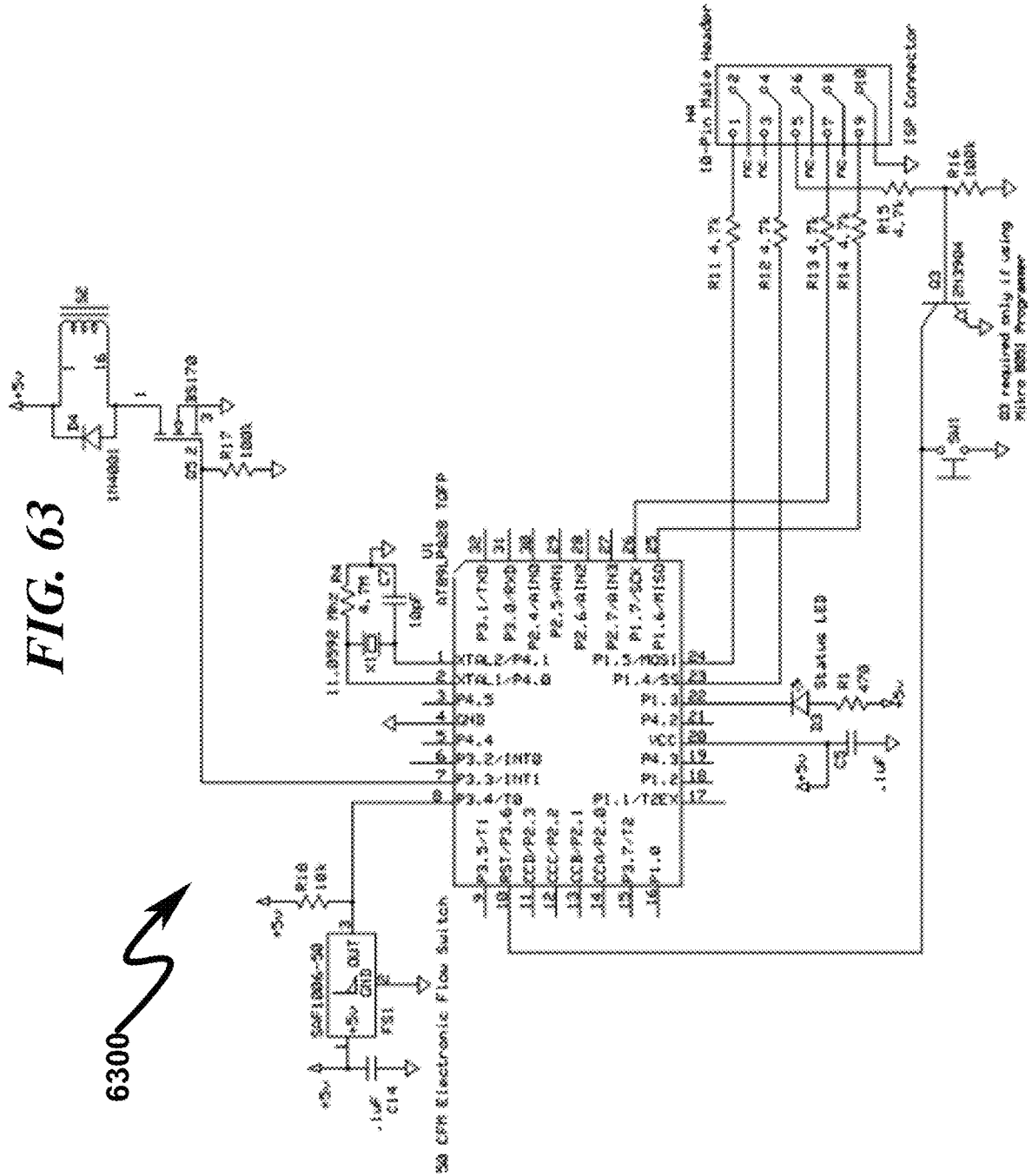
FIG. 63 illustrates an exemplary embodiment of a portion of the DCP used to actuate directly coupled one or more UVLs (page 1/2)

While the DCP may be implemented in many form in a variety of anticipated embodiments, an exemplary embodiment is generally depicted in FIG. 63 (6300)-FIG. 64 (6400) wherein the DCP is implemented using an AT89LP828 microcontroller and power control relay.

Liquid Distribution Atomizer (LDA) (6500)-(6600)

Figure 65:
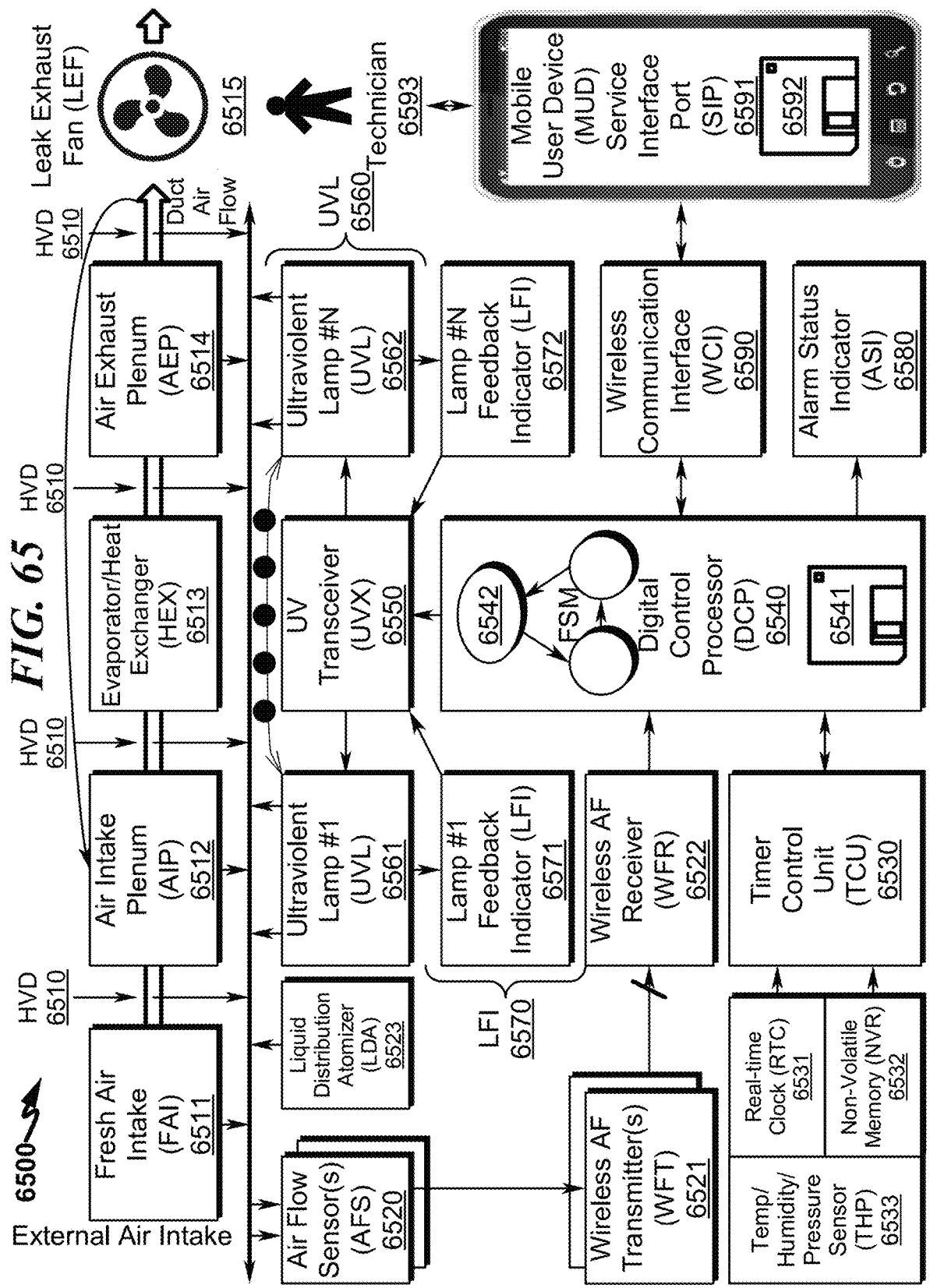
FIG. 65 illustrates a system block diagram depicting a preferred exemplary embodiment of a present invention HVAC air treatment system (ATS) incorporating a liquid distribution atomizer (LDA)
Figure 66:
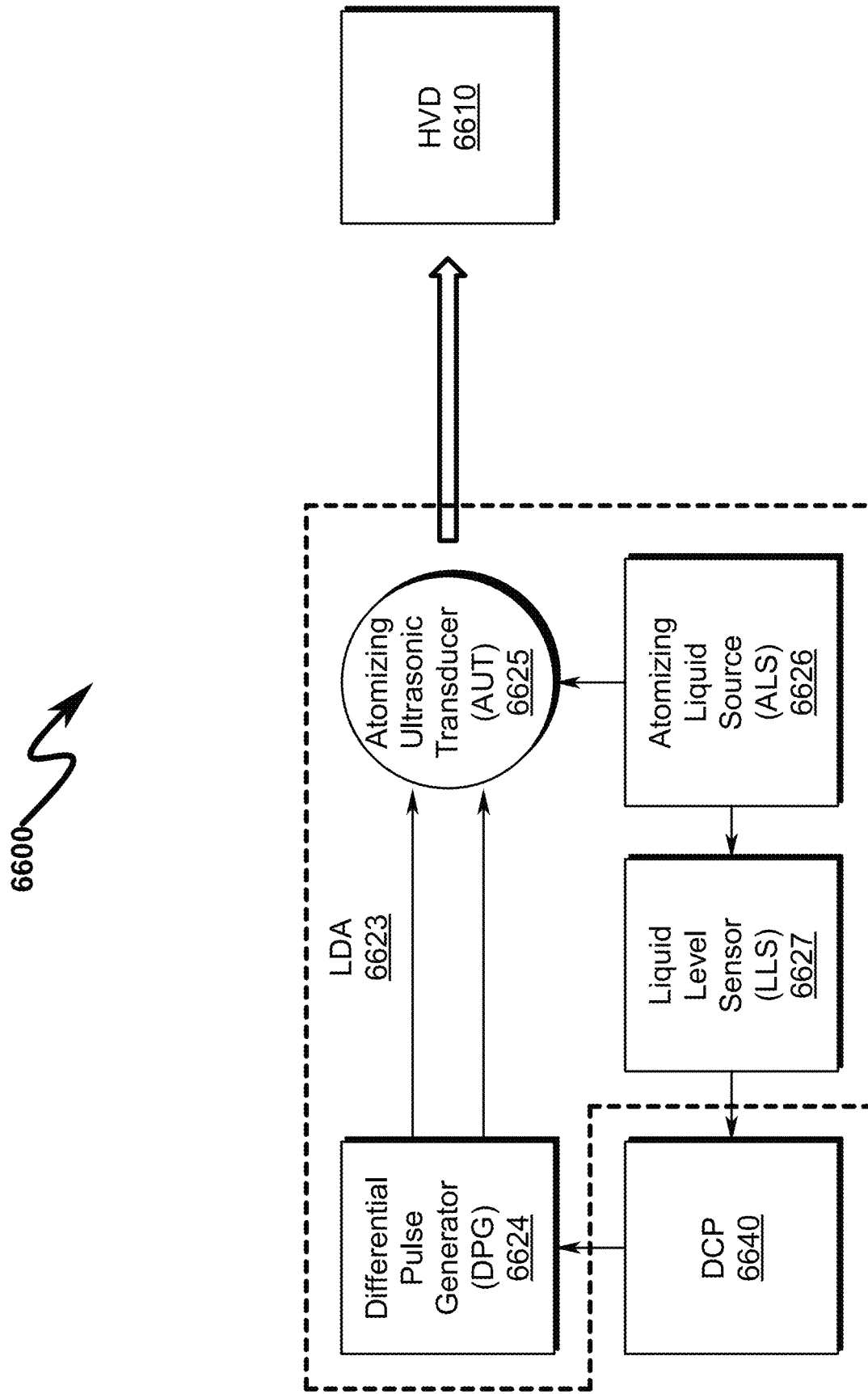
FIG. 66 illustrates a system block diagram depicting a preferred exemplary embodiment of a present invention liquid distribution atomizer (LDA)

As generally depicted in FIG. 65 (6500)-FIG. 66 (6600), the present invention may also incorporate an active liquid distribution atomizer (LDA) (6523) that atomizes/aerosolizes a wide variety of liquids in response to the activation of air flow or other conditions inside and/or outside the HVAC system. The LDA may provide for atomized/aerosolized dispersal of disinfectant liquids, anti-bacterial liquids, anti-fungal liquids, anti-viral liquids, scented fragrance liquids, and/or combinations of these liquids within the HVD. The LDA in conjunction with the UVL treatment of the air flow within the HVD permits recirculated air with the confines of the zone serviced by the HVAC system to be treated using multiple methodologies to provide for a reduction in contamination due to COVID-19 or other viruses and/or bacteria such as Legionnaires Disease and/or mold and the like.

Aerosolized liquids may typically remain in suspension within an enclosed area for 3-30 minutes and provide for an effective means of decontaminating a closed habitable space such as a hotel room or other structure. The LDA in this instance may be controlled by the DCP that is configured to activate the LDA in response to the AFS or the TCU. In some preferred exemplary invention embodiments the LDA may be triggered via events indicated by the TCU, such as after a hotel guest has checked out of a hotel room so that room disinfection may occur prior to the next hotel guest checking into that room.

Referencing FIG. 66 (6600), details of the LDA (6623) are presented wherein a differential pulse generator (DPG) (6624) activated by the DCP (6640) drives an atomizing ultrasonic transducer (AUT) (6625) that takes liquid from an atomizing liquid source (ALS) (6626) and aerosolizes the ALS (6626) into the HVD (6610). A liquid level sensor (LLS) (6627) may also be incorporated to inform the DCP (6640) that the ALS (6626) needs to be replenished.

Leak Exhaust Fan (LEF) (6700)-(6800)

Figure 67:
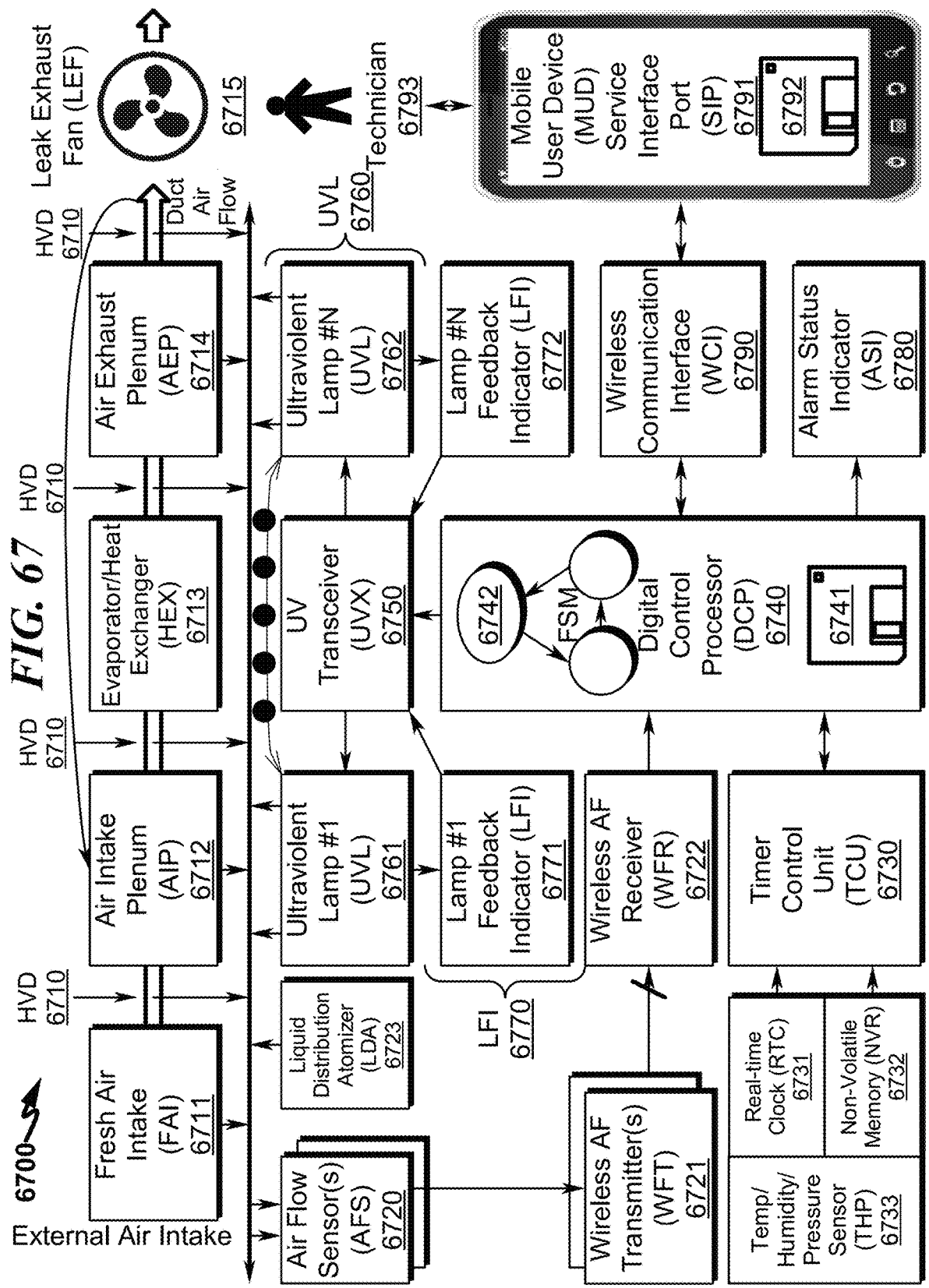
FIG. 67 illustrates a system block diagram depicting a preferred exemplary embodiment of a present invention HVAC air treatment system (ATS) incorporating a leak exhaust fan (LEF)
Figure 68:
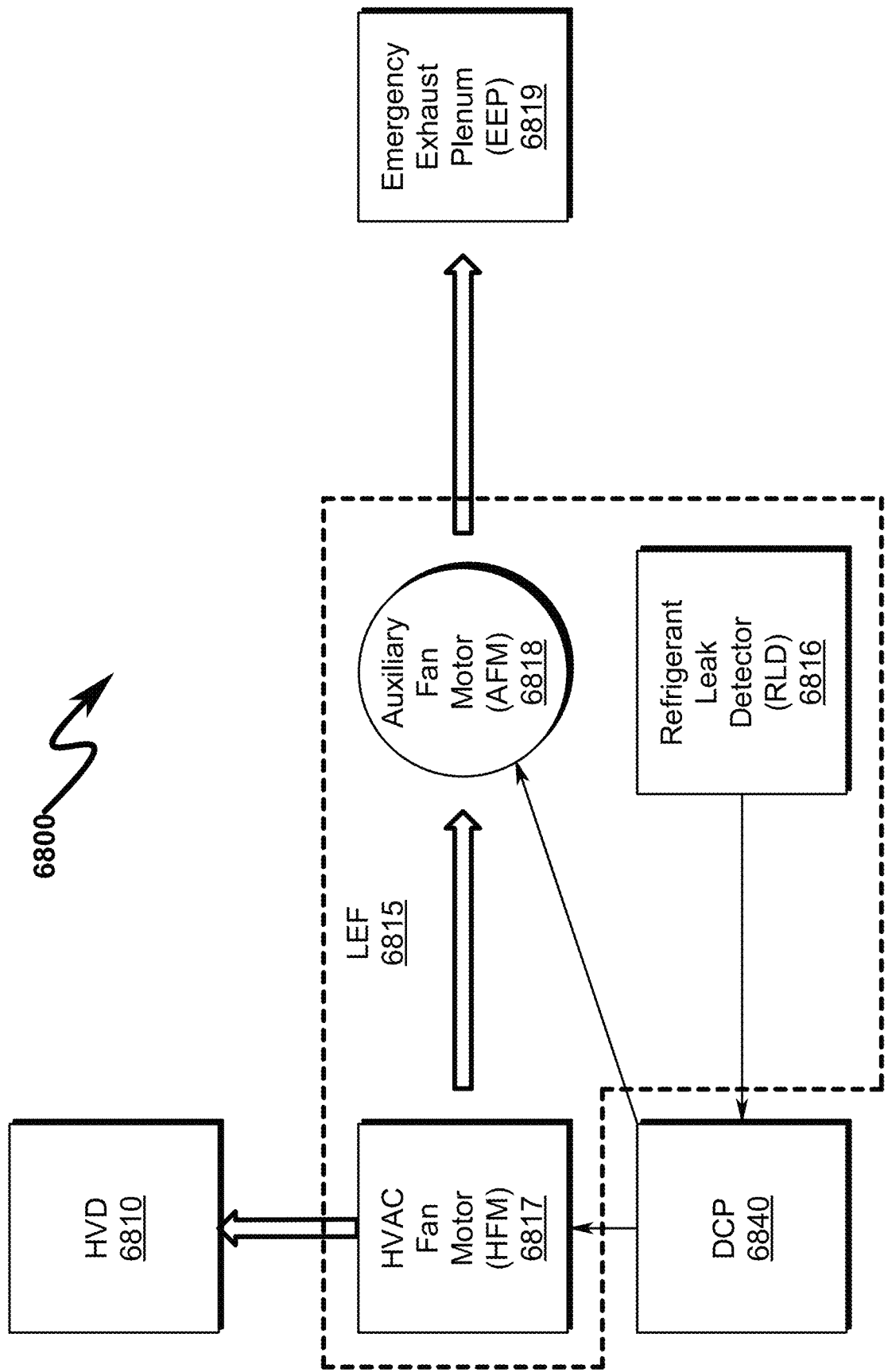
FIG. 68 illustrates a system block diagram depicting a preferred exemplary embodiment of a present invention leak exhaust fan (LEF).

As generally depicted in FIG. 67 (6700)-FIG. 68 (6800), the present invention may also incorporate a leak exhaust fan (LEF) (6715) that is triggered on detection of a refrigerant leak in the HVAC system. This LEF may take the form of forcing air flow through the HVAC system using the HVAC fan motor (HFM) associated with the HVD and/or HEX, but may also provide for an auxiliary fan motor (AFM) LEF that forces air through the normal HVD duct and/or a separate emergency exhaust plenum (EEP) on detection of a HVAC refrigerant leak. This AFM bypass exhaust mechanism allows for leaking refrigerant to be bypassed through an exhaust plenum that does not impact habitable areas where it may adversely impact persons or other living creatures.

Referencing FIG. 68 (6800), details of the LEF (6815) include a refrigerant leak detector (6816) that informs the DCP (6840) that a refrigerant leak has been detected at which time the DCP (6840) may activate the HVAC fan motor (HFM) (6817) and/or an auxiliary fan motor (AFM) (6818) to force air flow through the HVD (6810) and/or emergency exhaust plenum (EEP) (6819).

System Summary

The present invention system may be summarized as a HVAC air treatment (HAT) system (ATS) for use in a heating, ventilation, and air conditioning (HVAC) environment (HVE), the ATS comprising:
- (a) air flow sensor (AFS);
- (b) timer control unit (TCU);
- (c) ultraviolet lamp (UVL);
- (d) lamp feedback indicator (LFI);
- (e) digital control processor (DCP); and
- (f) alarm status indicator (ASI);

wherein:
the HVE comprises a HVAC evaporator/heat exchanger (HEX);
the HEX comprises an air intake mechanically coupled to an air intake plenum (AIP);
the HEX comprises an air exhaust mechanically coupled to an air exhaust plenum (AEP);
the AIP and the AEP circulate air flow within ducts (HVD) within the HVE;
the AFS indicates detection of air flow within the HVD to the DCP;
the DCP interrogates the TCU to determine when HAT is to occur if HVD air flow is detected and activates the UVL to disinfect air within the HVD when the TCU indicates the UVL should be activated;
the LFI provides feedback to the DCP to verify that the UVL is operational; and
the UVL incorporates an HVD-attached adjustable magnetic frame (AMF) allowing UVL retrofit installation without mechanical modifications to the HVD.

This general system summary may be augmented by the various elements described herein to produce a wide variety of invention embodiments consistent with this overall design description.

Method Summary

The present invention method may be summarized as an air treatment method (ATM) comprising the following steps:
(1) reading activation and/or deactivation parameters from the TCU (0201);
(2) reading the current AFS status (0202);
(3) applying AFS status values to the activation/deactivation state machine (TSM) controlled by the data contained in the TCU (0203);
(4) determining if the TSM indicates UVL deactivation is required, and if not, proceeding to step (6) (0204);
(5) deactivating the UVL and proceeding to step (1) (0205);
(6) determining if the TSM indicates UVL activation is required, and if not, proceeding to step (1) (0306);
(7) activating the UVL (0307);
(8) determining if the LFI indicates that the UVL has been activated, and if so, proceeding to step (1) (0308);
(9) triggering an ASI UVL failure alarm (0309);
(10) logging the UVL failure to the TCU and/or MUD and proceeding to step (1) (0310).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:

An embodiment wherein the AFS communicates wirelessly with the DCP.

An embodiment wherein the AFS is inductively powered by magnetic flux induced from a power connection to a fan motor located within the HVD.

An embodiment wherein the TCU comprises a real-time clock (RTC) and non-volatile random access memory (NVR).

An embodiment wherein the TCU is configured to indicate activation of the UVL for a specific time period after the AFS has indicated air flow in the HVD.

An embodiment wherein the UVL is positioned at the AIP.

An embodiment wherein the UVL is positioned at the HEX.

An embodiment wherein the UVL is positioned at the AEP.

An embodiment wherein the UVL comprises multiple ultraviolet lamps with one of the UVL positioned at the AIP and another of the UVL positioned at the AEP.

An embodiment wherein the UVL comprises multiple ultraviolet lamps with one of the UVL positioned at the AIP and another of the UVL positioned at the HEX.

An embodiment wherein the UVL comprises multiple ultraviolet lamps with one of the UVL positioned at the HEX and another of the UVL positioned at the AEP.

An embodiment wherein the UVL comprises multiple ultraviolet lamps with the ultraviolet lamps being placed individually positioned at the AIP, at the HEX, and at the AEP.

An embodiment wherein the TCU is configured to record the time period in which the UVL is active.

An embodiment wherein the TCU is configured to record the number of ON-OFF cycles in which the UVL is active.

An embodiment wherein the TCU is configured to store a predefined schedule on which the UVL is to be activated.

An embodiment wherein the TCU is configured to store predefined environmental conditions on which the UVL is to be activated.

An embodiment wherein the DCP is configured to activate the UVL for a period of time before air flow through the HEX is initiated.

An embodiment wherein the DCP is configured to activate the UVL for a period of time after air flow through the HEX is terminated.

An embodiment wherein the DCP is configured to activate the ASI if the UVL has been activated and the LFI indicates that the UVL has failed to properly activate.

An embodiment wherein the DCP is configured to transmit an indication of the AFS and the LFI via a wireless communication interface (WCI) to a mobile user device (MUD).

One skilled in the art will recognize that other embodiments are possible based on combinations of elements taught within the above invention description.

CONCLUSION

A HVAC air treatment (HAT) system/method for use in heating, ventilation, and air conditioning (HVAC) systems that incorporates an air flow sensor (AFS), timer control unit (TCU), ultraviolet lamp(s) (UVL), lamp feedback indicator (LFI), liquid distribution atomizer (LDA), leak exhaust fan (LEF), and digital control processor (DCP) has been disclosed. The AFS indicates detection of air flow within the HVAC ducts (HVD) to the DCP and may wirelessly communicate with the DCP. The DCP interrogates the TCU to determine when HAT is to occur if HVD air flow is detected and activates the UVL to disinfect air within the HVD. The LFI provides feedback to the DCP to verify that the UVL is operational. The UVL may be positioned at the fresh air intake (FAI), air intake plenum (AIP), evaporator/heat exchanger (HEX), and/or air exhaust plenum (AEP) and may incorporate an HVD-attached adjustable magnetic frame (AMF) allowing UVL retrofit installation without HVD mechanical modification.

Claims Interpretation

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A HVAC air treatment (HAT) system (ATS) for use in a heating, ventilation, and air conditioning (HVAC) environment (HVE), said ATS comprising:
   (a) air flow sensor (AFS);
   (b) timer control unit (TCU);
   (c) ultraviolet lamp (UVL);
   (d) lamp feedback indicator (LFI);
   (e) digital control processor (DCP); and
   (f) alarm status indicator (ASI);
   wherein:
   said TCU comprises a real-time clock (RTC) and non-volatile random access memory (NVR);
   said LFI comprises an ultraviolet LED detector (ULD) electrically coupled to a UV-LED amplifier/detector (UAD);
   said ULD comprises a semiconductor LED device configured in reverse emission mode to generate an output signal in the presence of UV radiation;
   said HVE comprises a HVAC evaporator/heat exchanger (HEX);
   said HEX comprises an air intake mechanically coupled to an air intake plenum (AIP);
   said HEX comprises an air exhaust mechanically coupled to an air exhaust plenum (AEP);
   said AIP and said AEP circulate air flow within ducts (HVD) within said HVE;
   said AFS indicates detection of air flow within said HVD to said DCP;
   said AFS is inductively powered by magnetic flux induced from a power connection to a fan motor located within said HVD;
   said DCP interrogates said TCU to determine when HAT is to occur if HVD air flow is detected and activates said UVL to disinfect air within the HVD when said TCU indicates said UVL should be activated;

said LFI monitors operation of said UVL to determine if said UVL is operating properly and provides feedback to said DCP to verify the operational status of said UVL; and said UVL incorporates an HVD-attached adjustable magnetic frame (AMF) allowing UVL retrofit installation without mechanical modifications to the HVD.

2. The HVAC air treatment system of claim 1 wherein said AFS communicates wirelessly with said DCP.

3. The HVAC air treatment system of claim 1 wherein said TCU comprises a temperature/humidity/pressure sensor (THP).

4. The HVAC air treatment system of claim 1 wherein said TCU is configured to indicate activation of said UVL for a specific time period after said AFS has indicated air flow in said HVD.

5. The HVAC air treatment system of claim 1 wherein said UVL is positioned at said AIP.

6. The HVAC air treatment system of claim 1 wherein said UVL is positioned at said HEX.

7. The HVAC air treatment system of claim 1 wherein said UVL is positioned at said AEP.

8. The HVAC air treatment system of claim 1 wherein said UVL comprises multiple ultraviolet lamps with one of said UVL positioned at said AIP and another of said UVL positioned at said AEP.

9. The HVAC air treatment system of claim 1 wherein said UVL comprises multiple ultraviolet lamps with one of said UVL positioned at said AIP and another of said UVL positioned at said HEX.

10. The HVAC air treatment system of claim 1 wherein said UVL comprises multiple ultraviolet lamps with one of said UVL positioned at said HEX and another of said UVL positioned at said AEP.

11. The HVAC air treatment system of claim 1 wherein said UVL comprises multiple ultraviolet lamps with said ultraviolet lamps being individually positioned at said AIP, at said HEX, and at said AEP.

12. The HVAC air treatment system of claim 1 wherein said TCU is configured to record the time period in which said UVL is active.

13. The HVAC air treatment system of claim 1 wherein said TCU is configured to record the number of ON-OFF cycles in which said UVL is active.

14. The HVAC air treatment system of claim 1 wherein said TCU is configured to store a predefined schedule on which said UVL is to be activated.

15. The HVAC air treatment system of claim 1 wherein said TCU is configured to store predefined environmental conditions on which said UVL is to be activated.

16. The HVAC air treatment system of claim 1 wherein said DCP is configured to activate said UVL for a period of time before air flow through said HEX is initiated.

17. The HVAC air treatment system of claim 1 wherein said DCP is configured to activate said UVL for a period of time after air flow through said HEX is terminated.

18. The HVAC air treatment system of claim 1 wherein said DCP is configured to activate said ASI if said UVL has been activated and said LFI indicates that said UVL has failed to properly activate.

19. The HVAC air treatment system of claim 1 wherein said DCP is configured to transmit an indication of said AFS and said LFI via a wireless communication interface (WCI) to a mobile user device (MUD).

20. The HVAC air treatment system of claim 1 wherein:
said HAT further comprises a liquid distribution atomizer (LDA) configured to atomize an anti-viral disinfectant liquid within said HVD; and
said DCP is configured to activate said LDA in response to said AFS or said TCU.

21. The HVAC air treatment system of claim 1 wherein:
said HAT further comprises a liquid distribution atomizer (LDA) configured to atomize an anti-bacterial disinfectant liquid within said HVD; and
said DCP is configured to activate said LDA in response to said AFS or said TCU.

22. The HVAC air treatment system of claim 1 wherein:
said HAT further comprises a liquid distribution atomizer (LDA) configured to atomize an anti-fungal disinfectant liquid within said HVD; and
said DCP is configured to activate said LDA in response to said AFS or said TCU.

23. The HVAC air treatment system of claim 1 wherein:
said HAT further comprises a leak exhaust fan (LEF) configured to remove refrigerant the HVD; and
said DCP is configured to activate said LEF on detection of a refrigerant leak within the HVD.

24. The HVAC air treatment system of claim 1 wherein:
said HAT further comprises a leak exhaust fan (LEF) configured to transport leaking refrigerant from the HVD to an emergency exhaust plenum (EEP); and
said DCP is configured to activate said LEF on detection of a refrigerant leak within the HVD.

25. A HVAC air treatment (HAT) method (ATM) operating on a HVAC air treatment system (ATS) for use in a heating, ventilation, and air conditioning (HVAC) environment (HVE), said ATS comprising:
(a) air flow sensor (AFS);
(b) timer control unit (TCU);
(c) ultraviolet lamp (UVL);
(d) lamp feedback indicator (LFI);
(e) digital control processor (DCP); and
(f) alarm status indicator (ASI);
wherein:
said TCU comprises a real-time clock (RTC) and non-volatile random access memory (NVR);
said LFI comprises an ultraviolet LED detector (ULD) electrically coupled to a UV-LED amplifier/detector (UAD);
said ULD comprises a semiconductor LED device configured in reverse emission mode to generate an output signal in the presence of UV radiation;
said HVE comprises a HVAC evaporator/heat exchanger (HEX);
said HEX comprises an air intake mechanically coupled to an air intake plenum (AIP);
said HEX comprises an air exhaust mechanically coupled to an air exhaust plenum (AEP);
said AIP and said AEP circulate air flow within ducts (HVD) within said HVE;
said AFS indicates detection of air flow within said HVD to said DCP;
said AFS is inductively powered by magnetic flux induced from a power connection to a fan motor located within said HVD;
said DCP interrogates said TCU to determine when HAT is to occur if HVD air flow is detected and activates said UVL to disinfect air within the HVD when said TCU indicates said UVL should be activated;

said LFI monitors the operation of said UVL to determine if said UVL is operating properly and provides feedback to said DCP to verify the operational status of said UVL; and said UVL incorporates an HVD-attached adjustable magnetic frame (AMF) allowing UVL retrofit installation without mechanical modifications to the HVD; and wherein said method comprises:
(1) reading activation and/or deactivation parameters from said TCU (0201);
(2) reading current status values of said AFS (0202);
(3) applying said AFS status values to an activation/deactivation state machine (TSM) controlled by said data contained in said TCU (0203);
(4) determining if said TSM indicates deactivation of said UVL is required, and if not, proceeding to step (6) (0204);
(5) deactivating said UVL and proceeding to step (1) (0205);
(6) determining if said TSM indicates activation of said UVL is required, and if not, proceeding to step (1) (0306);
(7) activating said UVL (0307);
(8) determining if said LFI indicates that said UVL has been activated, and if so, proceeding to step (1) (0308);
(9) triggering an ASI UVL failure alarm (0309); and
(10) logging said UVL failure to said TCU and proceeding to step (1) (0310).

26. The HVAC air treatment method of claim 25 wherein said AFS communicates wirelessly with said DCP.

27. The HVAC air treatment method of claim 25 wherein said TCU comprises a temperature/humidity/pressure sensor (THP).

28. The HVAC air treatment method of claim 25 wherein said TCU is configured to indicate activation of said UVL for a specific time period after said AFS has indicated air flow in said HVD.

29. The HVAC air treatment method of claim 25 wherein said UVL is positioned at said AIP.

30. The HVAC air treatment method of claim 25 wherein said UVL is positioned at said HEX.

31. The HVAC air treatment method of claim 25 wherein said UVL is positioned at said AEP.

32. The HVAC air treatment method of claim 25 wherein said UVL comprises multiple ultraviolet lamps with one of said UVL positioned at said AIP and another of said UVL positioned at said AEP.

33. The HVAC air treatment method of claim 25 wherein said UVL comprises multiple ultraviolet lamps with one of said UVL positioned at said AIP and another of said UVL positioned at said HEX.

34. The HVAC air treatment method of claim 25 wherein said UVL comprises multiple ultraviolet lamps with one of said UVL positioned at said HEX and another of said UVL positioned at said AEP.

35. The HVAC air treatment method of claim 25 wherein said UVL comprises multiple ultraviolet lamps with said ultraviolet lamps being individually positioned at said AIP, at said HEX, and at said AEP.

36. The HVAC air treatment method of claim 25 wherein said TCU is configured to record the time period in which said UVL is active.

37. The HVAC air treatment method of claim 25 wherein said TCU is configured to record the number of ON-OFF cycles in which said UVL is active.

38. The HVAC air treatment method of claim 25 wherein said TCU is configured to store a predefined schedule on which said UVL is to be activated.

39. The HVAC air treatment method of claim 25 wherein said TCU is configured to store predefined environmental conditions on which said UVL is to be activated.

40. The HVAC air treatment method of claim 25 wherein said DCP is configured to activate said UVL for a period of time before air flow through said HEX is initiated.

41. The HVAC air treatment method of claim 25 wherein said DCP is configured to activate said UVL for a period of time after air flow through said HEX is terminated.

42. The HVAC air treatment method of claim 25 wherein said DCP is configured to activate said ASI if said UVL has been activated and said LFI indicates that said UVL has failed to properly activate.

43. The HVAC air treatment method of claim 25 wherein said DCP is configured to transmit an indication of said AFS and said LFI via a wireless communication interface (WCI) to a mobile user device (MUD).

44. The HVAC air treatment method of claim 25 wherein:
said HAT further comprises a liquid distribution atomizer (LDA) configured to atomize an anti-viral disinfectant liquid within said HVD; and
said DCP is configured to activate said LDA in response to said AFS or said TCU.

45. The HVAC air treatment method of claim 25 wherein:
said HAT further comprises a liquid distribution atomizer (LDA) configured to atomize an anti-bacterial disinfectant liquid within said HVD; and
said DCP is configured to activate said LDA in response to said AFS or said TCU.

46. The HVAC air treatment method of claim 25 wherein:
said HAT further comprises a liquid distribution atomizer (LDA) configured to atomize an anti-fungal disinfectant liquid within said HVD; and
said DCP is configured to activate said LDA in response to said AFS or said TCU.

47. The HVAC air treatment method of claim 25 wherein:
said HAT further comprises a leak exhaust fan (LEF) configured to remove refrigerant from the HVD; and
said DCP is configured to activate said LEF on detection of a refrigerant leak within the HVD.

48. The HVAC air treatment method of claim 25 wherein:
said HAT further comprises a leak exhaust fan (LEF) configured to transport leaking refrigerant from the HVD to an emergency exhaust plenum (EEP); and
said DCP is configured to activate said LEF on detection of a refrigerant leak within the HVD.

* * * * *